United States Patent
Okanishi et al.

(10) Patent No.: US 8,846,269 B2
(45) Date of Patent: Sep. 30, 2014

(54) POLYMER ELECTROLYTE FUEL CELL AND FUEL CELL STACK COMPRISING THE SAME

(75) Inventors: Takeou Okanishi, Nara (JP); Naotsugu Koashi, Kyoto (JP); Yoichiro Tsuji, Osaka (JP)

(73) Assignee: Panasonic Corporation, Osaka (JP)

( * ) Notice: Subject to any disclaimer, the term of this patent is extended or adjusted under 35 U.S.C. 154(b) by 323 days.

(21) Appl. No.: 13/262,046

(22) PCT Filed: Mar. 15, 2011

(86) PCT No.: PCT/JP2011/001490
§ 371 (c)(1),
(2), (4) Date: Sep. 29, 2011

(87) PCT Pub. No.: WO2011/114702
PCT Pub. Date: Sep. 22, 2011

(65) Prior Publication Data
US 2012/0040268 A1   Feb. 16, 2012

(30) Foreign Application Priority Data
Mar. 17, 2010   (JP) .................................. 2010-061045

(51) Int. Cl.
*H01M 8/02* (2006.01)
*H01M 8/04* (2006.01)
*H01M 8/10* (2006.01)

(52) U.S. Cl.
USPC ............ 429/514; 429/512; 429/513; 429/457

(58) Field of Classification Search
CPC ............ H01M 8/02; H01M 8/04; H01M 8/10
USPC .................................. 429/512, 513, 514, 457
IPC ...................................... H01M 8/02, 8/04, 8/10
See application file for complete search history.

(56) References Cited

U.S. PATENT DOCUMENTS 5,252,410 A * 10/1993 Wilkinson et al. ............ 429/438
7,112,385 B2 * 9/2006 Rock .............................. 429/446
(Continued)

FOREIGN PATENT DOCUMENTS

| JP | 09-050817 | 2/1997 | |
|----|-----------|--------|---|
| JP | 09-283162 | 10/1997 | |
| JP | 2001085033 | * 3/2001 | .............. H01M 8/02 |

(Continued)

Primary Examiner — Jeremiah Smith
(74) Attorney, Agent, or Firm — McDermott Will & Emery LLP

(57) ABSTRACT

A polymer electrolyte fuel cell of the present invention comprises a membrane-electrode assembly (5), a first separator (6a), and a second separator (6b); the first separator (6a) having a groove-shaped first reaction gas channel (8) on one main surface of the first separator (6a) which contacts the first electrode (4a) such that a plurality of straight-line-shaped first rib portions (11) run along each other; the second electrode (4b) having a groove-shaped second reaction gas channel (9) on one main surface of the second electrode (4b) which contacts the second separator (6b) such that a plurality of straight-line-shaped second rib portions (12) run along each other; a ratio of a first reaction gas channel width of at least an upstream portion (18b) of the first reaction gas channel (8) with respect to a second rib portion (12) is greater than 0 and not greater than 1.

18 Claims, 37 Drawing Sheets

(56) References Cited

U.S. PATENT DOCUMENTS

| | | | |
|---|---|---|---|
| 8,597,851 B2 * | 12/2013 | Okanishi et al. | 429/457 |
| 2003/0157387 A1 * | 8/2003 | Hase et al. | 429/32 |
| 2004/0151973 A1 * | 8/2004 | Rock | 429/38 |
| 2009/0162717 A1 * | 6/2009 | Nakagawa et al. | 429/30 |
| 2009/0169962 A1 * | 7/2009 | Hsing et al. | 429/34 |
| 2010/0086819 A1 * | 4/2010 | Gemba et al. | 429/26 |
| 2010/0104923 A1 | 4/2010 | Takeguchi et al. | |
| 2011/0165493 A1 * | 7/2011 | Okanishi et al. | 429/457 |

FOREIGN PATENT DOCUMENTS

| | | | |
|---|---|---|---|
| JP | 2003-297395 | 10/2003 | |
| JP | 2005-235418 | 9/2005 | |
| JP | 2006-331916 | 12/2006 | |
| JP | 2009-283290 | 12/2009 | |
| WO | WO 2008126358 | * 10/2008 | H01M 8/10 |

* cited by examiner

POLYMER ELECTROLYTE FUEL CELL AND FUEL CELL STACK COMPRISING THE SAME

RELATED APPLICATIONS

This application is the U.S. National Phase under 35 U.S.C. §371 of International Application No. PCT/JP2011/001490, filed on Mar. 15, 2011, which in turn claims the benefit of Japanese Application No. 2010-061045, filed on Mar. 17, 2010, the disclosures of which Applications are incorporated by reference herein.

Technical Field

The present invention relates to a configuration of a polymer electrolyte fuel cell and a configuration of a fuel cell stack comprising the polymer electrolyte fuel cell. Particularly, the present invention relates to a configuration of a separator and a configuration of a gas diffusion electrode in the polymer electrolyte fuel cell.

Background Art

In recent years, as a clean energy source, fuel cells have attracted attention. An exemplary fuel cell is a polymer electrolyte fuel cell. The polymer electrolyte fuel cell (hereinafter referred to as PEFC) includes a membrane-electrode assembly, and an anode separator and a cathode separator which sandwich the membrane-electrode assembly and are disposed in contact with an anode and a cathode, respectively. The membrane-electrode assembly includes the anode and the cathode (these are referred to as electrodes) each composed of a gas diffusion layer and a catalyst layer. Each gas diffusion layer has pores forming paths through which a reaction gas flows. The anode separator is provided with a fuel gas channel on its one main surface. The cathode separator is provided with an oxidizing gas channel on its one main surface. The fuel gas (hydrogen) supplied to the anode through the fuel gas channel is ionized ($H^+$), passes through the gas diffusion layer and the catalyst layer of the anode, passes through the polymer electrolyte membrane through water, and migrates to the cathode side. Hydrogen ions reach the cathode side and generate water in the catalyst layer of the cathode through a power generation reaction as follows:

Anode side: $H_2 \rightarrow 2H^+ + 2e^-$

Cathode side: $(\frac{1}{2})O_2 + 2H^+ + 2e^- \rightarrow H_2O$

Overall Reaction: $H_2 + (\frac{1}{2})O_2 \rightarrow H_2O$

The generated water flows into the oxidizing gas channel formed on the cathode separator in the form of steam or liquid. A part of the water generated in the cathode side migrates to the anode side (so-called flows back) and flows into the fuel gas channel. The generated water which has flowed into the oxidizing gas channel or the fuel gas channel migrates to downstream side along a flow of the oxidizing gas or the fuel gas. For this reason, there is a great variation in a water amount in a localized region inside the electrode. This sometimes results in a great variation in a power generation amount in the localized region.

As a solution to this problem, there is known a fuel cell including first channels into which gas flows and second channels from which the gas flows out, and having a configuration in which the first channel at the anode side and the second channel at the cathode side are disposed to face each other and sandwich an electrolyte layer, and the second channel at the anode side and the first channel at the cathode side are disposed to face each other and sandwich the electrolyte layer (see e.g., Patent Literature 1). In addition, there is known a polymer electrolyte fuel cell in which an anode gas channel and a cathode gas channel face each other so as to sandwich a membrane electrode assembly and an anode gas and a cathode gas run along each other within the channels (see e.g., Patent Literature 2).

In the fuel cell disclosed in Patent Literature 1, since the fuel gas and the oxidizing gas form a counter flow, and the channels face each other so as to sandwich the electrolyte layer, it is possible to lessen regions with a large water content in the gas diffusion layers facing each other or regions with a small water content in the gas diffusion layers facing each other, with the electrolyte layer sandwiched between them. As a result, it is possible to suppress a variation in a power generation amount from increasing in a localized region in the electrode.

In the polymer electrolyte fuel cell disclosed in Patent Literature 2, since the anode gas is more humidified than the cathode gas, water diffuses from the anode gas flowing in the vicinity of an inlet of the anode gas channel, in the vicinity of an inlet of the cathode gas channel, and migrates from the anode side toward the cathode side, while water migrates from the cathode side toward the anode side, in the vicinity of an outlet of the anode gas channel. Thus, it is possible to properly control supplying and discharging of water in the overall fuel cell and maintain a good power generation performance of the fuel cell.

There is known a polymer electrolyte fuel cell in which an area where a wall surface of a groove forming a reaction gas channel and a reaction gas contact each other in an upstream region of a reaction gas channel is larger than that in other region, thereby suppressing a polymer electrolyte membrane from getting dried (see e.g., Patent Literature 3). In the polymer electrolyte fuel cell disclosed in Patent Literature 3, evaporation of water present on an inner wall surface or on a wall surface is promoted and thereby an amount of water evaporating from a groove wall surface side into the reaction gas increases. This makes it possible to suppress water from evaporating from the polymer electrolyte membrane side and the polymer electrolyte membrane from getting dried.

Furthermore, there is known a fuel cell in which an area of an electrocatalyst layer facing at least one of a fuel gas channel and an oxygen-containing gas channel is reduced, and the fuel gas channel and the oxygen-containing gas channel are arranged alternately in a direction of an electrolyte membrane surface (see e.g., Patent Literature 4). In the fuel cell disclosed in Patent Literature 4, it is possible to increase a power generation voltage in the fuel cell by suppressing the gas from permeating into an opposite electrode.

CITATION LISTS

Patent Literature

Patent Literature 1: Japanese Laid-Open Patent Application Publication No. 2006-331916
Patent Literature 2: Japanese Laid-Open Patent Application Publication No. Hei. 9-283162
Patent Literature 3: Japanese Laid-Open Patent Application Publication No. 2005-235418
Patent Literature 4: Japanese Laid-Open Patent Application Publication No. 2003-297395

SUMMARY OF THE INVENTION

Technical Problem

However, in the fuel cells disclosed in Patent Literature 1 to Patent Literature 4, if the fuel cell is operated under conditions of a high-temperature and a low humidity (e.g., a dew point of the reaction gas is lower than a temperature inside a fuel cell stack), the above reaction does not sufficiently occur in an upstream portion of the reaction gas channel and water is not sufficiently generated, so that a portion of the polymer electrolyte membrane which faces the upstream portion of the reaction gas channel gets dried, ion transmissivity decreases and a power generation efficiency decreases. Thus, there is a room for improvement.

In the polymer electrolyte fuel cell disclosed in Patent Literature 3, since a portion (rib portion) between grooves formed in the anode separator and a portion (rib portion) between grooves formed in the cathode separator overlap with each other and they do not overlap with each other in a non-uniform manner, a mechanical stress might be applied to the polymer electrolyte membrane, and the polymer electrolyte membrane might be degraded. Thus, there is a room for improvement.

The present invention has been made to solve the above problem, and an object of the present invention is to provide a polymer electrolyte fuel cell capable of suppressing degradation of a polymer electrolyte membrane particularly when the polymer electrolyte fuel cell is operated under conditions of a high-temperature and a low humidity, and a fuel cell stack comprising the polymer electrolyte fuel cell.

Solution to Problem

It is known that during an operation of the fuel cell, a content of water (liquid water and gaseous water) in a portion of the electrode which faces the reaction gas channel is lower than a content of water in a portion of the electrode which contacts a rib portion formed between adjacent reaction gas channels. FIG. 37 is a schematic view showing a water content in the electrode during the operation of the fuel cell.

The inventors studied intensively to solve the problem associated with the prior art and found the following. As shown in FIG. 37, water present in a portion 202A of an electrode 202 which contacts a rib portion 204 formed between adjacent reaction gas channels 203 diffuses toward a portion 202B of the electrode 202 which faces the reaction gas channel 203, and a water content is higher in the vicinity of a region of the electrode 202 in a boundary between the rib portion 204 and the reaction gas channel 203 than in a center region of the portion 202B of the electrode 202. In other words, the water content is less in a region of the electrode 202 which is more distant from the portion 202A which contacts the rib portion 204. To solve the above mentioned problem, the inventors discovered that the object of the present invention is achieved effectively by using the configuration described below.

To be specific, a polymer electrolyte fuel cell of the present invention comprises a membrane-electrode assembly including a polymer electrolyte membrane and first and second electrodes sandwiching a pair of main surfaces of the polymer electrolyte membrane; an electrically-conductive first separator which is of a plate shape and is provided in contact with the first electrode of the membrane-electrode assembly; and an electrically-conductive second separator which is of a plate shape and is provided in contact with the second electrode of the membrane-electrode assembly; the first separator being provided with a groove-shaped first reaction gas channel on one main surface of the first separator which contacts the first electrode such that a plurality of first rib portions of a straight-line shape run along each other; the second electrode being provided with a groove-shaped second reaction gas channel on one main surface of the second electrode which contacts the second separator such that a plurality of second rib portions of a straight-line shape run along each other; an upstream portion of the first reaction gas channel is defined as a portion extending over a predetermined length from a portion which contacts the first electrode first from an upstream end of the first reaction gas channel toward a downstream side; a downstream portion of the first reaction gas channel is defined as a portion of the first reaction gas channel which is downstream of the upstream portion of the first reaction gas channel; and when a ratio of a first reaction gas channel width to the second rib portion is defined as a ratio of a portion of the first reaction gas channel which overlaps with the second rib portion in a width direction of the first reaction gas channel with respect to an overall width of the first reaction gas channel when viewed in a thickness direction of the first separator; a ratio of a first reaction gas channel width of at least the upstream portion of the first reaction gas channel with respect to the second rib portion is greater than 0 and not greater than 1.

As described above, a water content in a portion of the first electrode which faces the upstream portion of the first reaction gas channel is lower than a portion of the first electrode which contacts the first rib portion of the first reaction gas channel, when viewed in the thickness direction of the first separator. Likewise, a water content in a portion of the second electrode which overlaps with the second reaction gas channel is lower than a water content in a portion of the second electrode which overlaps with the second rib portion, when viewed in the thickness direction of the first separator.

However, in the polymer electrolyte fuel cell of the present invention, at least a portion of the first electrode which faces the upstream portion of the first reaction gas channel (hereinafter referred to as passage facing portion of first electrode) overlaps with the second rib portion of the second electrode when viewed in the thickness direction of the first separator. Because of this structure, water migrates from the portion which overlaps with the second rib portion of the second electrode where a water content is high to the passage facing portion of first electrode where a water content is low. Thus, it is possible to suppress a portion of the polymer electrolyte membrane which faces the upstream portion of the first reaction gas channel from getting dried. As a result, in a case where the polymer electrolyte fuel cell of the present invention is operated especially under conditions of a high-temperature and a low humidity, it is possible to suppress a portion of the polymer electrolyte membrane which faces the upstream portion of the first reaction gas channel from getting dried, and to suppress degradation of the polymer electrolyte membrane.

A polymer electrolyte fuel cell of the present invention comprises a membrane-electrode assembly including a polymer electrolyte membrane and first and second electrodes sandwiching a pair of main surfaces of the polymer electrolyte membrane; an electrically-conductive first separator which is of a plate shape and is provided in contact with the first electrode of the membrane-electrode assembly; and an electrically-conductive second separator which is of a plate shape and is provided in contact with the second electrode of the membrane-electrode assembly; the first electrode being provided with a groove-shaped first reaction gas channel on one main surface of the first electrode which contacts the first separator such that a plurality of first rib portions of a straight-line shape run along each other; the second electrode being provided with a groove-shaped second reaction gas channel on one main surface of the second electrode which contacts the second separator such that a plurality of second rib portions of a straight-line shape run along each other; an upstream portion of the first reaction gas channel is defined as a portion extending over a predetermined length from a portion which contacts the first electrode first from an upstream end of the first reaction gas channel toward a downstream side; a downstream portion of the first reaction gas channel is defined as a portion of the first reaction gas channel which is downstream of the upstream portion of the first reaction gas channel; and when a ratio of a first reaction gas channel width to the second rib portion is defined as a ratio of a portion of the first reaction gas channel which overlaps with the second rib portion in a width direction of the first reaction gas channel with respect to an overall width of the first reaction gas channel when viewed in a thickness direction of the first separator; a ratio of a first reaction gas channel width of at least the upstream portion of the first reaction gas channel with respect to the second rib portion is greater than 0 and not greater than 1.

As a result, in a case where the polymer electrolyte fuel cell of the present invention is operated especially under conditions of a high-temperature and a low humidity, it is possible to suppress a portion of the polymer electrolyte membrane which faces the upstream portion of the first reaction gas channel from getting dried, and to suppress degradation of the polymer electrolyte membrane.

In the polymer electrolyte fuel cell of the present invention, the ratio of the first reaction gas channel width of the upstream portion of the first reaction gas channel with respect to the second rib portion may be greater than a ratio of the first reaction gas channel width of the downstream portion of the first reaction gas channel with respect to the second rib portion; and the ratio of the first reaction gas channel width of the upstream portion of the first reaction gas channel with respect to the second rib portion may be a predetermined ratio.

By the way, a pressure is applied to a portion of the first electrode which contacts the first rib portion of the first reaction gas channel and the second rib portion of the second electrode, when the polymer electrolyte fuel cell is fastened together. In a structure in which the first rib portion and the second rib portion do not overlap with each other when viewed in the thickness direction of the first separator, a stress concentrates on a portion of the first electrode which contacts the end portion of the first rib portion and the end portion of the second rib portion, so that a mechanical stress is applied to portions of the polymer electrolyte membrane which overlap with these end portions. If a portion (rib portion) between grooves formed on the anode separator and a portion (rib portion) between grooves formed on the cathode separator overlap with each other and they do not overlap with each other in a non-uniform manner, a mechanical stress might be further applied to the polymer electrolyte membrane, and the polymer electrolyte membrane might be degraded.

However, in the polymer electrolyte fuel cell of the present invention, since the first reaction gas channel is formed on the first separator in such a manner that the ratio of the first reaction gas channel width of the upstream portion of the first reaction gas channel with respect to the second rib portion is the predetermined ratio, it is possible to suppress a pressure from being applied unevenly and hence to suppress degradation of the polymer electrolyte membrane.

In the polymer electrolyte fuel cell of the present invention, the ratio of the first reaction gas channel width of the upstream portion of the first reaction gas channel with respect to the second rib portion may be greater than 0 and not greater than 1.

In the polymer electrolyte fuel cell of the present invention, the ratio of the first reaction gas channel width of the upstream portion of the first reaction gas channel with respect to the second rib portion may be 1.

In the polymer electrolyte fuel cell of the present invention, the ratio of the first reaction gas channel width of the downstream portion of the first reaction gas channel with respect to the second rib portion may be 0.

In the polymer electrolyte fuel cell of the present invention, the upstream portion of the first reaction gas channel may include a first upstream portion, and a second upstream portion located downstream of the first upstream portion; and the first reaction gas channel may be configured in such a manner that a ratio of a first reaction gas channel width of the first upstream portion of the first reaction gas channel with respect to the second rib portion is a first predetermined ratio, and a ratio of a first reaction gas channel width of the second upstream portion of the first reaction gas channel with respect to the second rib portion is a second predetermined ratio.

In the polymer electrolyte fuel cell of the present invention, the first predetermined ratio may be greater than the second predetermined ratio.

In the polymer electrolyte fuel cell of the present invention, the first predetermined ratio may be 1, and the second predetermined ratio may be greater than 0 and less than 1.

In the polymer electrolyte fuel cell of the present invention, the first rib portion formed at the downstream portion of the first reaction gas channel may overlap with the second rib portion when viewed in a thickness direction of the first separator.

This makes it possible to suppress a mechanical stress from being applied to the polymer electrolyte membrane and to suppress degradation of the polymer electrolyte membrane which would be caused by the mechanical stress.

In the polymer electrolyte fuel cell of the present invention, a ratio of a first reaction gas channel width of the upstream portion and the downstream portion of the first reaction gas channel with respect to the second rib portion may be greater than 0 and not greater than 1.

In the polymer electrolyte fuel cell of the present invention, a ratio of a first reaction gas channel width of the upstream portion and the downstream portion of the first reaction gas channel with respect to the second rib portion may be 1.

In the polymer electrolyte fuel cell of the present invention, the first separator may be provided with a groove-shaped cooling medium channel on the other main surface thereof; and a dew point of the first reaction gas flowing through the first reaction gas channel and a dew point of the second reaction gas flowing through the second reaction gas channel may be lower than a temperature of a cooling medium flowing through the cooling medium channel.

In the polymer electrolyte fuel cell of the present invention, a width of the upstream portion of the first reaction gas channel may be less than a width of the downstream portion of the first reaction gas channel.

This makes it possible to make the portion of one electrode which faces the upstream portion of the first reaction gas channel smaller in size and suppress the portion from getting dried. Hence, it is possible to suppress the portion of the polymer electrolyte membrane which faces the upstream portion of the first reaction gas channel from getting dried and to suppress degradation of the polymer electrolyte membrane.

A fuel cell stack of the present invention, including a plurality of polymer electrolyte fuel cells which are stacked together and fastened together.

The above and further objects, features and advantages of the present invention will more fully be apparent from the following detailed description of preferred embodiments with reference to accompanying drawings.

Advantageous Effects of the Invention

In accordance with the polymer electrolyte fuel cell and the fuel cell stack including the polymer electrolyte fuel cell, of the present invention, it is possible to suppress the polymer electrolyte membrane from getting dried, and to suppress degradation of the polymer electrolyte membrane, in a case where the polymer electrolyte fuel cell of the present invention is operated under conditions of a high-temperature and a low humidity.

DESCRIPTION OF EMBODIMENTS

Figure 1:
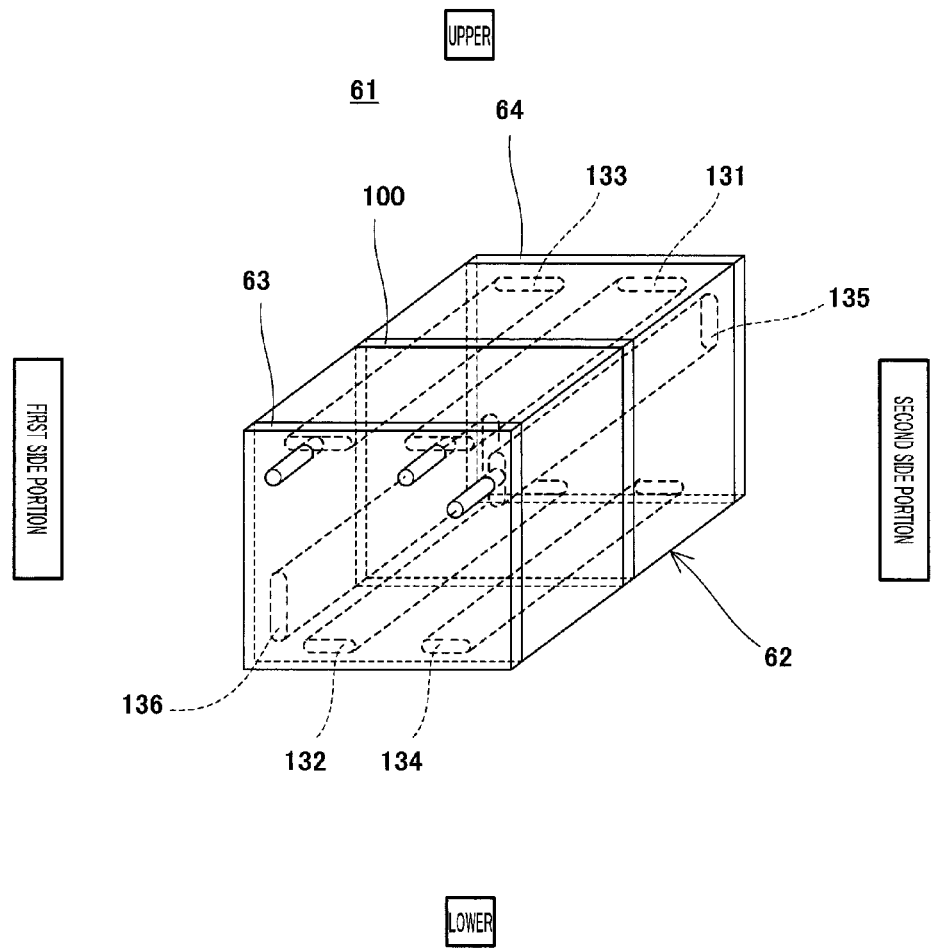
FIG. 1 is a perspective view schematically showing a configuration of a fuel cell stack according to Embodiment 1 of the present invention.

Hereinafter, preferred embodiments of the present invention will be described with reference to the drawings. Throughout the drawings, the same or corresponding parts are designated by the same reference numerals and repetitive description thereof is sometimes omitted. Throughout the drawings, components required to explain the present invention are extracted and depicted, and other components are omitted. Furthermore, the present invention is in no way limited to the following embodiments.

Embodiment 1

[Configuration of Fuel Cell Stack]

FIG. 1 is a perspective view schematically showing a configuration of a fuel cell stack according to Embodiment 1 of the present invention. In FIG. 1, upper and lower sides of the fuel cell stack are depicted as upper and lower sides of FIG. 1.

As shown in FIG. 1, a fuel cell stack 61 according to Embodiment 1 of the present invention includes a cell stack body 62 in which polymer electrolyte fuel cells 100 (hereinafter simply referred to as fuel cells) entirely having a plate shape are stacked together in a thickness direction thereof, first and second end plates 63 and 64 disposed at both ends of the cell stack body 62 and fastener members (not shown) for fastening the cell stack body 62, and the first and second end plates 63 and 64 together in the direction in which the fuel cells 100 are stacked together. Current collectors and insulating plates are provided at the first and second end plates 63 and 64, respectively, but are not illustrated.

At an upper portion of one side portion (left side portion in FIG. 1: hereinafter referred to as first side portion) of the cell stack body 62, an oxidizing gas supply manifold hole 133 is provided to penetrate the cell stack body 62 in the stack direction of the fuel cells 100, while at a lower portion thereof, a cooling medium discharge manifold 136 is provided. At an inner side of the lower portion of the cell stack body 62, where the cooling medium discharge manifold 136 is provided, a fuel gas exhaust manifold 132 is provided to penetrate the cell stack body 62 in the stack direction of the fuel cells 100. At an upper portion of the other side portion (right side portion in FIG. 1, hereinafter referred to as second side portion) of the cell stack body 62, a cooling medium supply manifold 135 is provided to penetrate the cell stack body 62 in the stack direction of the fuel cell 100, while at a lower portion thereof, an oxidizing gas exhaust manifold 134 is provided to penetrate the cell stack body 62 in the stack direction of the fuel cells 100. At the inner side of an upper portion of the cell stack body 62, where the cooling medium supply manifold 135 is provided, a fuel gas supply manifold 131 is provided to penetrate the cell stack body 62 in the stack direction of the fuel cells 100.

Suitable pipes are provided at the manifolds, respectively. Through the suitable pipes, fuel gas, oxidizing gas and cooling medium are supplied and exhausted/discharged to and from the fuel cell stack 61.

[Configuration of Polymer Electrolyte Fuel Cell]

Next, a configuration of the polymer electrolyte fuel cell according to Embodiment 1 of the present invention will be described with reference to FIGS. 2 and 3.

Figure 2:
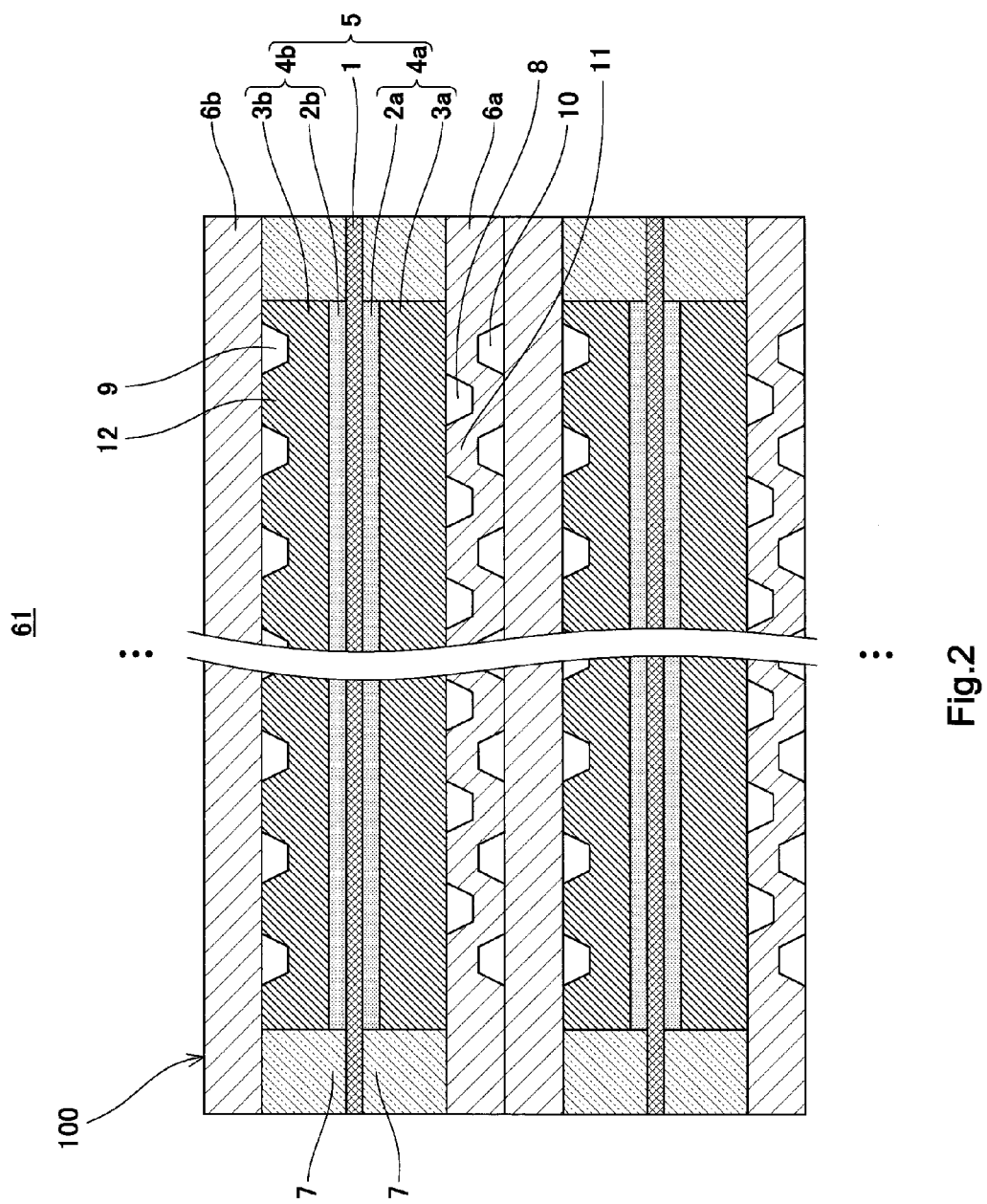
FIG. 2 is a cross-sectional view schematically showing a configuration of a polymer electrolyte fuel cell in the fuel cell stack of FIG. 1.

FIG. 2 is a cross-sectional view schematically showing a configuration of the fuel cell 100 in the fuel cell stack 61 of FIG. 1. FIG. 3 is a schematic exploded view of the fuel cell 100 of FIG. 2. In FIGS. 2 and 3, a part of the configuration is omitted.

Figure 3:
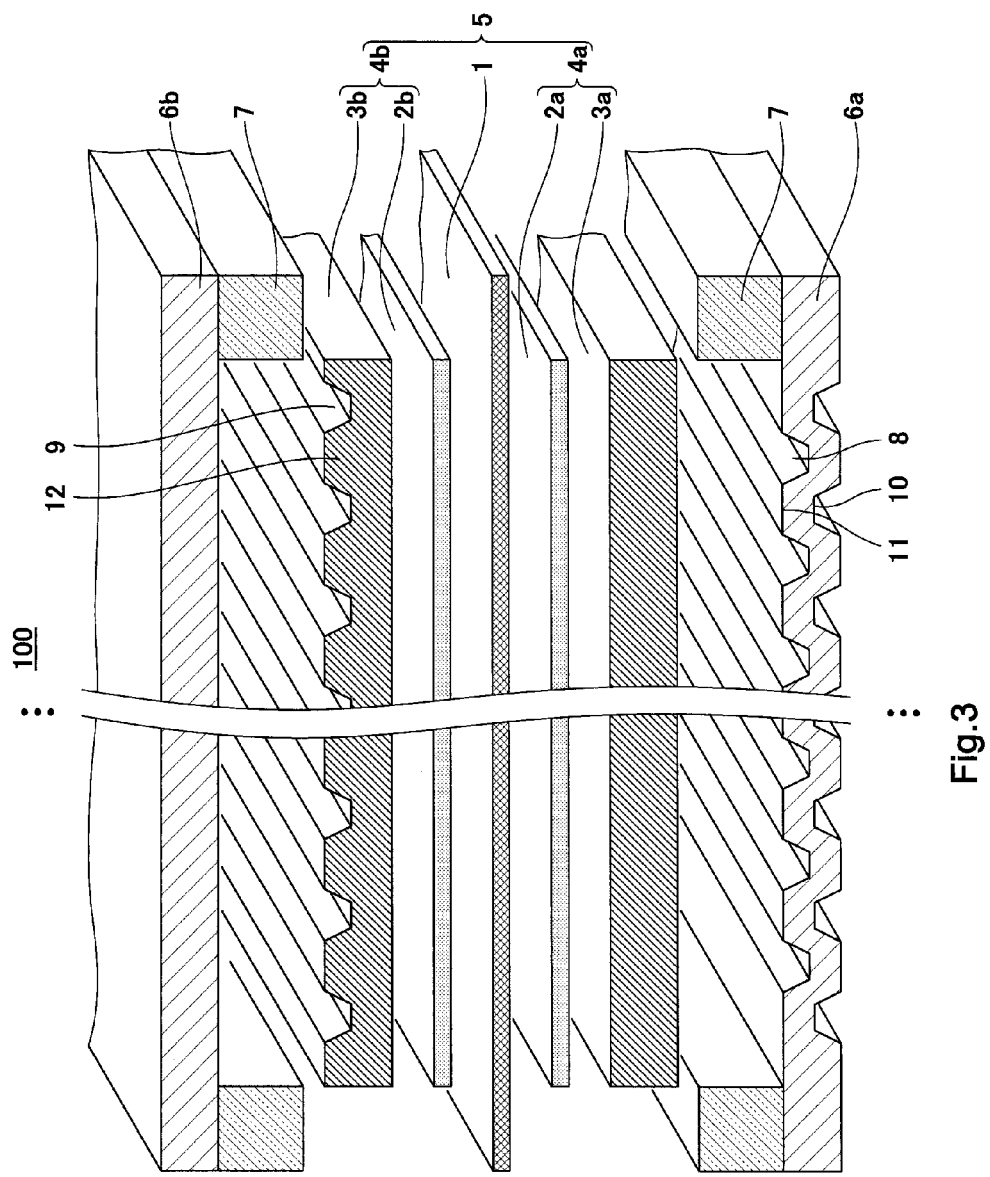
FIG. 3 is a schematic exploded view of the polymer electrolyte fuel cell of FIG. 2.

As shown in FIGS. 2 and 3, the fuel cell 100 of Embodiment 1 includes a MEA (Membrane-Electrode-Assembly) 5, gaskets 7, an anode separator 6a, and a cathode separator 6b.

The MEA 5 has a polymer electrolyte membrane 1 which selectively transports hydrogen ions, an anode (first electrode) 4a and a cathode (second electrode) 4b. The polymer electrolyte membrane 1 has a substantially quadrilateral (in Embodiment 1 rectangular) shape and is provided at its both surfaces with the anode 4a and the cathode 4b which are located inward relative to a peripheral portion of the membrane 1. Manifold holes (not shown) such as the oxidizing gas exhaust manifold hole are provided to penetrate the peripheral portion of the polymer electrolyte membrane 1 in the thickness direction.

The anode 4a is provided on one main surface of the polymer electrolyte membrane 1 and has a substantially quadrilateral (in the present embodiment, rectangular) shape. The anode 4a includes an anode catalyst layer 2a and an anode gas diffusion layer 3a provided on the anode catalyst layer 2a. The anode catalyst layer 2a includes catalyst carrying carbon composed of carbon powder (electrically conductive carbon particles) carrying platinum-based metal catalyst (electro catalyst) and polymer electrolyte adhering to the catalyst carrying carbon. The anode gas diffusion layer 3a has gas permeability and electric conductivity. A material of the anode gas diffusion layer 3a is not particularly limited, but may be one known in the art. For example, an electrically-conductive porous base material such as a carbon cloth or carbon paper may be used. The electrically-conductive porous base material may be subjected to water-repellent treatment by a known method.

The cathode 4b is provided on the other main surface of the polymer electrolyte membrane 1 and has a substantially quadrilateral (in the present embodiment, rectangular) shape. The cathode 4b includes a cathode catalyst layer 2b, and a cathode gas diffusion layer 3b provided on the cathode catalyst layer 2b and having gas permeability and electric conductivity. Groove-shaped oxidizing gas channels (second reaction gas channels) 9 through which the oxidizing gas flows, are formed on a main surface of the cathode 4b (to be precise, cathode gas diffusion layer 3b) which contacts the cathode separator 6b. The cathode catalyst layer 2b includes catalyst carrying carbon composed of carbon powder (electrically conductive carbon particles) carrying platinum-based metal catalyst (electro catalyst) and polymer electrolyte adhering to the catalyst carrying carbon. The detailed structure of the oxidizing gas channel 9 will be described later.

The cathode gas diffusion layer 3b is composed of a sheet containing a binder resin and electrically-conductive particles, instead of carbon-fiber base material impregnated with resin which is used in the gas diffusion layer in the conventional fuel cell. As the binder resin, for example, fluorinated resin is used. As the electrically-conductive particles, for example, particles comprising carbon are used.

As the fluorinated resin, PTFE (polytetrafluoroethylene), FEP (tetrafluoroethylene hexafluoropropylene copolymer), PVD (polyvinylidene fluoride), ETFE (tetrafluoroethylene, ethylene copolymer), PCTFE (polychloro trifluoro ethylene), PFA (tetrafuluoroethylene perfluoroalxyl vinylether copolymer), etc. In view of resistance to heat, water repellency, and resistance to chemicals, PTFE is preferable. As the forms of PTFE, there are dispersion and powder. For efficiency of work, dispersion is preferable.

As the carbon material, there are graphite, carbon black, active carbon, etc. These materials may be used singly or in combination. The material of the above carbon material may be powdered, fibrous, granular, etc.

To enable the cathode gas diffusion layer 3b to serve as a binder, the cathode gas diffusion layer 3b preferably contains a binder resin of 5 wt % or more. To simplify conditions during a rolling process for making the cathode gas diffusion layer 3b have a uniform thickness, the cathode gas diffusion layer 3b preferably contains a binder resin of 50 wt % or less. From similar point of view, the cathode gas diffusion layer 3b preferably contains a binder resin of 10~30 wt %.

The cathode gas diffusion layer 3b may contain a dispersing solvent, a surfactant, etc., in addition to the binder resin and the electrically conductive particles. As the dispersing solvent, there are water, alcohol such as methanol or ethanol, glycol such as ethylene glycol. As the surfactant, non-ionic surfactant such as polyoxyethylene alkyl ether, zwitterionic surfactant, such as alkyl amine oxide. The amount of the dispersing solvent, and the amount of surfactant are suitably selectable depending on the material (carbon material) of the electrically-conductive particles constituting the cathode gas diffusion layer 3b, the kind of the binder resin (fluorinated resin), a blend ratio between the binder resin (fluorinated resin) and the electrically-conductive particles (carbon), etc. In general, as the dispersing solvent and the surfactant increases in amount, the binder resin (fluorinated resin) and the electrically-conductive particles (carbon) more easily disperse uniformly, but it is more likely that a flow property (fluidity) increases and it becomes difficult to form a sheet.

Hereinafter, a manufacturing method of the cathode gas diffusion layer 3b will be described.

The cathode gas diffusion layer 3b is manufactured in such a manner that a mixture of the binder resin and the electrically-conductive particles is kneaded, extruded rolled, and then calcined. To be specific, after the carbon which is the electrically-conductive particles, the dispersing solvent, and the surfactant are fed into a stirring and kneading machine, they are kneaded, crushed and made into particles, so that carbon is dispersed into the dispersing solvent. Then, the fluorinated resin which is the binder resin is fed into the stirring and kneading machine, and is stirred and kneaded to disperse carbon and fluorinated resin. The produced kneaded material is rolled into a sheet, and then calcined, so that the dispersing solvent and the surfactant are removed, thereby manufacturing the sheet forming the cathode gas diffusion layer 3b. Then, on the main surface of the sheet manufactured as described above, grooves constituting the oxidizing gas channels 9 are formed by a suitable method (e.g., molding using a press machine or the like and cutting using a cutting machine or the like), thereby forming the cathode gas diffusion layer 3b. The surfactant may be suitably selected depending on the kind of the material (carbon material) of the electrically-conductive particles, and the dispersing solvent, or the surfactant need not be used.

The cathode gas diffusion layer 3b manufactured as described above is adapted to have a porosity that is lower than that of a carbon fibrous base material impregnated with resin which is used in a gas diffusion layer in the conventional fuel cell but that allows reactive gas (oxidizing gas) to migrate therethrough. For this reason, the cathode gas diffusion layer 3b manufactured in the above manufacturing method adequately serves as a gas diffusion layer.

The pair of annular gaskets 7 which are made of fluorocarbon rubber are provided around the anode 4a and the cathode 4b (to be precise, anode gas diffusion layer 3a and cathode gas diffusion layer 3b) of the MEA 5 such that the gaskets 6 sandwich the polymer electrolyte membrane 1. This prevents the fuel gas and the oxidizing gas from leaking to outside the cell and prevents these gases from being mixed inside the fuel cell 100. Manifold holes (not shown) such as the oxidizing gas exhaust manifold hole are formed to penetrate the peripheral portions of the gaskets 7 in the thickness direction thereof. The shape of the gaskets 7 may be suitably selected so long as it can prevent the fuel gas and the oxidizing gas from leaking to outside the fuel cell 100 and prevent these gases from being mixed inside the fuel cell 100.

The electrically-conductive anode separator (first separator) 6a and the electrically-conductive cathode separator (second separator) 6b are provided to sandwich the MEA 5 and the gaskets 7. Thus, the MEA 5 is mechanically fastened and electric connection of the MEA 5 is formed in a state where a plurality of fuel cells 100 are stacked together in the thickness direction thereof. The separators 6a and 6b may be formed of a metal which is high in heat conductivity and electric conductivity, graphite or a mixture of graphite and resin. For example, a mixture of carbon powder and a binder (solvent) which is fabricated by injection molding or a plate material which is made of titanium or stainless steel and has a gold-plated surface may be used.

Groove-shaped fuel gas channels (first reaction gas channels) 8 are provided on one main surface (hereinafter referred to as inner surface) of the anode separator 6a which is in contact with the anode 4a to flow the fuel gas therethrough, while groove-shaped cooling medium channel(s) 10 is/are provided on the other main surface (hereinafter referred to as outer surface) of the anode separator 6a to flow a cooling medium therethrough. On one main surface (hereinafter referred to as inner surface) of the cathode separator 6b which contacts the cathode 4b, there are provided an upstream sub-gas channel 91 through which the oxidizing gas is supplied from the oxidizing gas supply manifold 33 to the oxidizing gas channel 9, and a downstream sub-gas channel 93 through which the oxidizing gas which has flowed through the oxidizing gas channel 9 is exhausted to the oxidizing gas exhaust manifold hole 34 (see FIG. 5). The cooling medium channel 10 may be configured as desired, and may have, for example, a serpentine shape or a straight-line shape. Although in Embodiment 1, the cooling medium channel 10 is provided on the outer surface of the anode separator 6a, the present invention is in no way limited to this, but may be provided on the outer surface of the cathode separator 6b, or may be provided on the outer surface of each of the anode separator 6a and the cathode separator 6b.

In the above configuration, the fuel gas and the oxidizing gas are supplied to the anode 4a and the cathode 4b, respectively, and these gases react with each other to generate electricity and heat. A cooling medium such as cooling water is flowed through the cooling medium channel 10 to recover the generated heat.

The fuel cell 100 configured as described above may be used as a single cell, or otherwise a plurality of fuel cells 100 may be stacked together to form the fuel cell stack 61. Although in Embodiment 1, the first separator is the anode separator 6a, the second separator is the cathode separator 6b, the first reaction gas channel is the fuel gas channel 8 and the second reaction gas channel is the oxidizing gas channel 9, the present invention is not limited this, but the first separator may be the cathode separator 6b, the second separator may be the anode separator 6a, the first reaction gas channel may be the oxidizing gas channel 9 and the second reaction gas channel may be the fuel gas channel 8.

[Configuration of Reaction Gas Channel and Separator]

Next, the oxidizing gas channel 9 provided on the cathode 4b, the cathode separator 6b and the anode separator 6a will be discussed in detail with reference to FIGS. 2 to 7.

Figure 4:
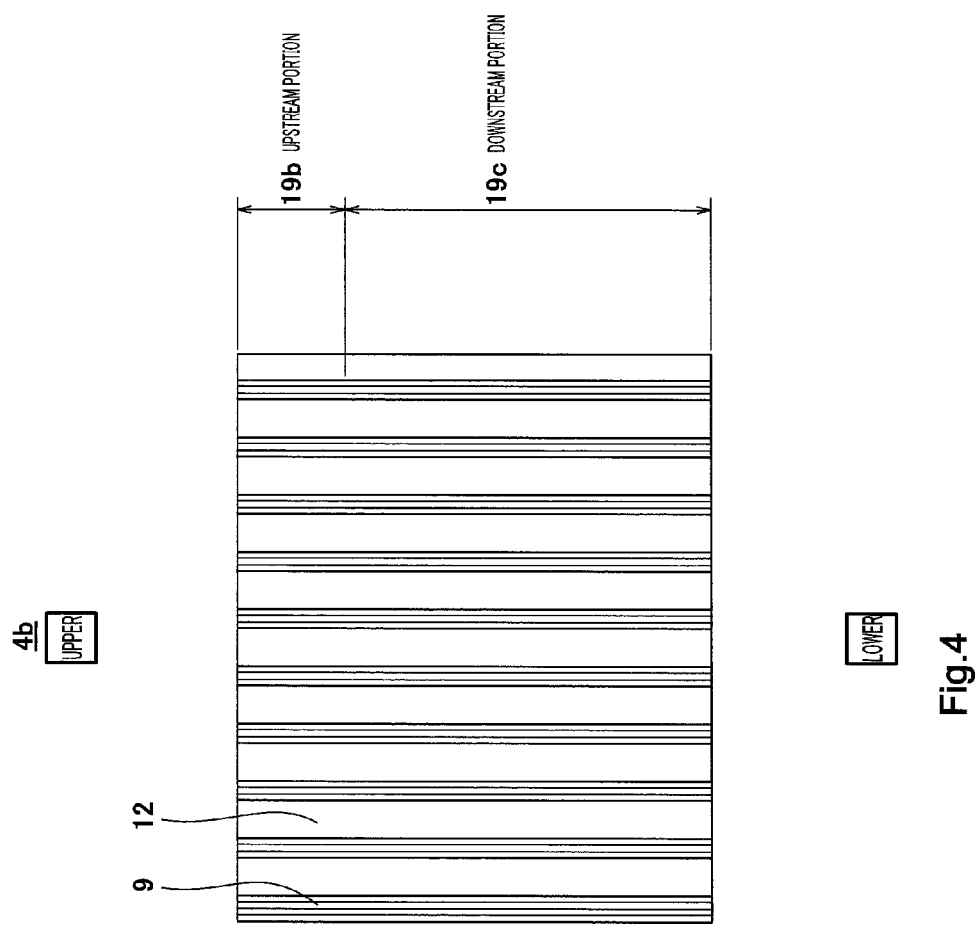
FIG. 4 is a schematic view showing a cathode of the polymer electrolyte fuel cell of FIG. 2.
Figure 5:
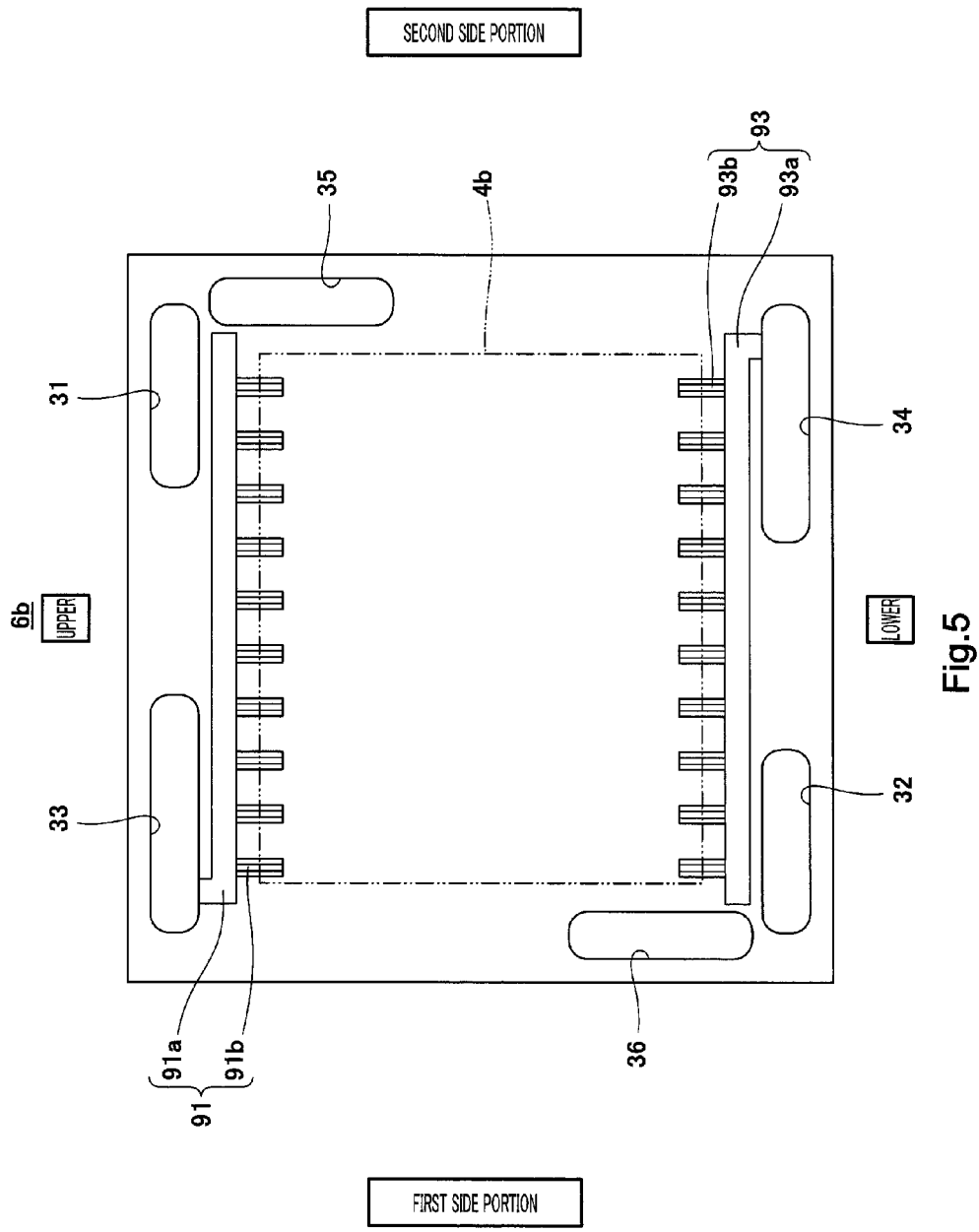
FIG. 5 is a schematic view showing a configuration of a cathode separator of the polymer electrolyte fuel cell of FIG. 2.
Figure 6:
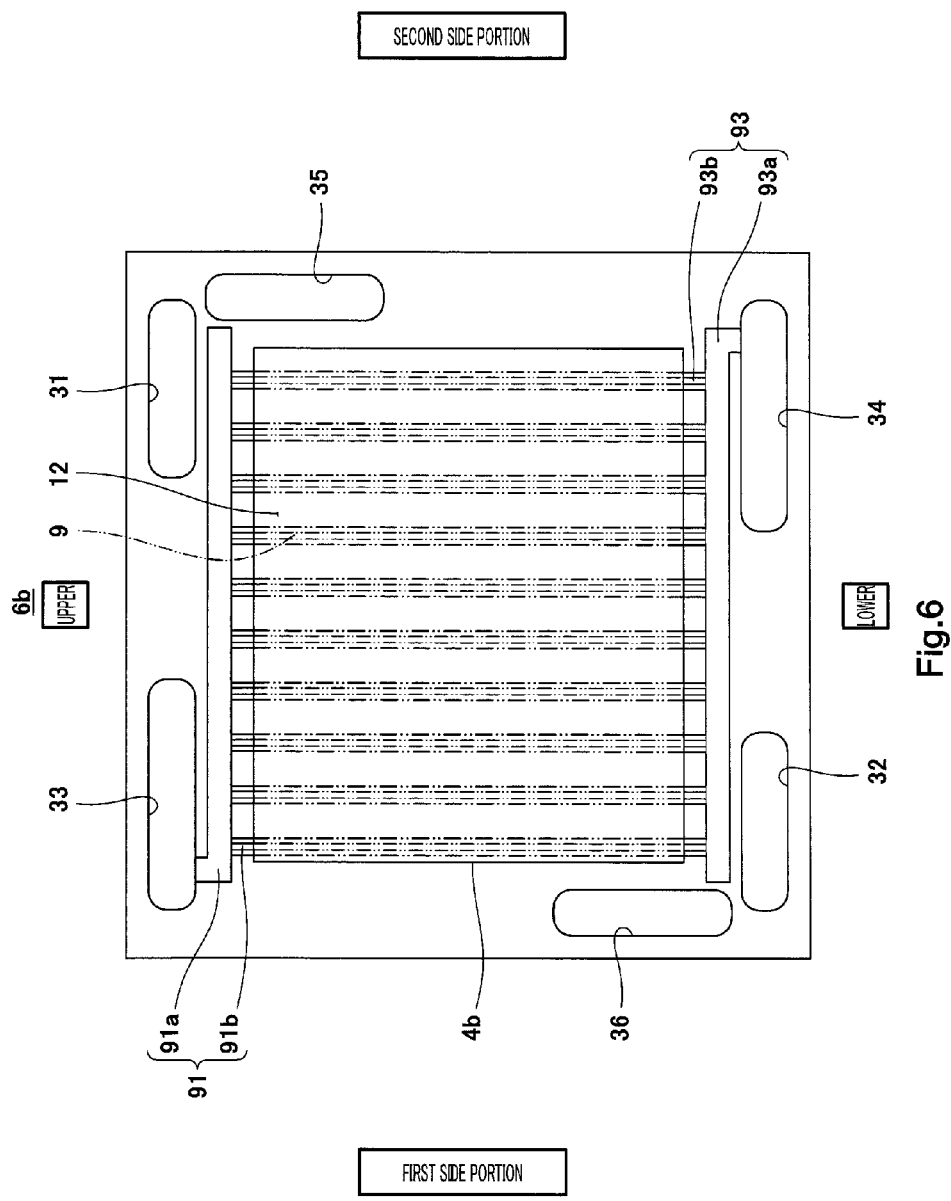
FIG. 6 is a schematic view of a cathode separator and a cathode in the polymer electrolyte fuel cell of FIG. 2, which are drawn to overlap with each other in a see-through manner when viewed in a thickness direction of the cathode separator.

FIG. 4 is a schematic view showing a schematic configuration of the cathode 4b of the fuel cell 100 of FIG. 2. FIG. 5 is a schematic view showing a configuration of the cathode separator 6b of the fuel cell 100 of FIG. 2. FIG. 6 is a schematic view of the cathode separator 6b and the cathode 4b in the fuel cell 100 of FIG. 2, which are drawn to overlap with each other in a see-through manner when viewed in a thickness direction of the cathode separator 6b. In FIGS. 4 and 6, upper and lower sides of the cathode separator 6b are depicted as upper and lower sides of FIGS. 4 and 6, while in FIG. 5, the upper and lower sides of the cathode 4b are depicted as the upper and lower sides of FIG. 5. In FIG. 6, the oxidizing gas channel 9 is indicated by an imaginary line (two-dotted line).

The configuration of the oxidizing gas channel 9 provided on the cathode 4b, and the configuration of the cathode separator 6b will be discussed in detail with reference to FIGS. 2 to 4.

As shown in FIG. 4, on the main surface of the cathode 4b (to be precise, cathode gas diffusion layer 3b), the groove-shaped oxidizing gas channels 9 extend in a straight-line shape vertically. The oxidizing gas channels 9 are each configured such that the groove forming the oxidizing gas channel 9 has a cross-section (cross-section of the groove forming the oxidizing gas channel 9 in a direction perpendicular to a flow direction of the oxidizing gas) having a tapered shape being narrower from a bottom surface toward an opening. Although in Embodiment 1, the cross-section of the oxidizing gas channel 9 has a tapered shape, the present invention is in no way limited to this but the cross-section may have a rectangular shape. A portion between the grooves constituting the oxidizing gas channels 9 forms a second rib portion 12.

The oxidizing gas channels 9 are formed in such a manner that a plurality of straight-line-shaped second rib portions 12 run along each other. As used herein, a phrase "second rib portions 12 run along each other" means that they are arranged side by side. In other words, among the plurality of second rib portions 12, a certain second rib portion 12 is specified and another second rib 12 runs along the specified second rib portion 12. The phrase "The oxidizing gas channels 9 are formed such that a plurality of straight-line-shaped second rib portions 12 run along each other" refers to a structure in which a plurality of oxidizing gas channels are provided such that the oxidizing gas flows through respective channels in substantially the same direction as a whole in a direction from upstream ends to downstream ends. Therefore, the plurality of oxidizing gas channels do not have to run along each other over the entire channels from their upstream ends to their downstream ends thereof, but may have a portion where they do not run along each other.

The oxidizing gas channel 9 includes an upstream portion 19b and a downstream portion 19c. The upstream portion 19b is at least a portion extending between an upstream end of the oxidizing gas channel 9 which is one end thereof, and a portion satisfying a formula: $L1 \leq \{(\frac{2}{3}) \times L2\}$ which is an opposite end thereof, although its downstream end is different depending on a configuration such as a width of the oxidizing gas channel 9, a dew point of the reaction gas, a temperature of the cooling medium, etc. In the above formula, L1 indicates a passage length of the upstream portion 19b of the oxidizing gas channel 9 and L2 indicates the overall passage length of the oxidizing gas channel 9. The opposite end of the upstream portion 19b is preferably a portion satisfying a formula: $L1 \leq L2$.

The downstream portion 19c is a portion extending between a downstream end of the oxidizing gas channel 9 which is one end thereof, and a portion satisfying a formula: $L3 \leq \{(\frac{1}{3}) \times L2\}$ which is an opposite end thereof. In the above formula, L3 indicates the passage length of the downstream portion 19c of the oxidizing gas channel 9.

As shown in FIG. 5, the cathode separator 6b is formed by a plate and has a substantially quadrilateral (in this embodiment rectangular) shape. Manifold holes such as the fuel gas supply manifold hole 31 are provided in the peripheral portion of the cathode separator 6b to penetrate therethrough in the thickness direction thereof. To be specific, at an upper portion of one side portion (hereinafter referred to as first side portion) of the cathode separator 6b, an oxidizing gas supply manifold hole 33 is provided, while at a lower portion thereof, a cooling medium discharge manifold hole 36 is provided. Below and inward relative to the cooling medium discharge manifold hole 36 on the cathode separator 6b, a fuel gas exhaust manifold hole 32 is provided. At the upper portion of the other side portion (second side portion) of the cathode separator 6b, a cooling medium supply manifold hole 35 is provided, while at a lower portion thereof, an oxidizing gas exhaust manifold hole 34 is provided. Inward relative to and above the cooling medium supply manifold hole 35 on the cathode separator 6b, a fuel gas supply manifold hole 31 is provided.

As shown in FIGS. 5 and 6, on the inner surface of the cathode separator 6b, a groove-shaped upstream sub-gas channel 91 and a groove-shaped downstream sub-gas channel 93 are provided to communicate with the oxidizing gas channels 9. The upstream end of the upstream sub-gas channel 91 is connected to the oxidizing gas supply manifold hole 33, while the downstream end thereof communicates with the oxidizing gas channels 9 (its upstream end side). The upstream sub-gas channel 91 has communicating portions 91b communicating with the plurality of oxidizing gas channels 9, respectively, and a dividing portion 91a for allowing the oxidizing gas to be divided to flow to the communicating portions 91b. Like the oxidizing gas channel 9, the communicating portions 91b are configured such that the groove each forming the communicating portion 91b has a cross-section having a tapered shape being narrower from a bottom surface toward an opening. The upstream end of the downstream sub-gas channel 93 communicates with the oxidizing gas channel 9 (its downstream end side), while the downstream end thereof is connected to the oxidizing gas exhaust manifold hole 34. The downstream sub-gas channel 93 has communicating portions 93b communicating with the plurality of oxidizing gas channels 9, respectively, and a joint portion 93a where the oxidizing gases from the communicating portions 93b are joined together. Like the oxidizing gas channel 9, the communicating portions 93b are configured such that the groove each forming the communicating portion 93b has a cross-section having a tapered shape being narrower from a bottom surface toward an opening. Although in Embodiment 1, the communicating portion 91b and the communicating portion 93b are formed to have the tapered cross-sectional shape, the shape is in no way limited to this, but may be a rectangular shape.

Next, the configuration of the anode separator 6a will be described in detail with reference to FIGS. 2, 3 and 7.

Figure 7:
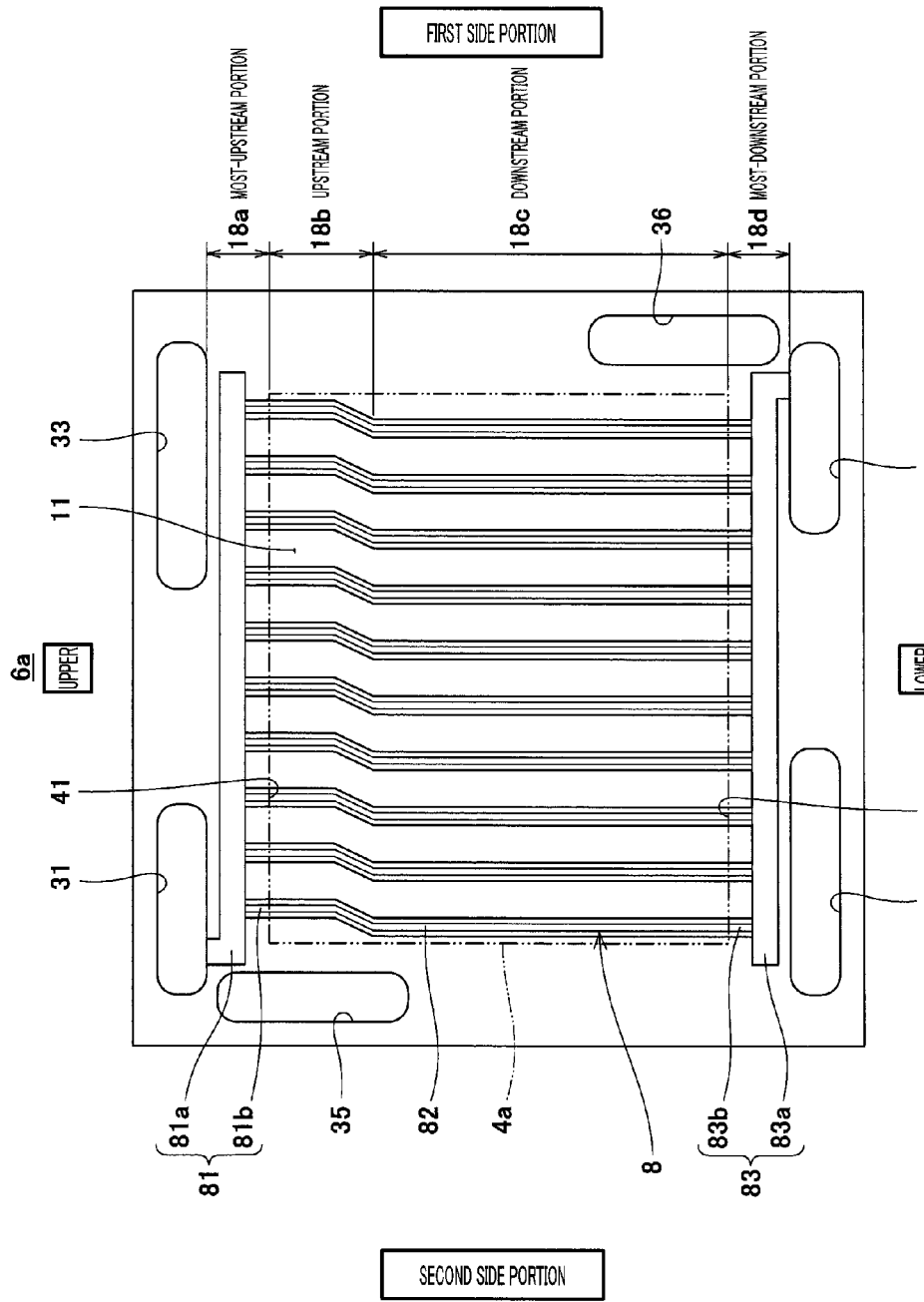
FIG. 7 is a schematic view showing a configuration of an anode separator of the polymer electrolyte fuel cell of FIG. 2.

FIG. 7 is a schematic view showing the configuration of the anode separator 6a of the fuel cell 100 of FIG. 2. In FIG. 7, upper and lower sides of the anode separator 6a are depicted as upper and lower sides of FIG. 7.

As shown in FIG. 7, the anode separator 6a is formed by a plate and has a substantially quadrilateral (in this embodiment rectangular) shape. Manifold holes such as the fuel gas supply manifold hole 31 are provided in the peripheral portion of the anode separator 6a to penetrate therethrough in the thickness direction thereof. The arrangement of the manifold holes is the same as that of the cathode separator 6b and will not be described in detail.

Groove-shaped fuel gas channels 8 are formed on the inner surface of the anode separator 6a to have a straight-line shape. The fuel gas channel 8 and the oxidizing gas channel 9 form a so-called parallel flow. As used herein, the parallel flow refers to a structure in which the fuel gas channel 8 and the oxidizing gas channel 9 have portions where the oxidizing gas and the fuel gas flow in opposite directions but flows from upstream to downstream substantially in the same direction macroscopically (as a whole) when viewed in the thickness direction of the fuel cell 100.

The fuel gas channels 8 include an upstream sub-gas channel 81, a downstream sub-gas channel 83, and a plurality of communicating gas channels 82 for allowing communication between the upstream sub-gas channel 81 and the downstream sub-gas channel 83. The upstream end of the upstream sub-gas channel 81 is connected to the fuel gas supply manifold hole 31 and constitutes the upstream end of the fuel gas channel 8. The upstream sub-gas channel 81 includes communicating portions 81b communicating with the plurality of communicating gas channels 82, respectively, and a dividing portion 81a for allowing the fuel gas to be divided to flow to the communicating portions 81b. The communicating portions 81b are configured such that the groove each forming the communicating portion 81b has a cross-section having a tapered shape being narrower from a bottom surface toward an opening. The downstream end of the downstream sub-gas channel 83 is connected to the fuel gas exhaust manifold hole 32 and constitutes the downstream end of the fuel gas channel 8. The downstream sub-gas channel 83 has communicating portions 83b communicating with the plurality of communicating gas channels 82, respectively, and a joint portion 83a where the fuel gases from the communicating portions 83b are joined together. The communicating portions 83b are configured such that the groove each forming the communicating portion 83b has a cross-section having a tapered shape being narrower from a bottom surface toward an opening. The communicating gas channels 82 extend vertically in a substantially straight-line shape (S-shape), and are configured such that the groove each forming the communicating gas channel 82 has a cross-section having a tapered shape being narrower from a bottom surface toward an opening. A portion between the grooves forming the communicating gas channels 82 forms a first rib portion 11. Although in Embodiment 1, the cross-section of the communicating portion 81b, the cross-section of the communicating gas channel 82, and the cross-section of the communicating portion 83 have tapered shapes, respectively, the present invention is in no way limited to this, but these cross-sections may have for example, a rectangular shape.

The fuel gas channels 8 are formed such that a plurality of straight-line shaped first rib portions 11 run along each other. As used herein, the phrase "first rib portions 11 run along each other" means that a certain first rib portion 11 is specified, among the plurality of first rib portions 11, and another first rib portion 11 extends along the specified first rib portion 11. The phrase "the fuel gas channels 8 are formed such that a plurality of straight-line-shaped first rib portions 11 run along each other" refers to a structure in which a plurality of communicating gas channels forming the fuel gas channels are provided such that the fuel gas flows in substantially the same direction as a whole in a direction from their upstream ends to their downstream ends. Therefore, the plurality of communicating gas channels do not have to entirely run along each other, but may have a portion where they do not run along each other. Note that in Embodiment 1, the first rib portions 11 and the second rib portions 12 are formed in such a manner that they run along each other when viewed in the thickness direction of the anode separator 6a.

The fuel gas channel 8 includes a most-upstream portion 18a, an upstream portion 18b, a downstream portion 18c, and a most-downstream portion 18d. The upstream end of the most-upstream portion 18a is the fuel gas supply manifold hole 31 which is the upstream end of the fuel gas channel 8, while a downstream end thereof is a portion 41 facing the anode 4a first from the upstream end of the fuel gas channel 8 when viewed in the thickness direction of the anode separator 6a. The downstream end of the most-downstream portion 18d is the fuel gas exhaust manifold hole 32 which is the downstream end of the fuel gas channel 8, while the upstream end thereof is a portion 42 facing the anode 4a first in a direction from the downstream end to the upstream end of the fuel gas channel 8, when viewed in the thickness direction of the anode separator 6a.

The upstream portion 18b is at least a portion extending between the portion 41 which is one end thereof, and a portion satisfying a formula: $L4 \leq \{(2/3) \times L5\}$ which is an opposite end thereof, although its downstream end is different depending on a configuration such as a width of the fuel gas channel 8, a dew point of the reaction gas, a temperature of the cooling medium, etc. In the above formula, L4 indicates a passage length of the upstream portion 18b of the fuel gas channel 8 and L5 indicates a passage length between the portion 41 and the portion 42 in the fuel gas channel 8.

The downstream portion 18c is a portion between the portion 42 which is one end thereof and a portion satisfying a formula: $L6 \leq \{(1/3) \times L5\}$ which is an opposite end thereof. In the above formula, L6 indicates a passage length of the downstream portion 18c of the fuel gas channel 8.

Next, the communicating gas channel 82 of the fuel gas channel 8 will be described in more detail with reference to FIGS. 7 and 8.

Figure 8:
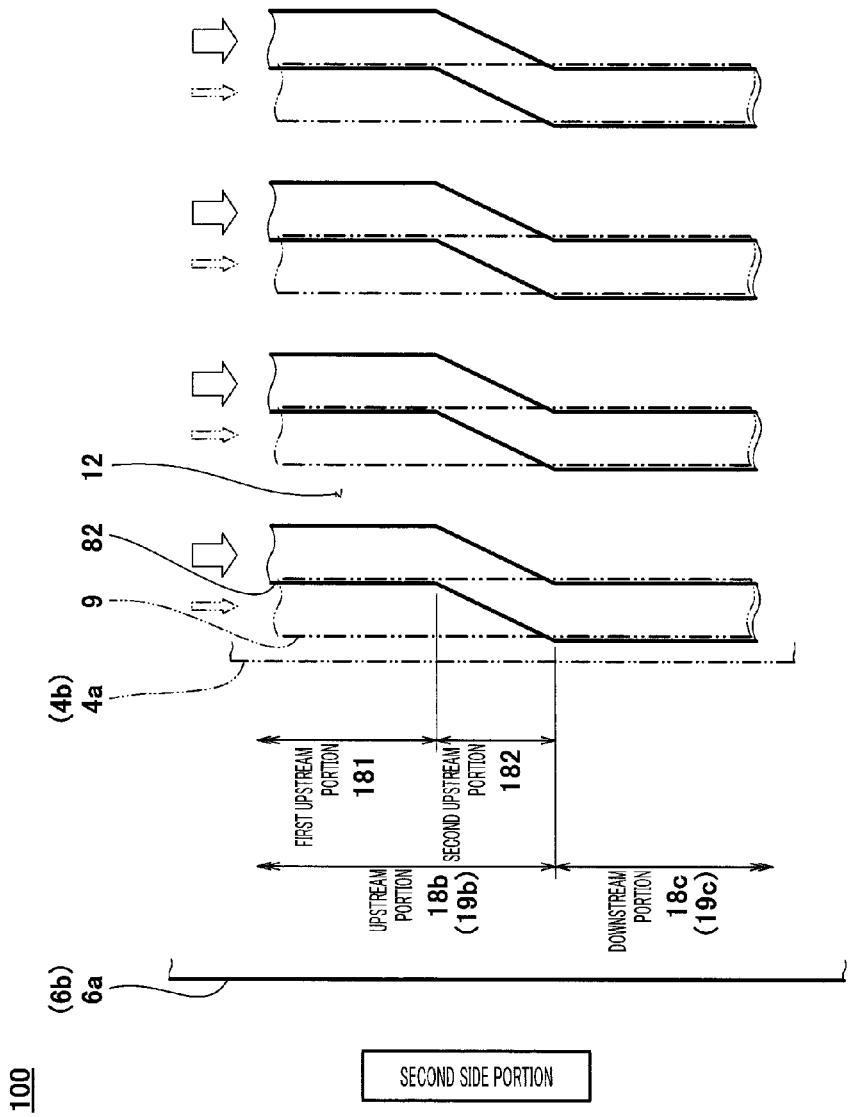
FIG. 8 is a schematic view showing a configuration of the polymer electrolyte fuel cell of Embodiment 1.

FIG. 8 is a schematic view showing a configuration of the fuel cell 100 of Embodiment 1. In FIG. 8, only a part of the fuel cell 10 is depicted, and the anode separator 6a and the cathode separator 6b are drawn in a see-through manner when viewed in the thickness of the fuel cell 100 (anode separator 6a). In FIG. 8, to allow the fuel gas channel 8 and the oxidizing gas channel 9 to be easily seen, they are deviated from each other in a horizontal direction.

As shown in FIGS. 7 and 8, the communicating gas channel 82 of the fuel gas channel 8 includes the upstream portion 18b and the downstream portion 18c. The upstream portion 18b includes a first upstream portion 181 and a second upstream portion 182. The first upstream portion 181 is at least a portion extending between the portion 41 which is one end thereof, and a portion satisfying a formula: $L7 \leq \{(2/3) \times L4\}$ which is an opposite end thereof, although its downstream end is different depending on a configuration such as a width of the fuel gas channel 8, a dew point of the reaction gas, a temperature of the cooling medium, etc. In the above formula, L4 indicates a passage length of the upstream portion 18b of the fuel gas channel 8 and L7 indicates a passage length of the first upstream portion 181 of the fuel gas channel 8. The length of the first upstream portion 181 is preferably large to suppress degradation of the polymer electrolyte membrane 1.

The ratio of the fuel gas channel width of at least the upstream portion 18b of the fuel gas channel 8 to the second rib portion 12 is greater than 0 and not greater than 1. To be specific, the ratio of the fuel gas channel width of the upstream portion 18b of the fuel gas channel 8 to the second rib portion 12 is set greater than the ratio of the fuel gas channel width of the downstream portion 18c of the fuel gas channel 8 to the second rib portion 12, and the ratio of the fuel gas channel width of the upstream portion 18b of the fuel gas channel 8 to the second rib portion 12 is set to a predetermined ratio. The predetermined ratio is greater than 0 and not greater than 1.

To be specific, the communicating gas channel 82 is configured in such a manner that the first upstream portion 181 overlaps with (faces) the second rib portion 12 when viewed in the thickness direction of the anode separator 6a. Also, the communicating gas channel 82 is configured in such a manner that the second upstream portion 182 partially faces the second rib portion 12 (to be precise, the fuel gas is allowed to flow obliquely from the first side portion toward the second side portion) when viewed in the thickness direction of the anode separator 6a. Further, the communicating gas channel 82 is configured in such a manner that the downstream portion 18c overlaps with (faces) the oxidizing gas channel 9.

In other words, the communicating gas channel 82 of the fuel gas channel 8 is configured in such a manner that the ratio of the fuel gas channel width of the first upstream portion 181 of the fuel gas channel 8 to the second rib portion is set to a first predetermined ratio, and the ratio of the fuel gas channel width of the second upstream portion 182 of the fuel gas channel 8 to the second rib portion is set to a second predetermined ratio, when viewed in the thickness direction of the anode separator 6a. The second predetermined ratio is set smaller than the first predetermined ratio. To be more specific, the communicating gas channel 82 of the fuel gas channel 8 is configured in such a manner that the first predetermined ratio is set to 1 in the first upstream portion 181 and the second predetermined ratio is set greater than 0 and less than 1 in the second upstream portion 182 when viewed in the thickness direction of the anode separator 6a. The downstream portion 18c of the communicating gas channel 82 is configured such that the ratio of the fuel gas channel width of the downstream portion 18c to the second rib portion 12 is set to 0, when viewed in the thickness direction of the anode separator 6a.

With the above configuration, when viewed in the thickness direction of the anode separator 6a, a portion where the first rib portion 11 and the second rib portion 12 overlap with each other, and a portion where they do not overlap with each other, are formed uniformly, thereby suppressing a pressure from being applied to the polymer electrolyte membrane 1 unevenly. As a result, degradation of the polymer electrolyte membrane 1 can be suppressed.

Next, the advantages of the fuel cell stack 61 (fuel cell 100) of Embodiment 1 will be discussed with reference to FIGS. 1 to 8.

[Advantages of Fuel Cell Stack (Fuel Cell)]

As stated above, in the fuel cell 100 and the fuel cell stack 61 including the fuel cell 100 according to Embodiment 1 ((hereinafter simply referred to as fuel cell 100 (fuel cell stack 61) according to Embodiment 1)), in a case where the fuel cell stack 61 is operated especially under conditions of a high-temperature and a low humidity (a dew point of the fuel gas flowing through the fuel gas channel 8 and a dew point of the oxidizing gas flowing through the oxidizing gas channel 9 are lower than a temperature of a cooling medium (in the present embodiment, water) flowing through the cooling medium channel 10, the upstream portion 18b of the fuel gas channel 8 overlaps with the second rib portion 12 formed on the cathode separator 6b in a passage width direction when viewed in the thickness direction of the anode separator 6a, while the downstream portion 18c of the fuel gas channel does not overlap with the second rib portion 12 formed on the cathode separator 6b in a passage width direction when viewed in the thickness direction of the anode separator 6a.

With this configuration, when viewed in the thickness direction of the anode separator 6a, water migrates from a portion of the cathode 4b, which overlaps with the second rib portion 12, to a portion of the anode 4a which faces the upstream portion 18b of the fuel gas channel 8. Because of this structure, it is possible to suppress a portion of the polymer electrolyte membrane 1 which faces the upstream portion 18b of the fuel gas channel 8, from getting dried, and suppress degradation of the portion of the polymer electrolyte membrane 1. In the same manner, water migrates from a portion of the anode 4a which contacts the first rib portion 11 of the fuel gas channel 8, to a portion of the cathode 4b which overlaps with the oxidizing gas channel 9, when viewed in the thickness direction of the anode separator 6a. Because of this, it is possible to suppress a portion of the polymer electrolyte membrane 1 which faces the oxidizing gas channel 9, from getting dried, and to suppress degradation of the portion of the polymer electrolyte membrane 1.

In the fuel cell 100 (fuel cell stack 61) according to Embodiment 1, when viewed in the thickness direction of the anode separator 6a, a portion where the first rib portion 11 and the second rib portion 12 overlap with each other, and a portion where they do not overlap with each other, are formed uniformly, thereby suppressing a pressure from being applied to the polymer electrolyte membrane 1 unevenly. As a result, degradation of the polymer electrolyte membrane 1 can be suppressed.

In the fuel cell 100 (fuel cell stack 61) according to Embodiment 1, since the first rib portion 11 formed between the downstream portions 18c of the fuel gas channel 8 and the second rib portion 12 formed between the oxidizing gas channels 9 overlap with each other, it is possible to suppress a stress from concentrating on the portion of the anode 4a and the portion of the cathode 4b in the MEA 5 which contact the end portion of the first rib portion 11 and the end portion of the second rib portion 12, respectively, and hence suppress a mechanical stress from being applied to the polymer electrolyte membrane 1. As a result, degradation of the polymer electrolyte membrane 1 which would be otherwise caused by the mechanical stress can be suppressed.

Embodiment 2

Figure 9:
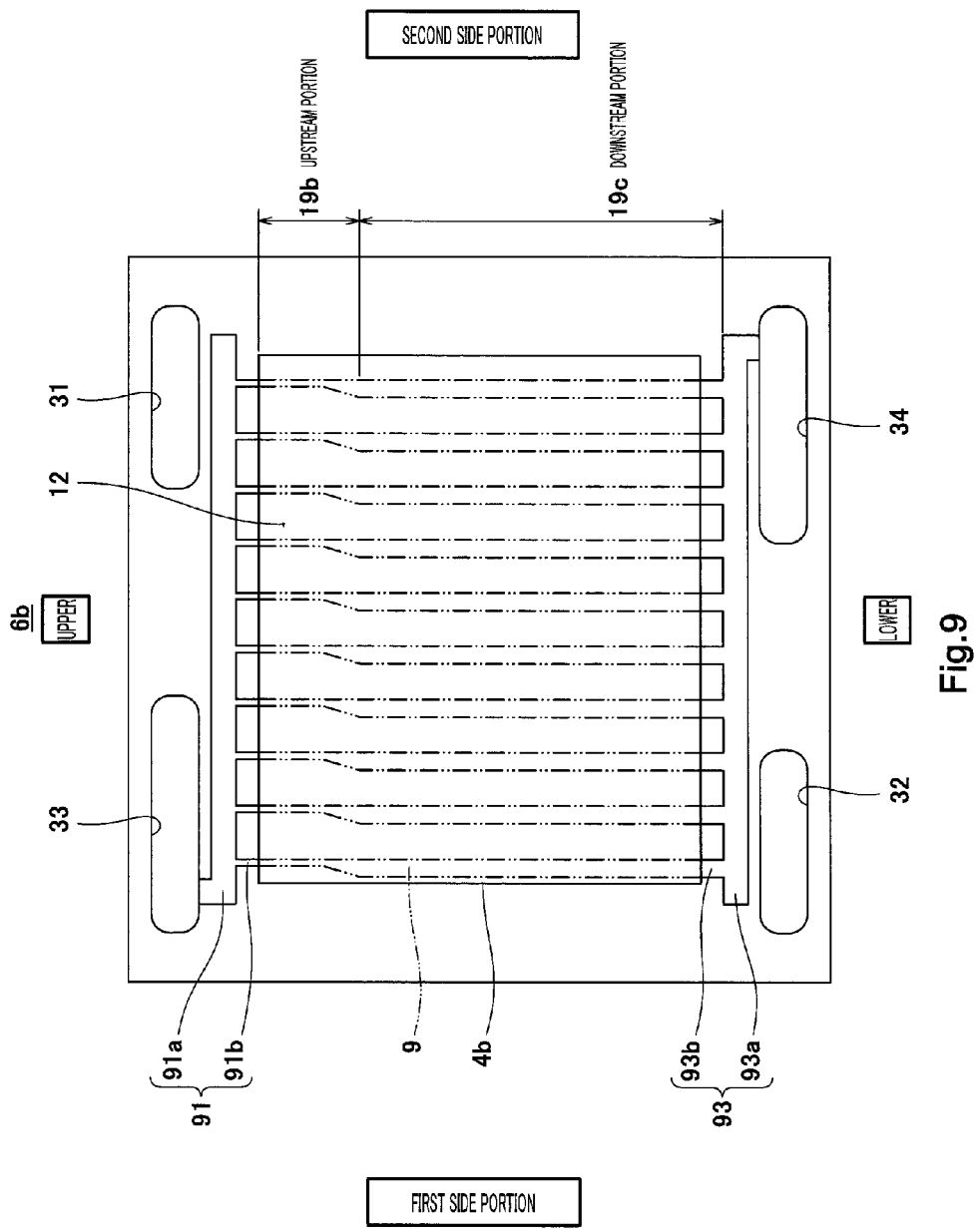
FIG. 9 is a schematic view of a cathode separator and a cathode in the fuel cell stack according to Embodiment 2 of the present invention, which are drawn to overlap with each other in a see-through manner when viewed in a thickness direction of the cathode separator.
Figure 10:
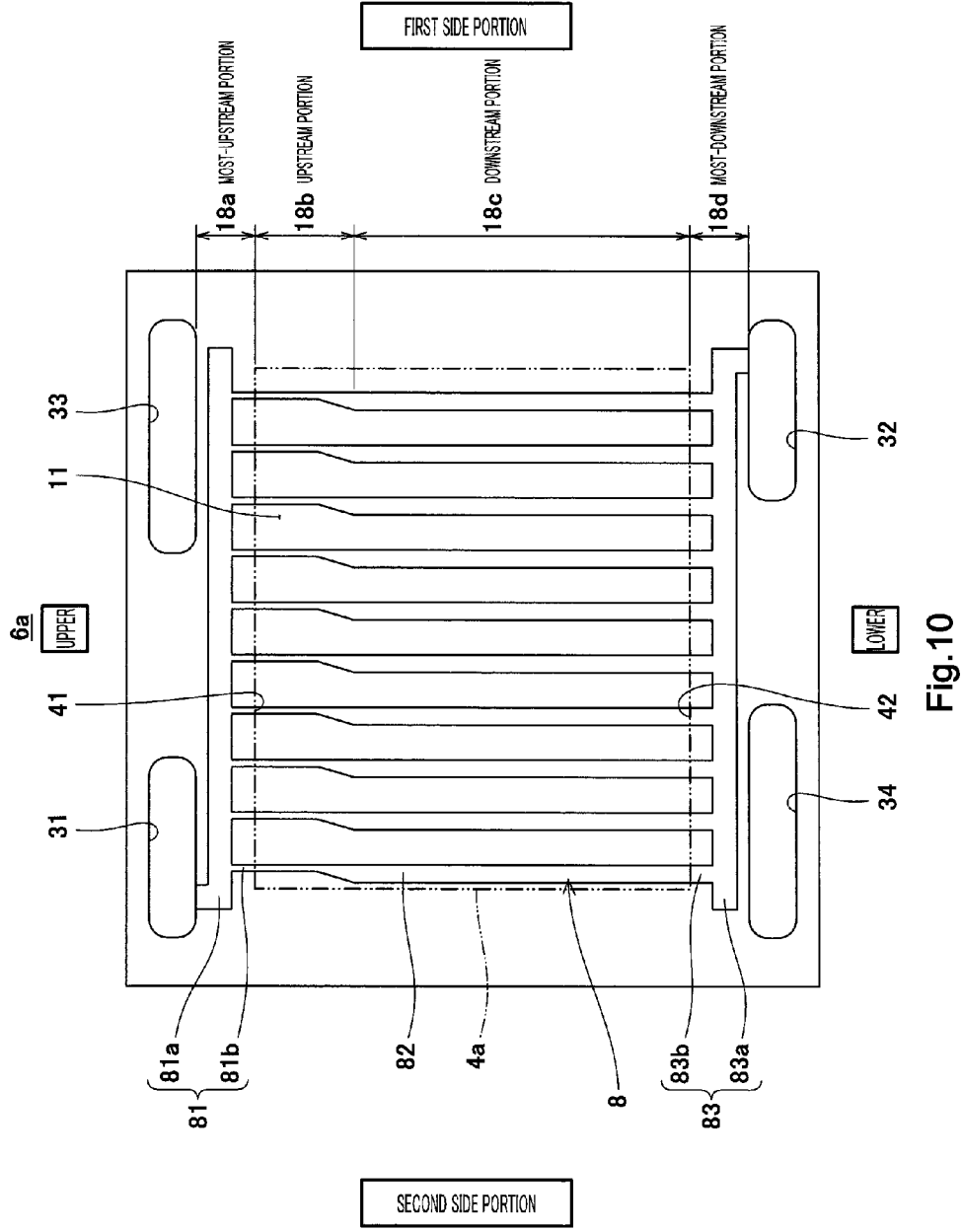
FIG. 10 is a schematic view showing a configuration of an inner surface of an anode separator of the fuel cell stack according to Embodiment 2 of the present invention.
Figure 11:
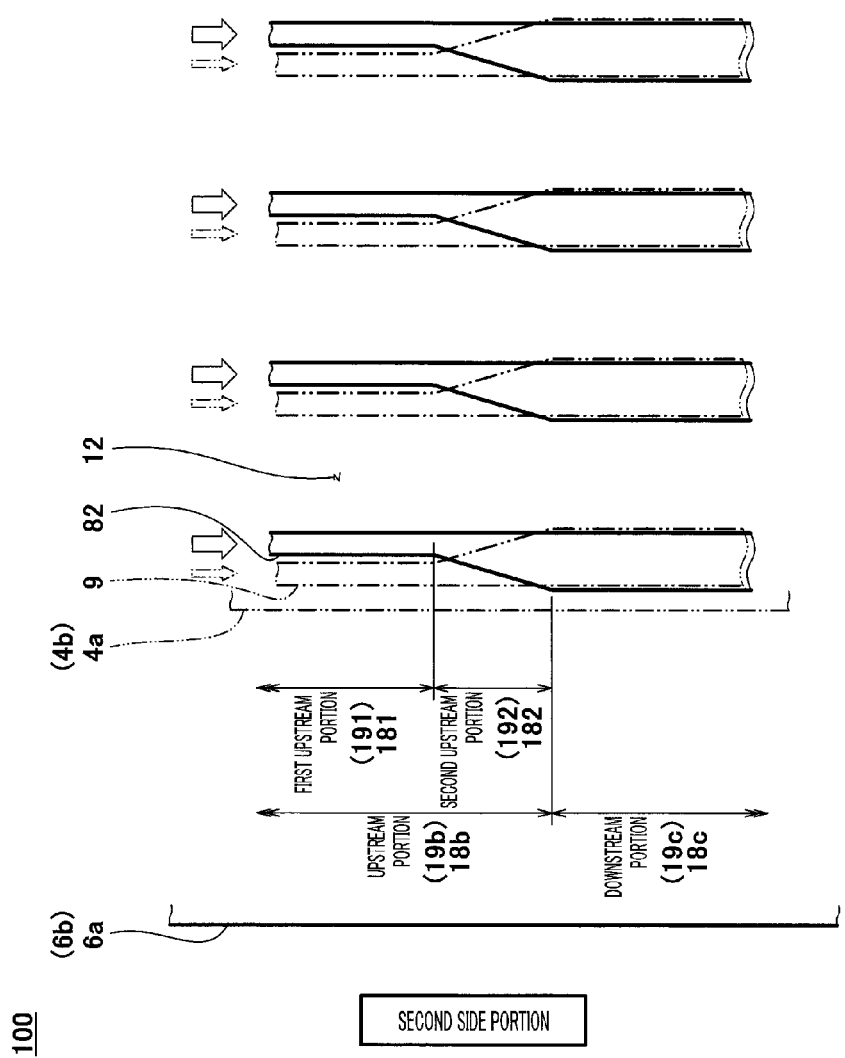
FIG. 11 is a schematic view showing a configuration of the polymer electrolyte fuel cell according to Embodiment 2 of the present invention.

FIG. 9 is a schematic view of a cathode separator and a cathode in a fuel cell stack according to Embodiment 2 of the present invention, which are drawn to overlap with each other in a see-through manner when viewed in a thickness direction of the cathode separator. FIG. 10 is a schematic view showing a configuration of an inner surface of an anode separator of the fuel cell stack according to Embodiment 2 of the present invention. FIG. 11 is a schematic view showing a configuration of the fuel cell according to Embodiment 2 of the present invention. In FIG. 9, upper and lower sides of the cathode separator are depicted as upper and lower sides of FIG. 9. In FIG. 10, upper and lower sides of the anode separator are depicted as upper and lower sides of FIG. 10. In FIGS. 9 and 10, the cooling medium supply manifold hole and the cooling medium discharge manifold hole are omitted. In FIG. 11, only a part of the fuel cell is depicted, and the anode separator and the cathode separator are drawn in a see-through manner, when viewed in the thickness direction of the fuel cell (anode separator). In FIG. 11, to allow the fuel gas channel and the oxidizing gas channel to be easily seen, they are deviated from each other in a horizontal direction.

As shown in FIGS. 9 and 11, the fuel cell stack 61 (fuel cell 100) according to Embodiment 2 of the present invention has a configuration which is basically the same as that of the fuel cell stack 61 (fuel cell 100) according to Embodiment 1, but is different from the same in a configuration of the oxidizing gas channel 9 and the communicating gas channel 82 of the fuel gas channel 8.

To be specific, the oxidizing gas channel 9 includes an upstream portion 19b and a downstream portion 19c. The upstream portion 19b includes a first upstream portion 191 and a second upstream portion 192. The first upstream portion 191 is at least a portion extending between the upstream end of the oxidizing gas channel 9 which is one end thereof and a portion satisfying a formula: $L8<\{(\frac{2}{3})\times L1\}$ which is an opposite end thereof, although the downstream end of the oxidizing gas channel 9 is different depending on a configuration such as a width of the oxidizing gas channel 9, a dew point of the reaction gas, a temperature of the cooling medium, etc. In the above formula, L8 indicates a passage length of the first upstream portion 191 of the oxidizing gas channel 9 and L1 indicates a passage length of the upstream portion 18b of the oxidizing gas channel 9. The length of the first upstream portion 191 is preferably large to suppress degradation of the polymer electrolyte membrane 1.

The first upstream portion 191 of the oxidizing gas channel 9 overlaps with (faces) the inner surface (first rib portion 11) of the anode separator 6a, when viewed in the thickness direction of the anode separator 9a. To be specific, the first upstream portion 191 of the oxidizing gas channel 9 has a passage width smaller than a passage width of the downstream portion 19c of the oxidizing gas channel 9, and is deviated from the communicating gas channel 82 of the fuel gas channel 8 toward the second side portion. The second upstream portion 192 of the fuel gas channel 8 partially faces the first rib portion 11. The downstream portion 19c of the oxidizing gas channel 9 overlaps with (faces) the communicating gas channel 82 of the fuel gas channel 8.

Likewise, the communicating gas channel 82 of the fuel gas channel 8 is configured such that the first upstream portion 181 overlaps with (faces) the second rib portion 12 when viewed in the thickness direction of the anode separator 6a. The communicating gas channel 82 of the fuel gas channel 8 is configured such that the second upstream portion 182 partially overlaps with (faces) the second rib portion 12 when viewed in the thickness direction of the anode separator 6a. The communicating gas channel 82 of the fuel gas channel 8 is configured such that the downstream portion 18c partially overlaps with (faces) the downstream portion 19c of the oxidizing gas channel 9 when viewed in the thickness direction of the anode separator 6a.

The fuel cell stack 61 (fuel cell 100) according to Embodiment 2 configured as described above can achieve the same advantages as those achieved by the fuel cell stack 61 (fuel cell 100) according to Embodiment 1.

In Embodiment 2, the communicating gas channel 82 of the fuel gas channel 8 is configured such that a passage width from its upstream end to the downstream end of the first upstream portion 181 is substantially a half of a passage width of the downstream portion 18c of the fuel gas channel 8, while the first upstream portion 191 of the oxidizing gas channel 9 is configured such that its passage width is substantially a half of a passage width of the downstream portion 19c of the oxidizing gas channel 9. Although in Embodiment 2, the communicating gas channel 82 of the fuel gas channel 8, the oxidizing gas channel 9, the communicating portion 91b, and the communicating portion 93b have rectangular cross-sections in a direction perpendicular to the direction in which the reaction gas flows, the present invention is in no way limited to this, but they may have tapered cross-sections like Embodiment 1.

Embodiment 3

Figure 12:
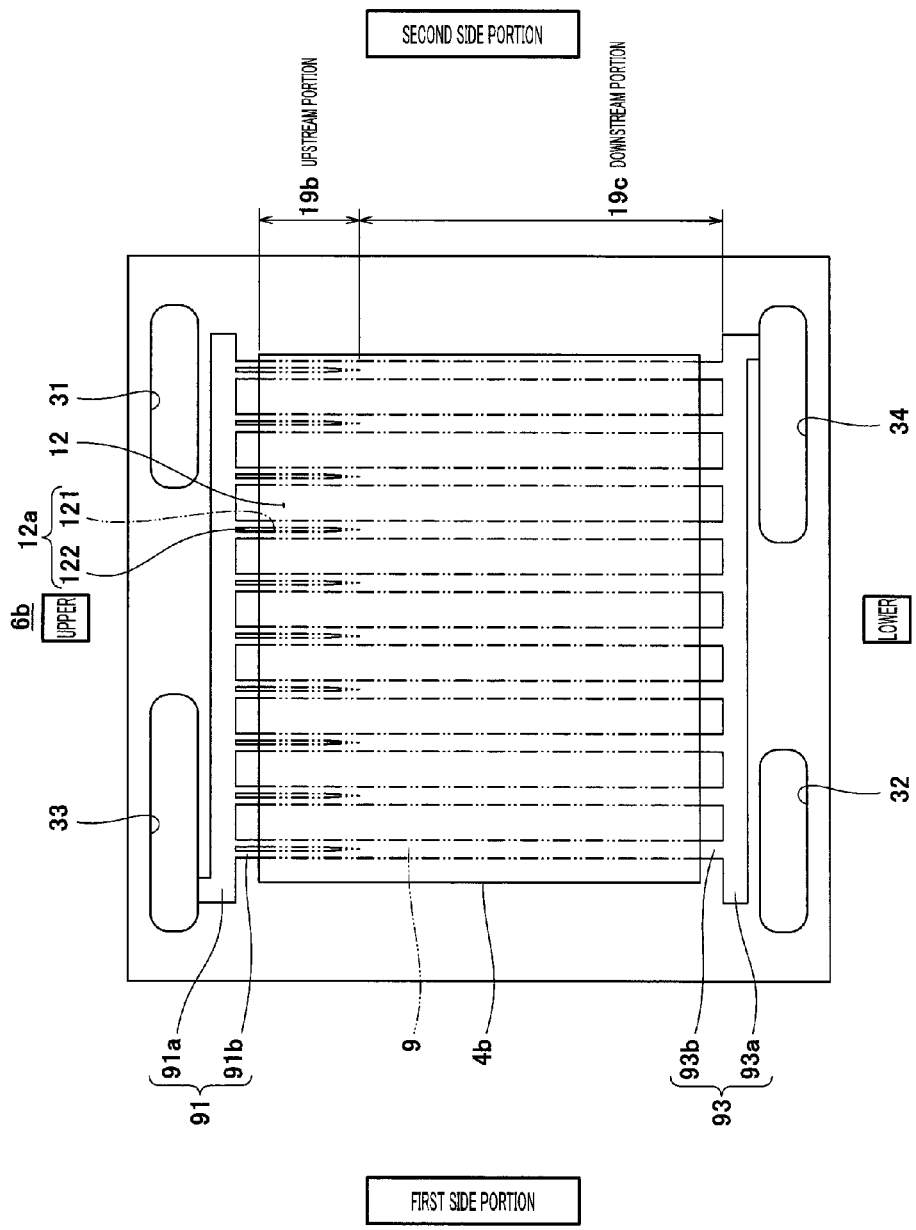
FIG. 12 is a schematic view of a cathode separator and a cathode in a fuel cell stack according to Embodiment 3 of the present invention, which are drawn to overlap with each other in a see-through manner when viewed in a thickness direction of the cathode separator.
Figure 13:
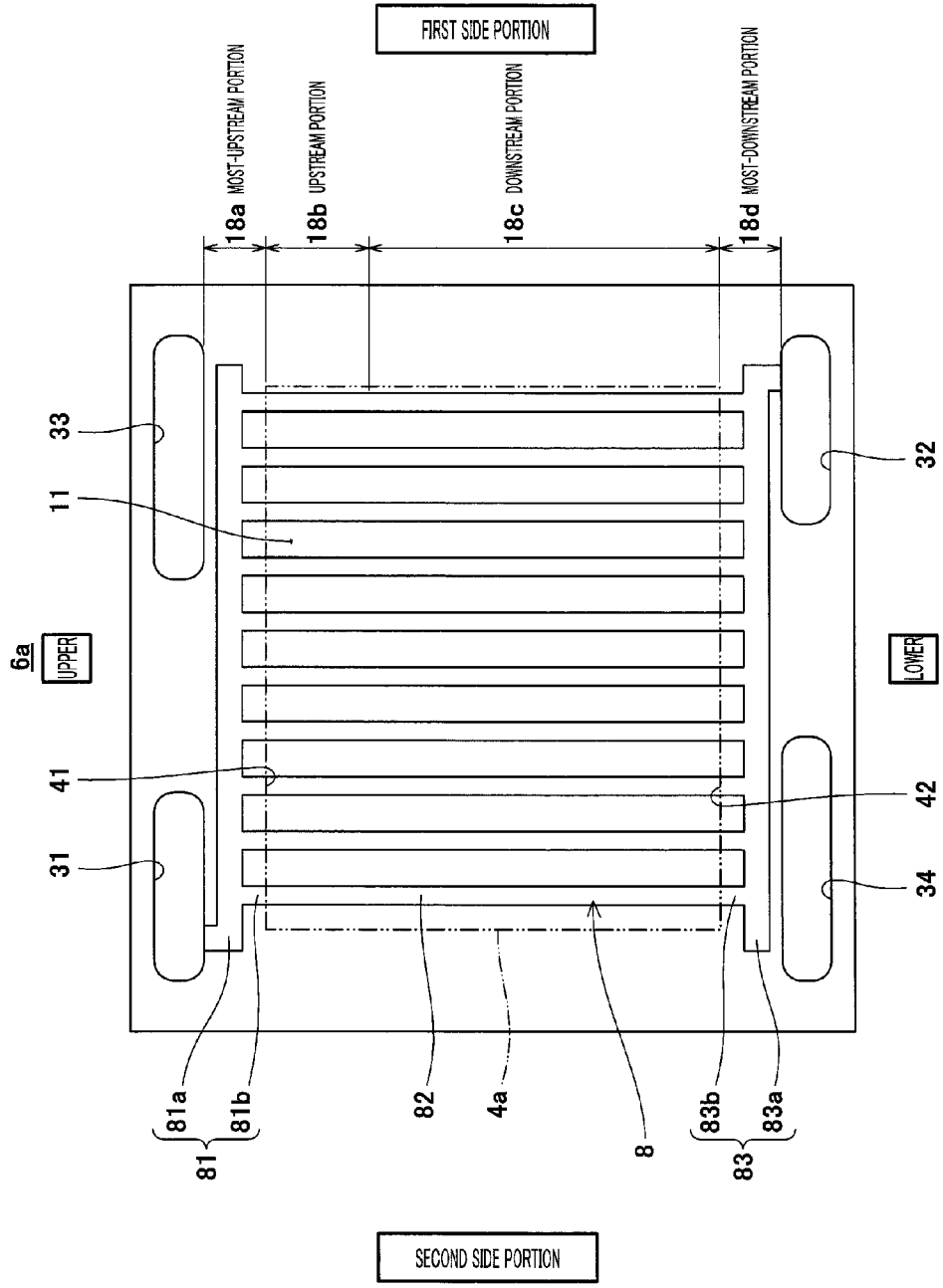
FIG. 13 is a schematic view showing a configuration of an inner surface of an anode separator of the fuel cell stack according to Embodiment 3 of the present invention.
Figure 14:
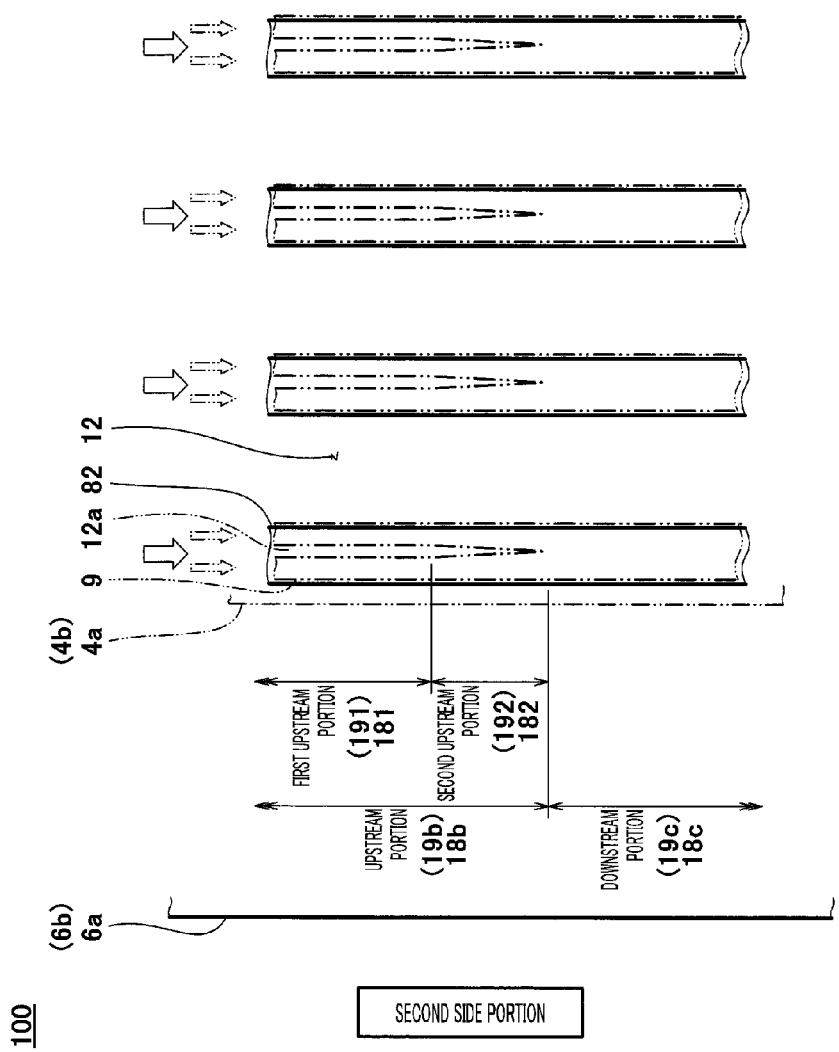
FIG. 14 is a schematic view showing a configuration of the polymer electrolyte fuel cell according to Embodiment 3 of the present invention.

FIG. 12 is a schematic view of a cathode separator and a cathode in a fuel cell stack according to Embodiment 3 of the present invention, which are drawn to overlap with each other in a see-through manner when viewed in a thickness direction of the cathode separator. FIG. 13 is a schematic view showing a configuration of an inner surface of an anode separator of the fuel cell stack according to Embodiment 3 of the present invention. FIG. 14 is a schematic view showing a configuration of the fuel cell according to Embodiment 3 of the present invention. In FIG. 12, upper and lower sides of the cathode separator are depicted as upper and lower sides of FIG. 12. In FIG. 13, upper and lower sides of the anode separator are depicted as upper and lower sides of FIG. 13. In FIGS. 12 and 13, the cooling medium supply manifold hole and the cooling medium discharge manifold hole are omitted. In FIG. 14, only a part of the fuel cell is depicted, and the anode separator and the cathode separator are drawn in a see-through manner, when viewed in the thickness direction of the fuel cell (anode separator). In FIG. 14, to allow the fuel gas channel and the oxidizing gas channel to be easily seen, they are deviated from each other in a horizontal direction.

As shown in FIGS. 12 to 14, the fuel cell stack 61 (fuel cell 100) according to Embodiment 3 of the present invention has a configuration which is basically the same as that of the fuel cell stack 61 (fuel cell 100) according to Embodiment 1 but is different from the same in a configuration of the oxidizing gas channel 9 and a configuration of the fuel gas channel 8.

To be specific, the oxidizing gas channel 9 in the fuel cell stack 61 (fuel cell 100) according to Embodiment 3 is provided with an island-like rib portion 121 extending vertically from its upstream end to the downstream end of the upstream portion 19b. The communicating portion 91b of the upstream sub-gas channel 91 provided on the cathode separator 6b is provided with an island-like rib portion 122 extending vertically from the upstream end of the communicating portion 91b to the downstream end of the communicating portion 91b such that the rib portion 122 is connected to the rib portion 121. The rib portion 121 and the rib portion 122 constitute a second rib portion 12a which runs along the second rib portion 12. In Embodiment 3, the downstream end of the rib portion 121 has a tapered shape (to be precise, triangular shape when viewed in the thickness direction of the anode separator 6a), and a vertical length of the tapered portion is a vertical length of the second upstream portion 192.

The fuel gas channel 8 of the fuel cell stack 61 (fuel cell 100) according to Embodiment 3 is configured in such a manner that the communicating gas channel 82 has a straight-line shape, the groove forming the communicating portion 81b of the upstream sub-gas channel 81, the groove forming the communicating gas channel 82, and the groove forming the communicating portion 83b of the downstream sub-gas channel 83 have rectangular cross-sections, respectively.

As shown in FIG. 14, the communicating gas channel 82 of the fuel gas channel 8 is configured in such a manner that the upstream portion 18b overlaps with (faces) the second rib portion 12a when viewed in the thickness direction of the anode separator 6a, and the downstream portion 18c overlaps with (faces) the communicating gas channel 92 of the oxidizing gas channel 9 when viewed in the thickness direction of the anode separator 6a. Because of this, the ratio of a fuel gas channel of a portion of the upstream portion 18b of the fuel gas channel 8 which overlaps with the second rib portion 12a of the cathode separator 6b in the width direction of the fuel gas channel 8 (hereinafter referred to as ratio of the fuel gas channel width to the second rib portion 12a) is set greater than the ratio of the fuel gas channel width of the downstream portion 18c of the fuel gas channel 8 to the second rib portion 12a. Also, the ratio of the fuel gas channel width of the first upstream portion 181 of the fuel gas channel 8 to the second rib portion 12a is set greater than the ratio of the fuel gas channel width of the second upstream portion 182 to the second rib portion 12a.

The fuel cell stack 61 (fuel cell 100) according to Embodiment 3 configured as described above can achieve the same advantages as those achieved by the fuel cell stack 61 (fuel cell 100) according to Embodiment 1. Although in Embodiment 3, the communicating gas channel 82 of the fuel gas channel 8, the oxidizing gas channel 9, the communicating portion 91b and the communicating portion 93 have rectangular cross-sections in a direction perpendicular to the direction in which the reaction gas flows, the present invention is in no way limited to this, but they may have tapered cross-sections, like Embodiment 1.

Embodiment 4

Figure 15:
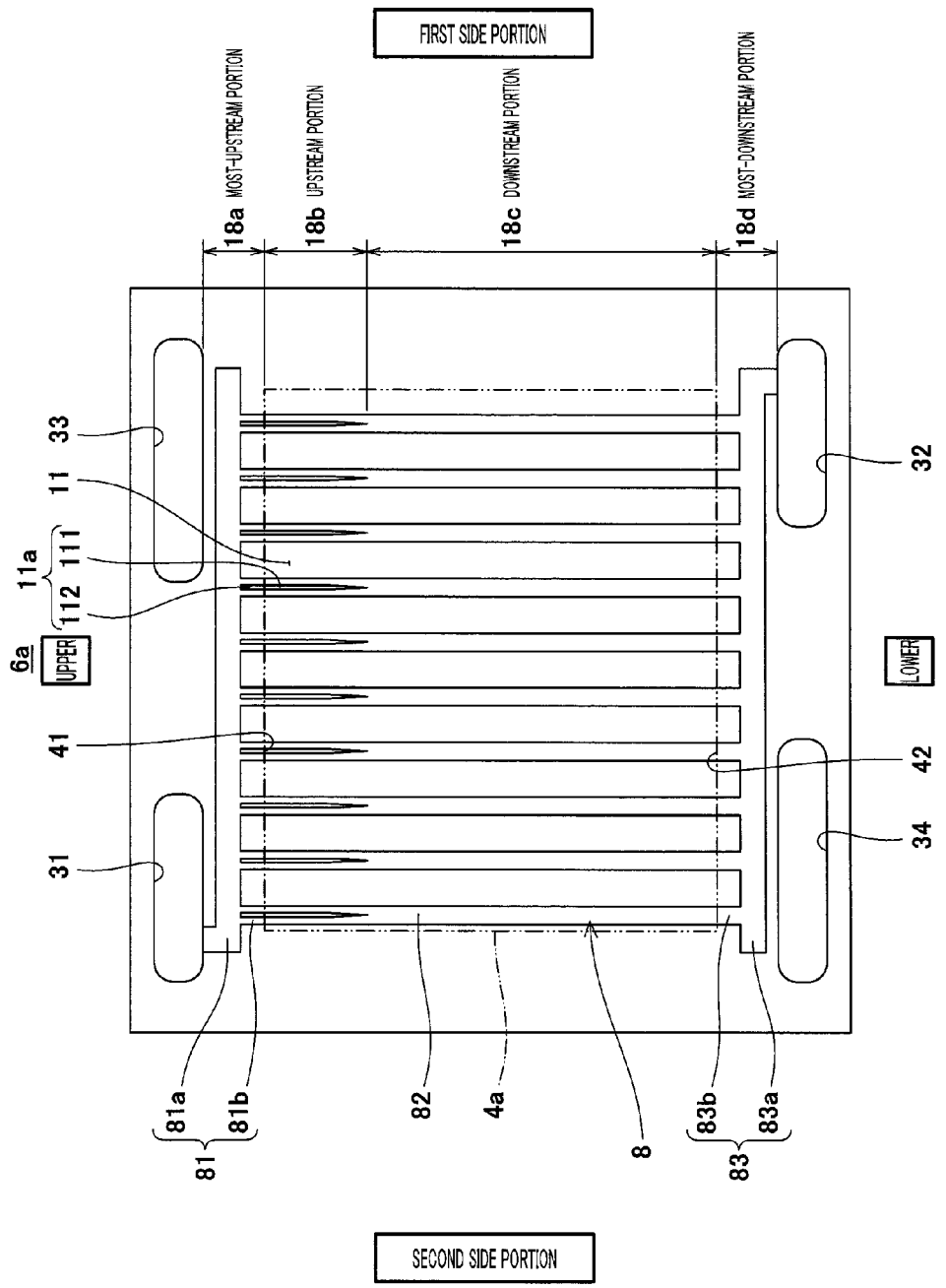
FIG. 15 is a schematic view showing a configuration of an inner surface of an anode separator of the fuel cell stack according to Embodiment 4 of the present invention.
Figure 16:
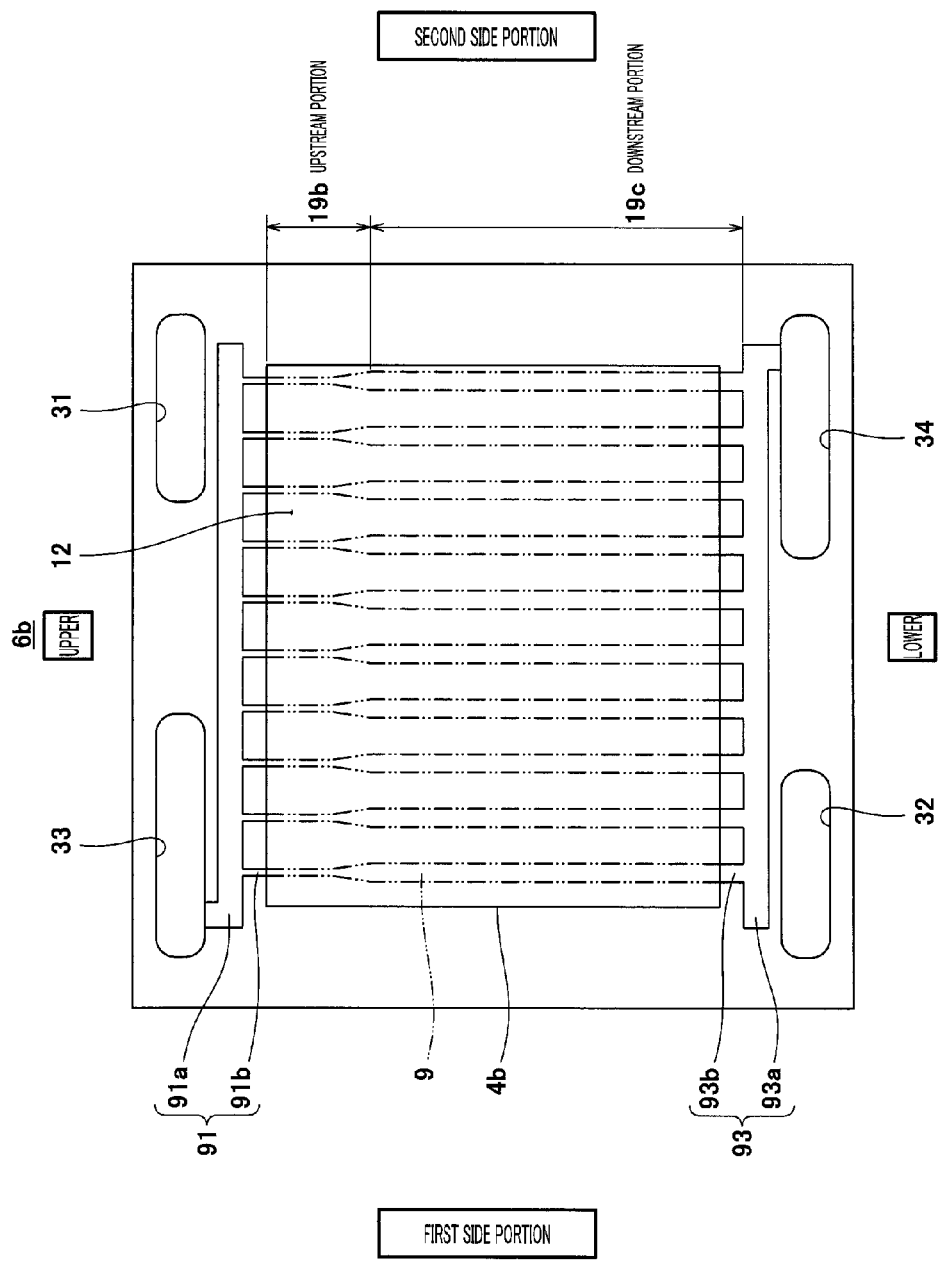
FIG. 16 is a schematic view of a cathode separator and a cathode in a fuel cell stack according to Embodiment 4 of the present invention, which are drawn to overlap with each other in a see-through manner when viewed in a thickness direction of the cathode separator.
Figure 17:
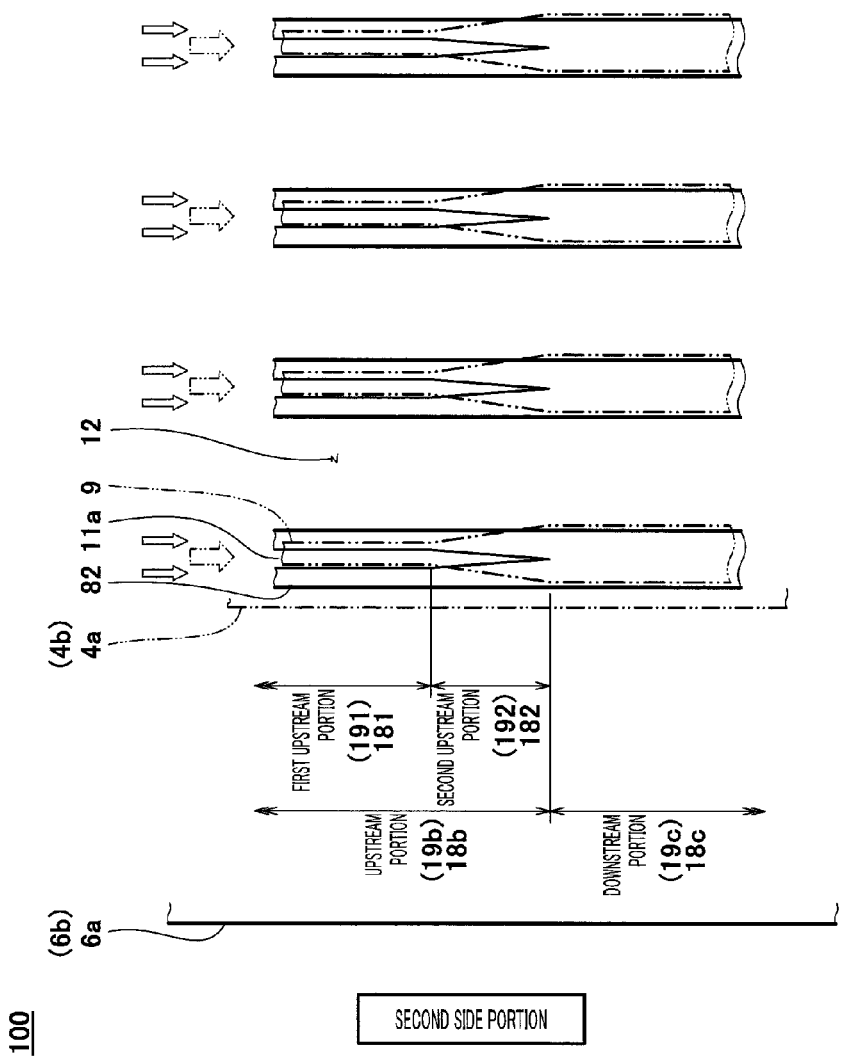
FIG. 17 is a schematic view showing a configuration of a polymer electrolyte fuel cell according to Embodiment 4 of the present invention.

FIG. 15 is a schematic view showing a configuration of an inner surface of an anode separator of the fuel cell stack according to Embodiment 4 of the present invention. FIG. 16 is a schematic view of a cathode separator and a cathode in the fuel cell stack according to Embodiment 4 of the present invention, which are drawn to overlap with each other in a see-through manner when viewed in a thickness direction of the cathode separator. FIG. 17 is a schematic view showing a configuration of the fuel cell according to Embodiment 4 of the present invention. In FIG. 15, upper and lower sides of the cathode separator are depicted as upper and lower sides of FIG. 15. In FIG. 16, upper and lower sides of the anode separator are depicted as upper and lower sides of FIG. 16. In FIGS. 15 and 16, the cooling medium supply manifold hole and the cooling medium discharge manifold hole are omitted. In FIG. 17, only a part of the fuel cell is depicted, and the anode separator and the cathode separator are drawn in a see-through manner, when viewed in the thickness direction of the fuel cell (anode separator). In FIG. 17, to allow the fuel gas channel and the oxidizing gas channel to be easily seen, they are deviated from each other in a horizontal direction.

As shown in FIGS. 15 to 17, the fuel cell stack 61 (fuel cell 100) according to Embodiment 4 of the present invention has a configuration which is basically the same as that of the fuel cell stack 61 (fuel cell 100) according to Embodiment 1 but is different from the same in a configuration of the oxidizing gas channel 9 and the fuel gas channel 8.

To be specific, in the fuel cell stack 61 (fuel cell 100) according to Embodiment 4, the communicating gas channel 82 of the fuel gas channel 8 is provided with an island-like rib portion 111 extending vertically between its upstream end (portion 41) of the communicating gas channel 82 and the downstream end of the upstream portion 18b. In addition, the communicating portion 81b of the upstream sub-gas channel 81 of the fuel gas channel 8 is provided with an island-like rib portion 112 extending vertically between the upstream end of the communicating portion 81b and the downstream end of the communicating portion 81b such that the island-like rib portion 112 is connected to the island-like portion 111. The rib portion 111 and the rib portion 112 constitute the first rib portion 11 a which runs along the first rib portion 11b. In Embodiment 4, the downstream end portion of the rib portion 111 has a tapered shape (to be precise, triangular shape when viewed in the thickness direction of the anode separator 6a), and a vertical length of the tapered portion is a vertical length of the first upstream portion 182.

The oxidizing gas channel 9 of the fuel cell stack 61 (fuel cell 100) according to Embodiment 4 is configured in such a manner a portion extending from the its upstream end to the downstream end of the first upstream portion 191 overlaps with (faces) the first rib portion 11a formed on the inner surface (within the communicating gas channel 82 of the fuel gas channel 8) of the anode separator 6a, when viewed in the thickness direction of the anode separator 6a. The second upstream portion 192 of the oxidizing gas channel 9 partially overlaps with the first rib portion 11a when viewed in the thickness direction of the anode separator 6a. Furthermore, the downstream portion 19c of the oxidizing gas channel 9 overlaps with (faces) the downstream portion 18c of the communicating gas channel 82 of the fuel gas channel 82 when viewed in the thickness direction of the anode separator 6a.

As shown in FIG. 17, the ratio of the fuel gas channel width of the upstream portion 18b of the fuel gas channel 8 to the second rib portion 12 is set greater than the ratio of the fuel gas channel width of the downstream portion 18c of the fuel gas channel 8 to the second rib portion 12. The ratio of the fuel gas channel width of the first upstream portion 181 of the fuel gas channel 8 to the second rib portion 12 is set greater than the ratio of the fuel gas channel width of the second upstream portion 182 of the fuel gas channel 8 to the second rib portion 12.

The fuel cell stack 61 (fuel cell 100) according to Embodiment 4 configured as described above can achieve the same advantages as those achieved by the fuel cell stack 61 (fuel cell 100) according to Embodiment 1.

Although in Embodiment 4, the oxidizing gas channel 9 overlaps with (faces) the first rib portion 11, the present invention is in no way limited to this, but the oxidizing gas channel 9 may partially overlap with the first rib portion 11a, i.e., with the communicating gas channel 82 of the fuel gas channel 8, so long as the ratio of the fuel gas channel width of the upstream portion 18b of the fuel gas channel 8 to the second rib portion 12 is greater than the ratio of the fuel gas channel width of the downstream portion 18c of the fuel gas channel 8 to the second rib portion 12.

Embodiment 5

Figure 18:
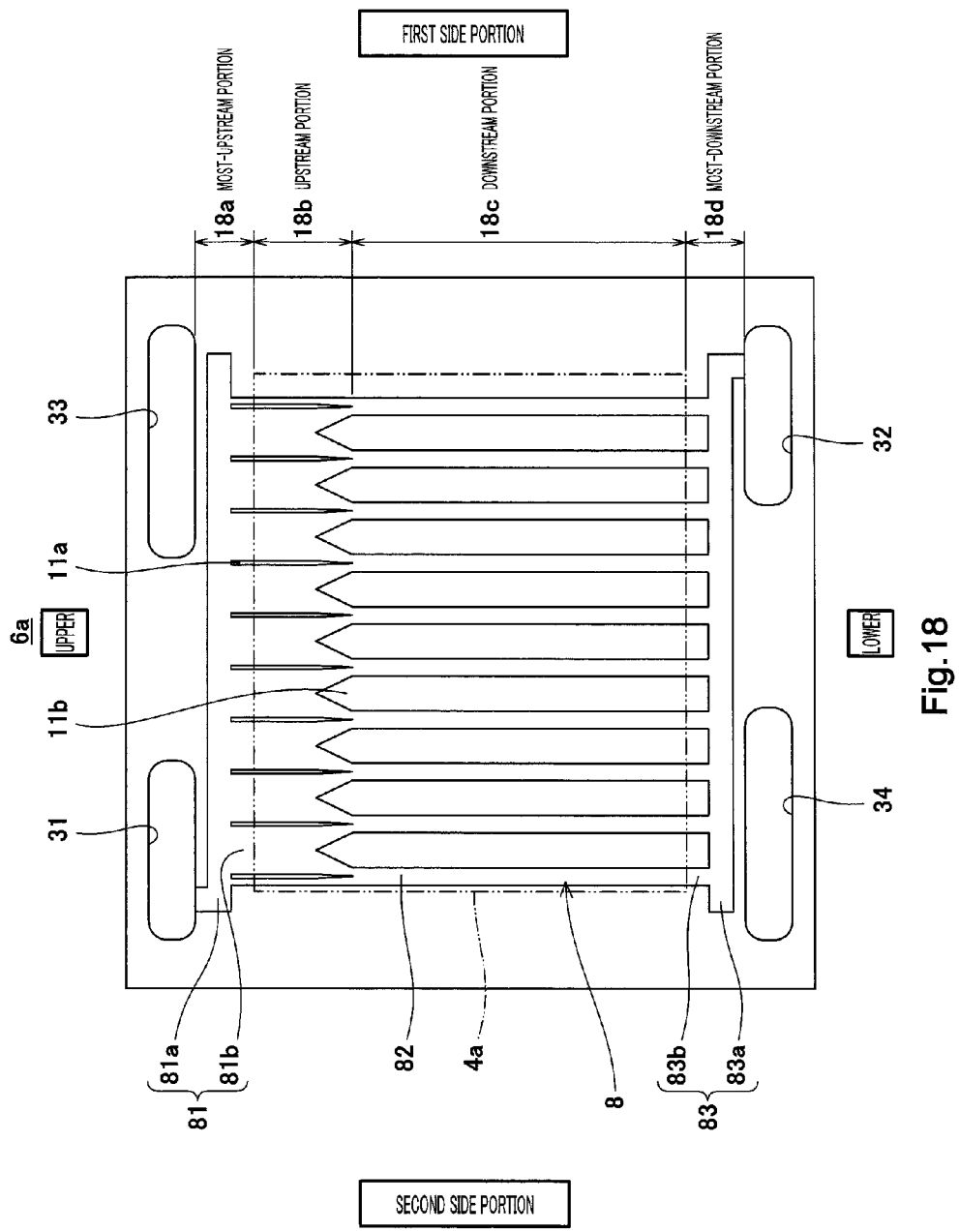
FIG. 18 is a schematic view showing a configuration of an inner surface of an anode separator of a fuel cell stack according to Embodiment 5 of the present invention.
Figure 19:
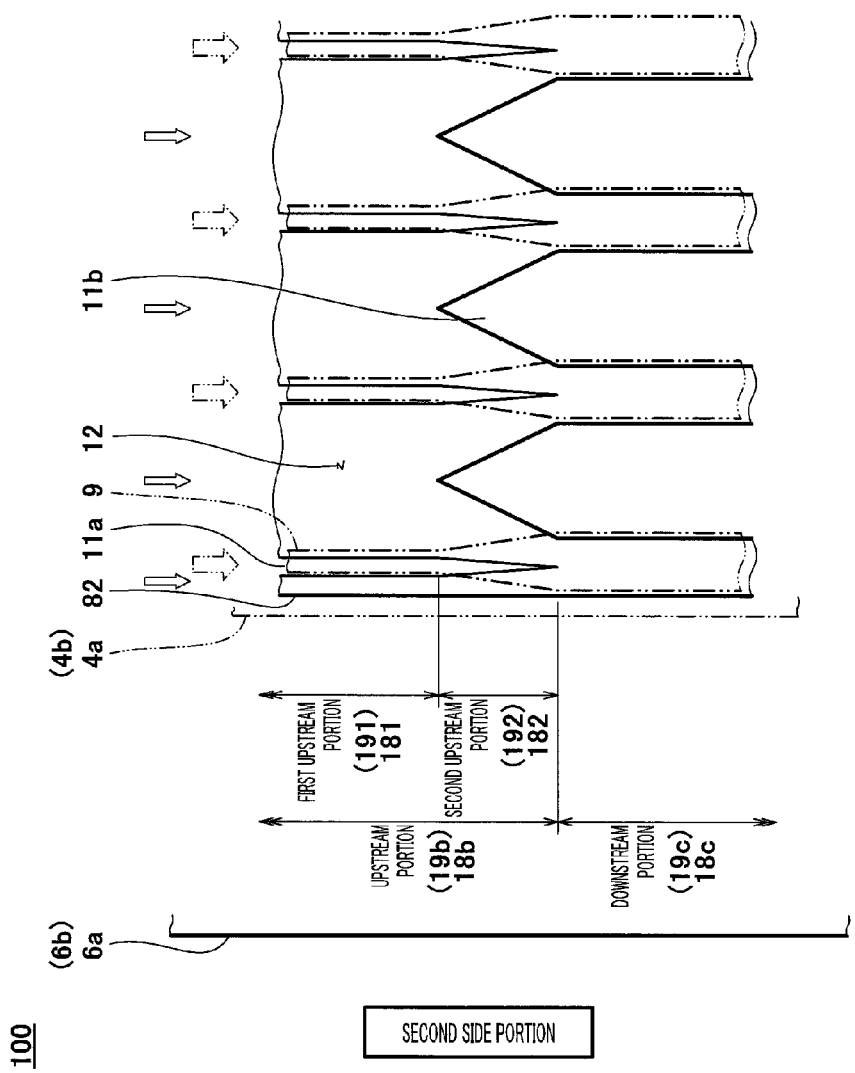
FIG. 19 is a schematic view showing a configuration of a polymer electrolyte fuel cell according to Embodiment 5 of the present invention.

FIG. 18 is a schematic view showing a configuration of an inner surface of an anode separator of a fuel cell stack according to Embodiment 5 of the present invention. FIG. 19 is a schematic view showing a configuration of a fuel cell according to Embodiment 5 of the present invention. In FIG. 18, upper and lower sides of the anode separator are depicted as upper and lower sides of FIG. 18, and the cooling medium supply manifold hole and the cooling medium discharge manifold hole are omitted. In FIG. 19, only a part of the fuel cell is depicted, and the anode separator and the cathode separator are drawn in a see-through manner, when viewed in the thickness direction of the fuel cell (anode separator). In FIG. 19, to allow the fuel gas channel and the oxidizing gas channel to be easily seen, they are deviated from each other in a horizontal direction.

As shown in FIGS. 18 and 19, the fuel cell stack 61 (fuel cell 100) according to Embodiment 5 of the present invention has a configuration which is basically the same as that of the fuel cell stack 61 (fuel cell 100) according to Embodiment 1 but is different from the same in a configuration of the oxidizing gas channel 9 and the fuel gas channel 8.

To be specific, the fuel gas channel 8 of the fuel cell stack 61 (fuel cell 100) according to Embodiment 5 is configured in such a manner that the passage width of the communicating portion 81b of the upstream sub-gas channel 81 is set greater than a passage width of the communicating portion 83b of the downstream sub-gas channel 83 except for the both end portions (first side portion end portion and second side portion end portion). To be more detailed, a plurality of first rib portions 11a extend vertically at predetermined intervals in the horizontal direction between the upstream end of the communicating portion 81b and the downstream end of the upstream portion 18b. A plurality of first rib portions 11b extend vertically between the upstream end of the second upstream portion 182 and the downstream end of the communicating portion 83b such that each first rib portion 11b is positioned between adjacent first rib portions 11a in the horizontal direction. The lower end portion of each first rib portion 11a has a tapered shape (to be precise, triangular shape when viewed in the thickness direction of the anode separator 6a). The plurality of first rib portions 11a respectively run along each other and the plurality of first rib portions 11b respectively run along each other.

As shown in FIG. 19, the communicating gas channel 82 of the fuel gas channel 8 overlaps with (faces) the second rib portion 12 and the downstream portion 18c overlaps with (faces) the oxidizing gas channel 9 when viewed in the thickness direction of the anode separator 6a. The ratio of the fuel gas channel width of the upstream portion 18b of the fuel gas channel 8 to the second rib portion 12 is set greater than the ratio of the fuel gas channel width of the downstream portion 18c of the fuel gas channel 8 to the second rib portion 12. Also, the ratio of the fuel gas channel width of the first upstream portion 181 of the fuel gas channel 8 to the second rib portion 12 is set greater than the ratio of the fuel gas channel width of the second upstream portion 182 to the second rib portion 12.

The fuel cell stack 61 (fuel cell 100) according to Embodiment 5 configured as described above can achieve the same advantages as those achieved by the fuel cell stack 61 (fuel cell 100) according to Embodiment 4.

Embodiment 6

Figure 20:
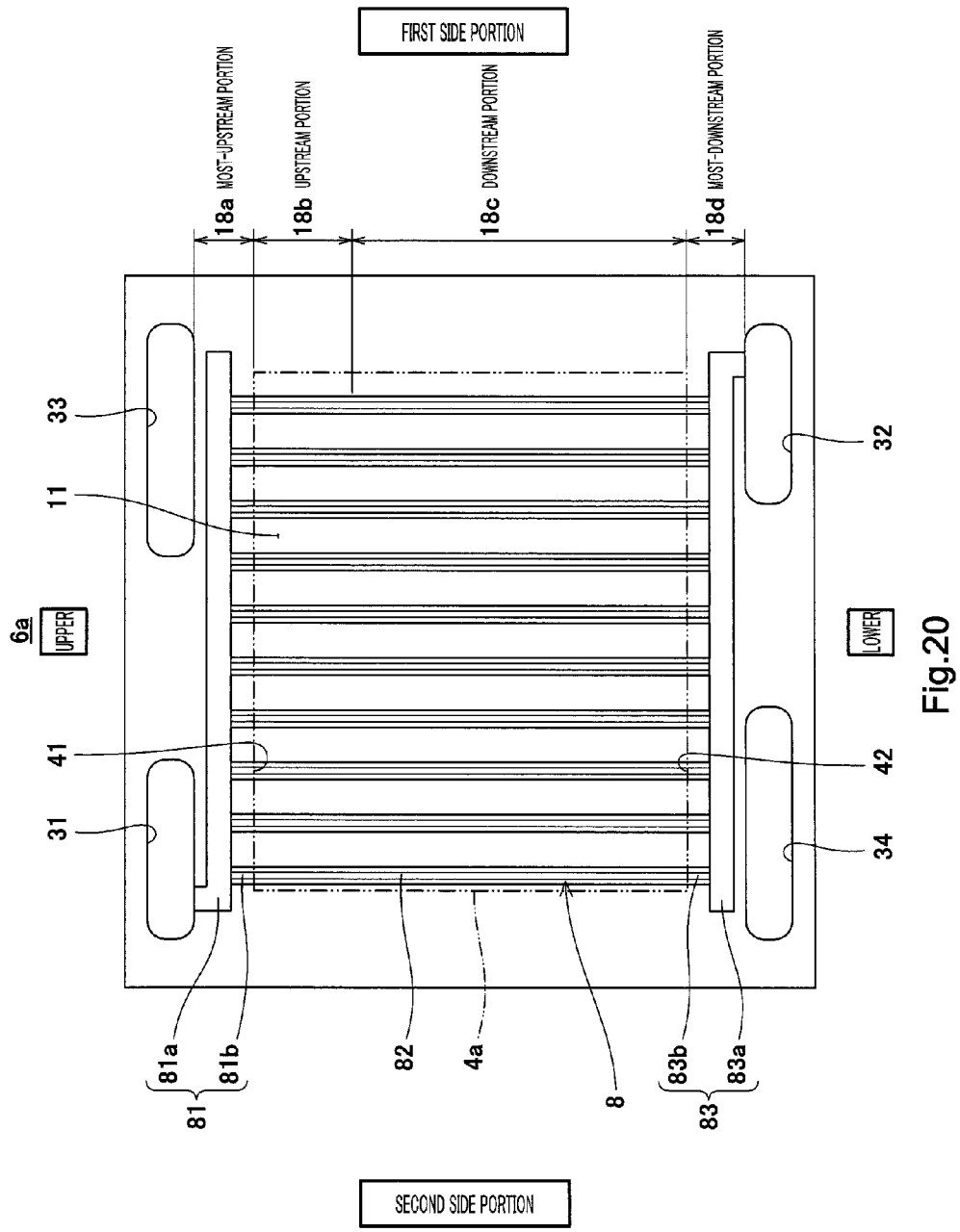
FIG. 20 is a schematic view showing a configuration of an inner surface of an anode separator of a fuel cell stack according to Embodiment 6 of the present invention.
Figure 21:
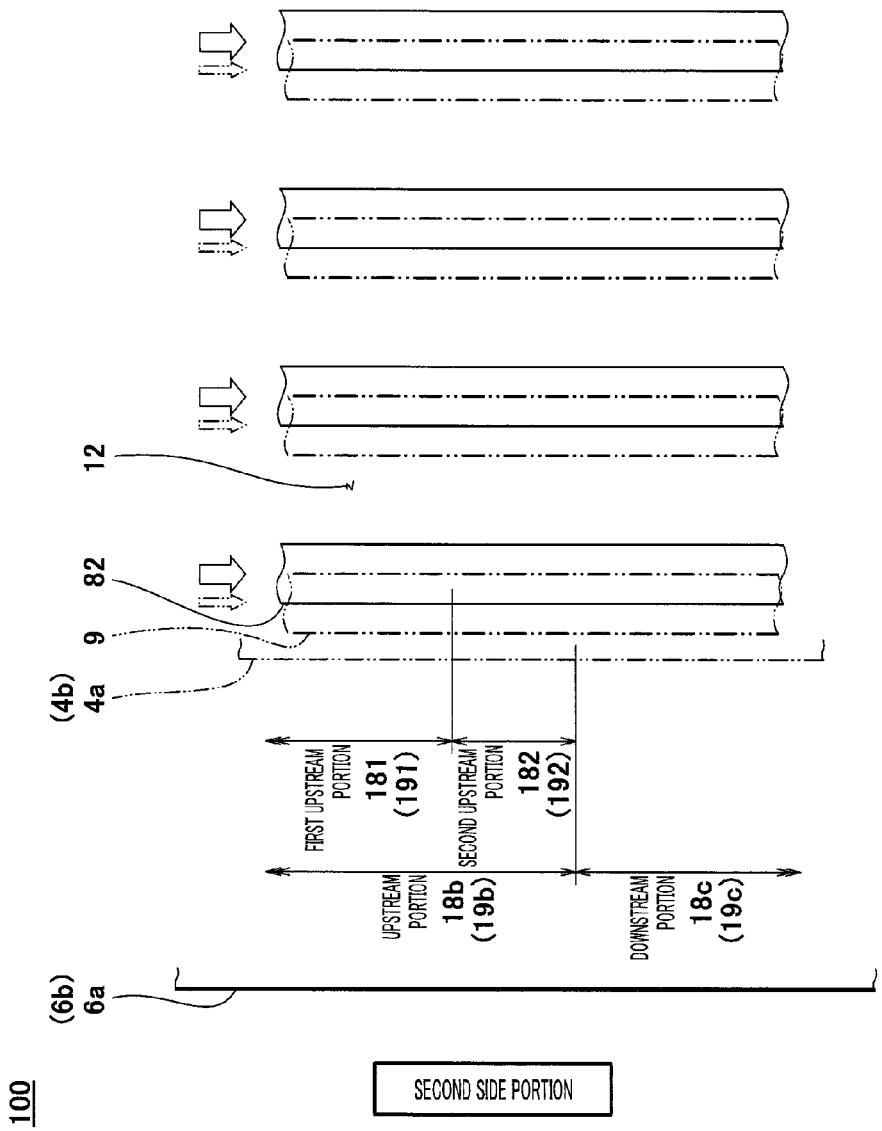
FIG. 21 is a schematic view showing a configuration of a polymer electrolyte fuel cell according to Embodiment 6 of the present invention.

FIG. 20 is a schematic view showing a configuration of an inner surface of an anode separator of a fuel cell stack according to Embodiment 6 of the present invention. FIG. 21 is a schematic view showing a configuration of a fuel cell according to Embodiment 6 of the present invention. In FIG. 20, upper and lower sides of the anode separator are depicted as upper and lower sides of FIG. 20, and the cooling medium supply manifold hole and the cooling medium discharge manifold hole are omitted. In FIG. 21, only a part of the fuel cell is depicted, and the anode separator and the cathode separator are drawn in a see-through manner, when viewed in the thickness direction of the fuel cell (anode separator).

As shown in FIGS. 20 and 21, the fuel cell stack 61 (fuel cell 100) according to Embodiment 6 of the present invention has a configuration which is basically the same as that of the fuel cell stack 61 (fuel cell 100) according to Embodiment 1 but is different from the same in a configuration of the fuel gas channel 8.

To be specific, in the fuel cell stack 61 (fuel cell 100) according to Embodiment 6, the upstream portion 18b and the downstream portion 18c (communicating gas channel 82) of the fuel gas channel 8 has a portion which does not overlap with the oxidizing gas channel 9 in a width direction of the fuel gas channel 8 when viewed in the thickness direction of the anode separator 6a. To be specific, when viewed in the thickness direction of the anode separator 6a, the downstream portion 18c as well as the upstream portion 18b of the fuel gas channel 8 overlaps with the second rib portion 12 in the width direction of the fuel gas channel 8. In other words, the ratio of the fuel gas channel width of the upstream portion 18b and the downstream portion 18c of the fuel gas channel 8 to the second rib portion 12 is greater than 0 and not greater than 1. In Embodiment 6, the fuel gas channel 8 is configured in such a manner that the ratio of the fuel gas channel width of the upstream portion 18b and the downstream portion 18c of the fuel gas channel 8 to the second rib portion 12 is set to 0.5.

In the fuel cell stack 61 (fuel cell 100) according to Embodiment 6 configured as described above, like the fuel cell stack 61 (fuel cell 100) according to Embodiment 1, when viewed in the thickness direction of the anode separator 6a, water migrates from a portion of the cathode 4b which overlaps with the second rib portion 12 to a portion of the anode 4a which faces the upstream portion 18b of the fuel gas channel 8. Because of this structure, it is possible to suppress the portion of the polymer electrolyte membrane 1 which faces the upstream portion 18b of the fuel gas channel 8, from getting dried, and suppress degradation of the portion of the polymer electrolyte membrane 1. In the same manner, when viewed in the thickness direction of the anode separator 6a, water migrates from the portion of the anode 4a which contacts the first rib portion 11 of the fuel gas channel 8 to the portion of the cathode 4b which overlaps with the oxidizing gas channel 9. Because of this structure, it is possible to suppress the portion of the polymer electrolyte membrane 1 which faces the oxidizing gas channel 9, from getting dried, and suppress degradation of the portion of the polymer electrolyte membrane 1.

When viewed in the thickness direction of the anode separator 6a, a portion where the first rib portion 11 and the second rib portion 12 overlap with each other, and a portion where they do not overlap with each other, are formed uniformly, thereby suppressing a pressure from being applied to the polymer electrolyte membrane 1 unevenly. As a result, degradation of the polymer electrolyte membrane 1 can be suppressed.

[Modification Example]

Next, Modified examples of the fuel cell stack 61 (fuel cell 100) according to Embodiment 6 will be described with reference to FIG. 22.

Figure 22:
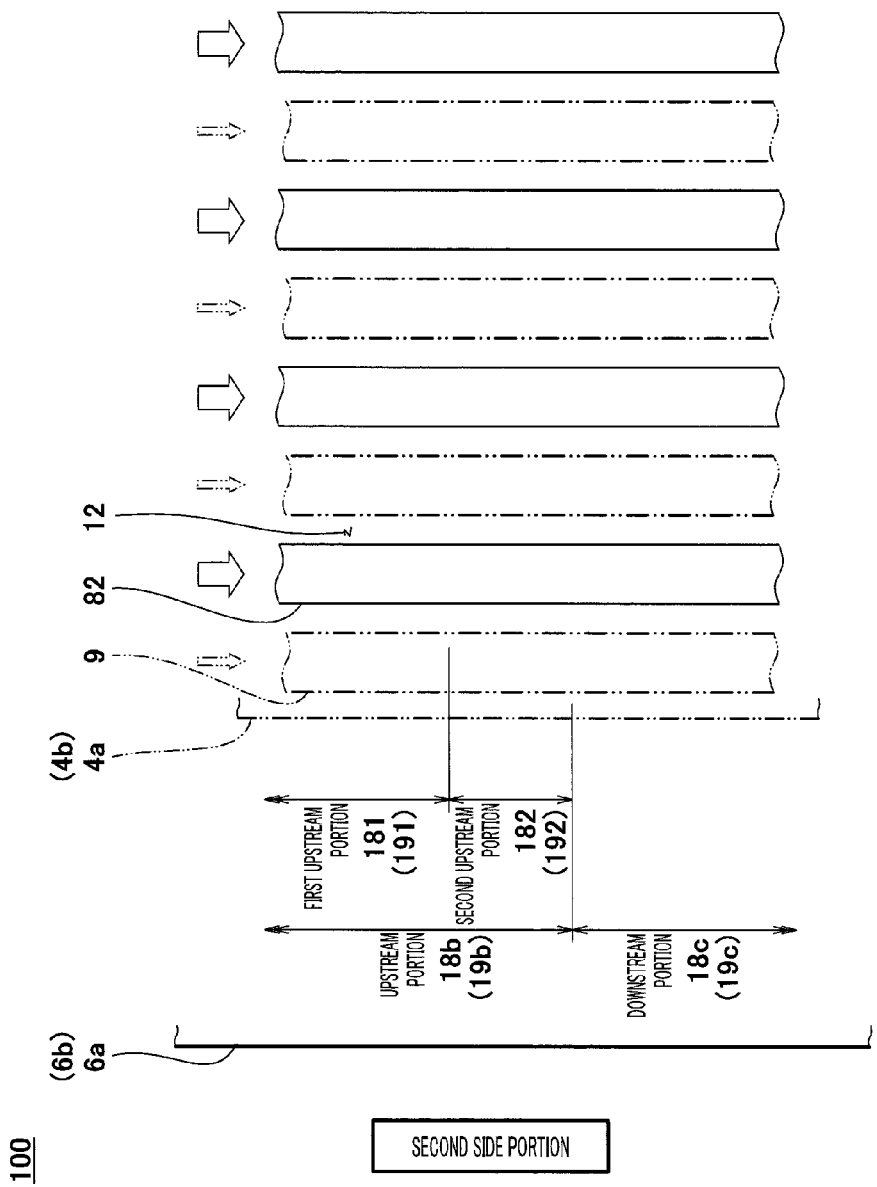
FIG. 22 is a schematic view showing a configuration of a polymer electrolyte fuel cell according to Modified Example 1.

FIG. 22 is a schematic view showing a configuration of a fuel cell according to Modified example 1. In FIG. 22, a part of the fuel cell is depicted, and the anode separator and the cathode separator are drawn in a see-through manner, when viewed in the thickness direction of the fuel cell (anode separator).

As shown in FIG. 22, in the fuel cell stack 61 (fuel cell 100) according to Modified example 1, the upstream portion 18b and the downstream portion 18c (communicating gas channel 82) of the fuel gas channel 8 do not overlap with the oxidizing gas channel 9 in a width direction of the fuel gas channel 8 when viewed in the thickness direction of the anode separator 6a. To be specific, when viewed in the thickness direction of the anode separator 6a, the upstream portion 18b and the downstream portion 18c of the fuel gas channel 8 overlap with the second rib portion 12 as a whole. In other words, the fuel gas channel 8 is configured such that the ratio of the fuel gas channel width of the upstream portion 18*b* and the downstream portion 18*c* of the fuel gas channel 8 to the second rib portion 12 is 1.

The fuel cell stack 61 (fuel cell 100) according to Modified example 1 configured as described above can achieve the same advantages as those achieved by the fuel cell stack 61 (fuel cell 100) according to Embodiment 6.

Embodiment 7

Figure 23:
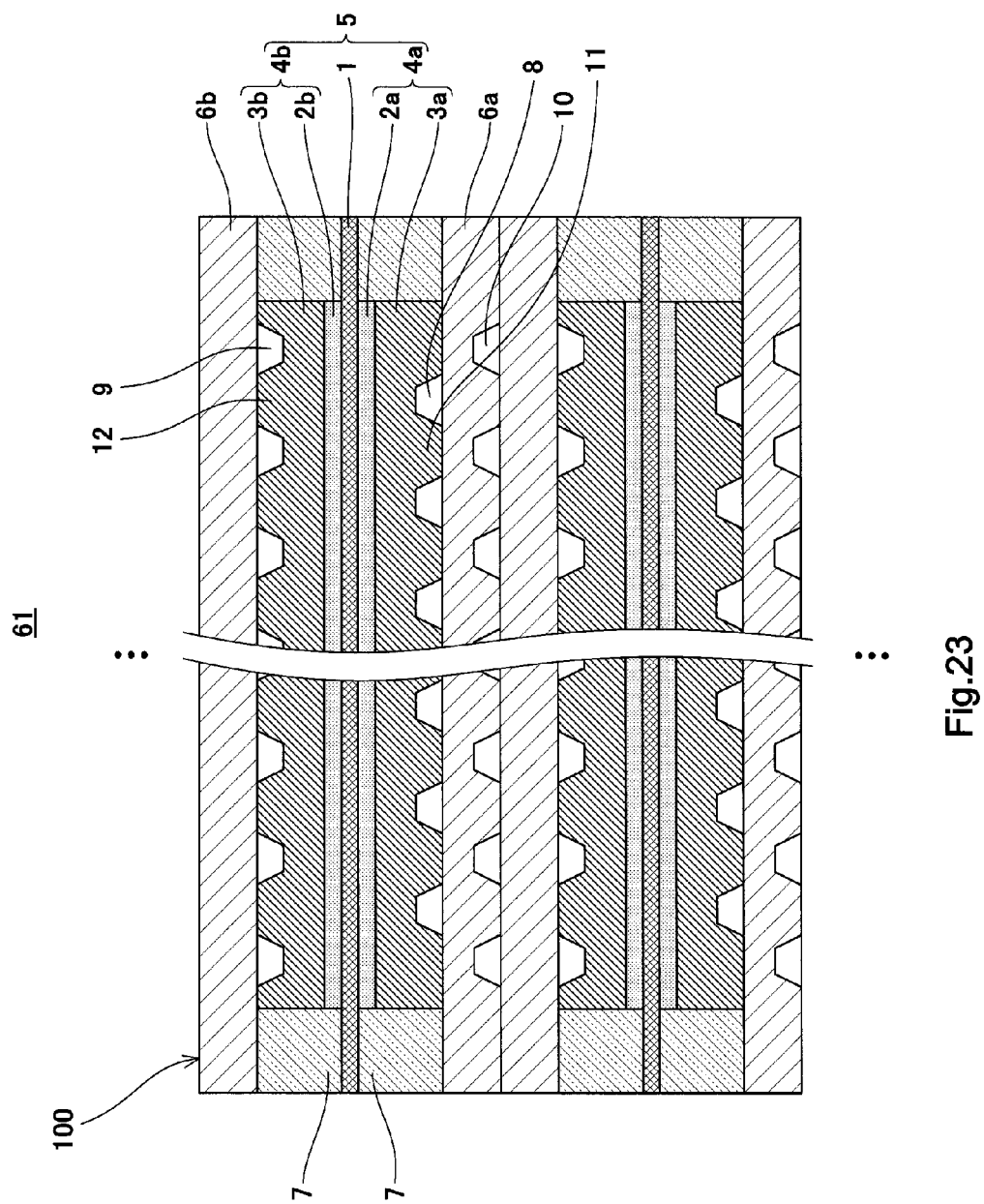
FIG. 23 is a cross-sectional view schematically showing a configuration of a polymer electrolyte fuel cell in a fuel cell stack according to Embodiment 7 of the present invention.
Figure 24:
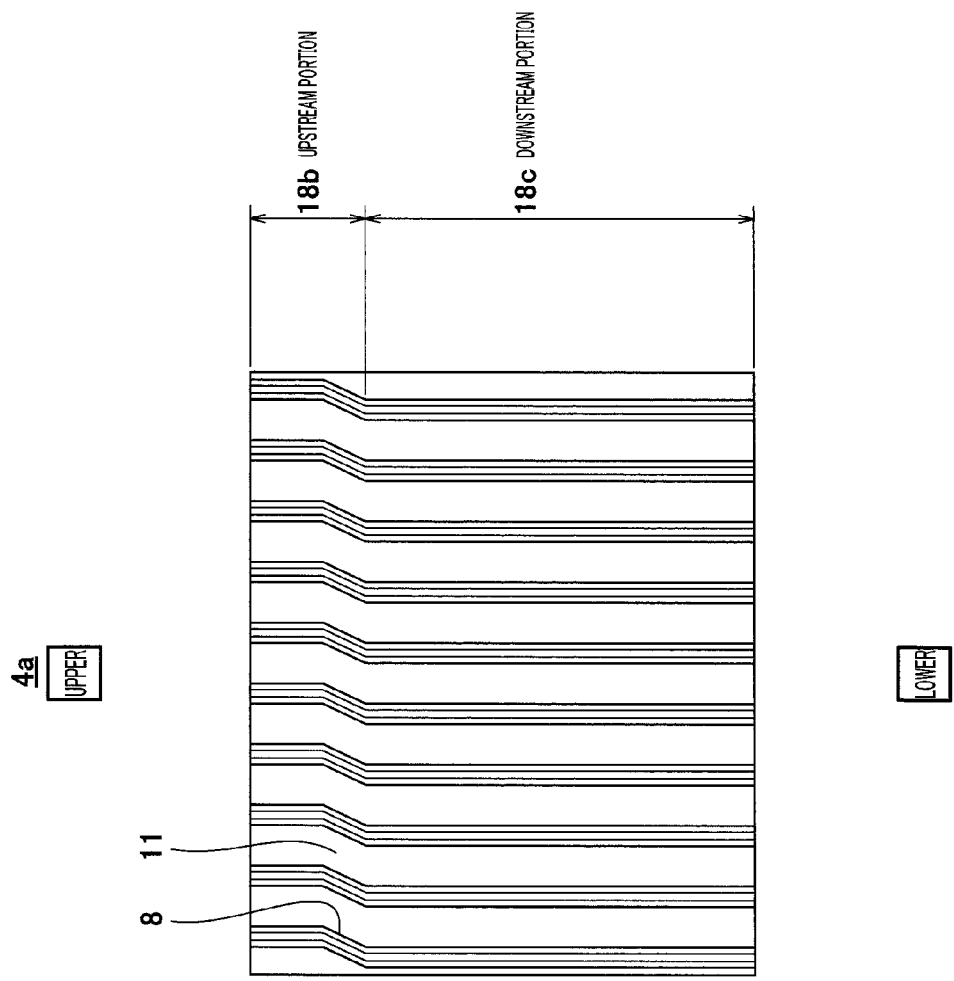
FIG. 24 is a schematic view showing a configuration of an anode of the polymer electrode fuel cell of FIG. 23.
Figure 25:
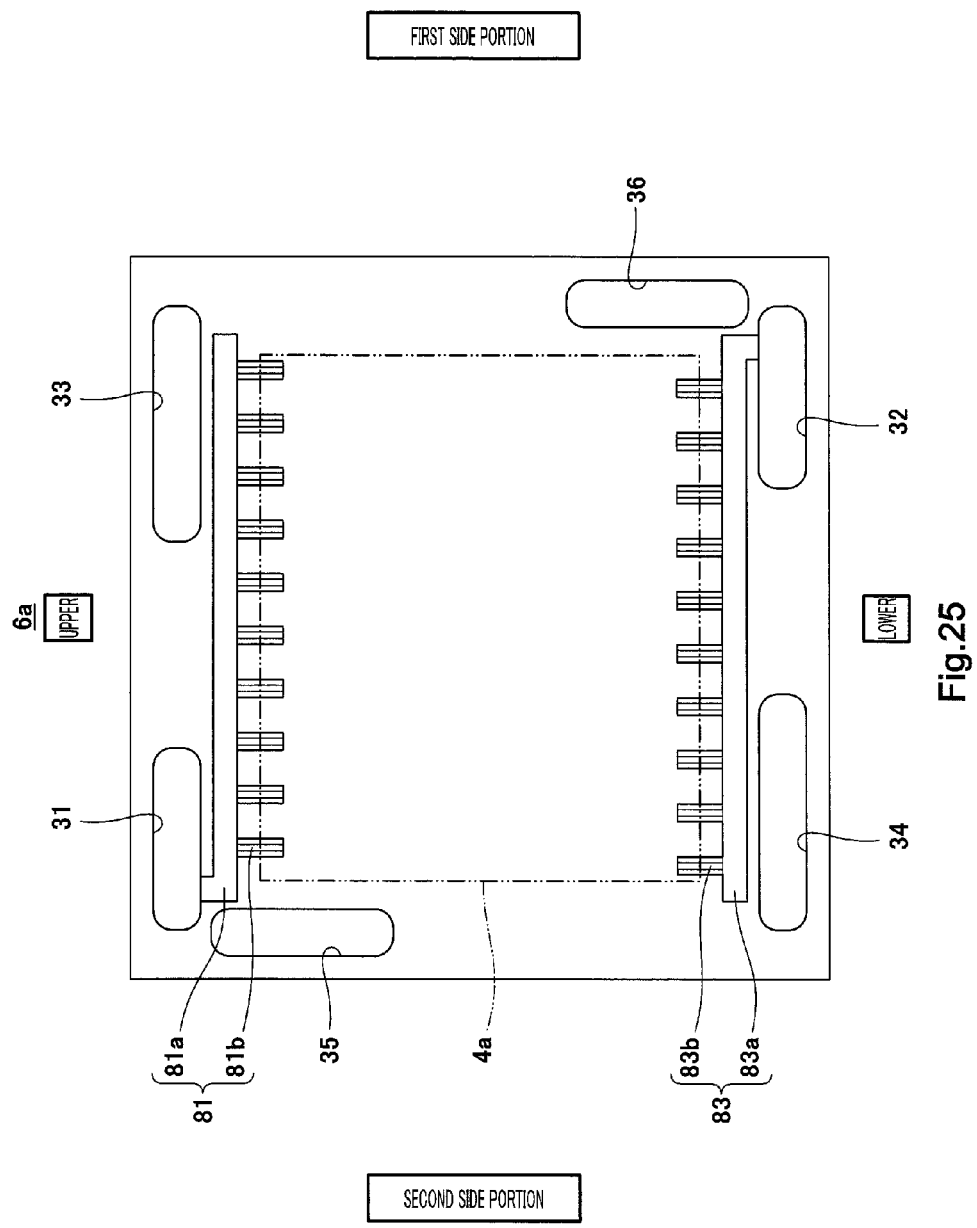
FIG. 25 is a schematic view showing a configuration of an anode separator of the polymer electrolyte fuel cell of FIG. 23.
Figure 26:
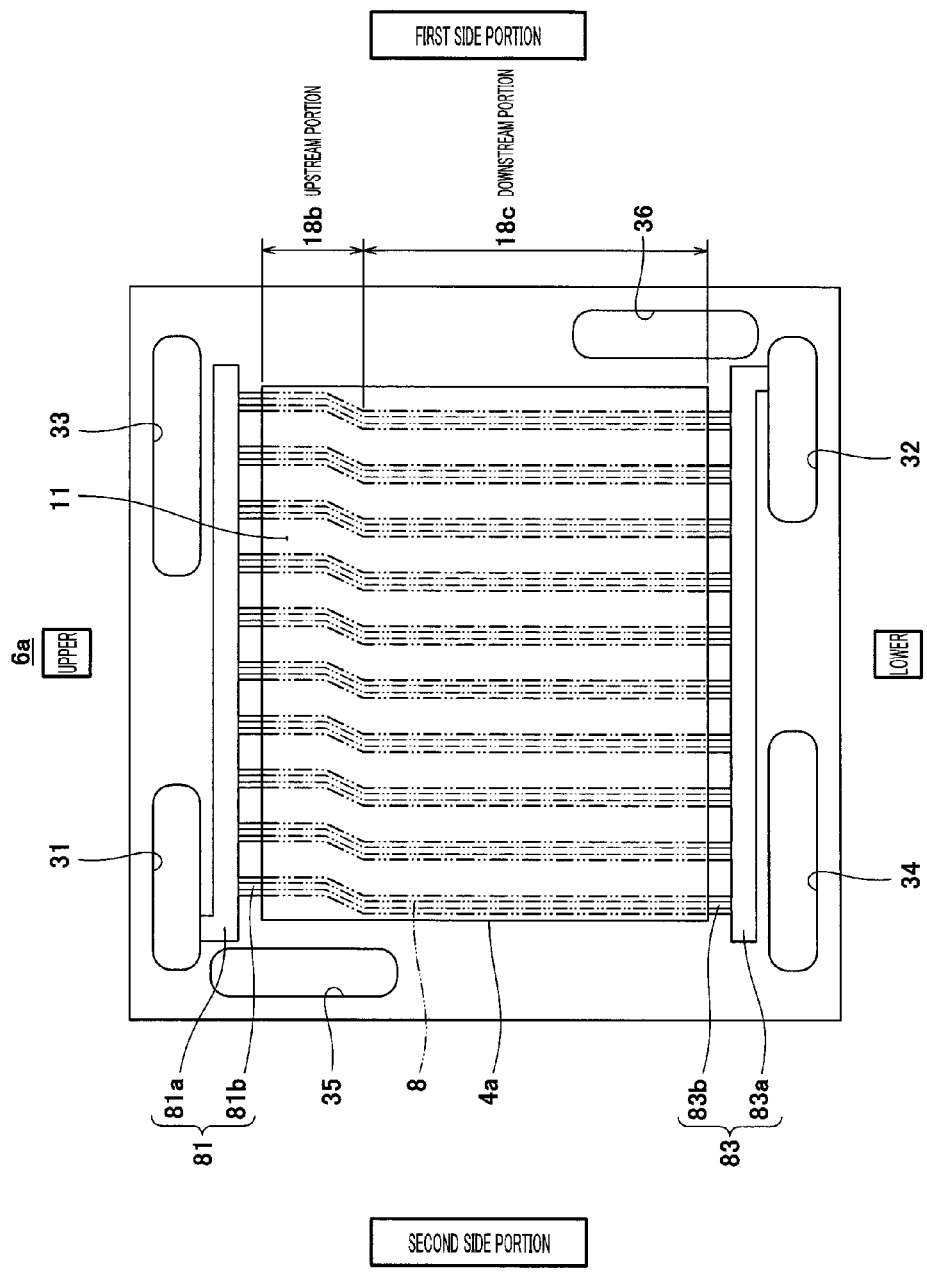
FIG. 26 is a schematic view of an anode separator and an anode in the polymer electrolyte fuel cell of FIG. 23, which are drawn to overlap with each other in a see-through manner when viewed in a thickness direction of the anode separator.

FIG. 23 is a schematic view showing a configuration of a fuel cell in a fuel cell stack according to Embodiment 7 of the present invention. FIG. 24 is a schematic view showing a configuration of an anode of the fuel cell of FIG. 23. FIG. 25 is a schematic view showing a configuration of an anode separator of the fuel cell of FIG. 23. FIG. 26 is a schematic view of an anode separator and an anode in the polymer electrolyte fuel cell of FIG. 23, which are drawn to overlap with each other in a see-through manner when viewed in a thickness direction of the anode separator. In FIG. 23, only a part of the configuration is omitted. In FIGS. 24 and 26, upper and lower sides of the anode separator are depicted as upper and lower sides of FIGS. 24 and 26. In FIG. 25, upper and lower sides of the anode separator are depicted as upper and lower sides of FIG. 25. In FIG. 26, a fuel gas channel is indicated by an imaginary line (two-dotted line).

As shown in FIG. 23, the fuel cell stack 61 (fuel cell 100) according to Embodiment 7 of the present invention has a configuration which is basically the same as that of the fuel cell stack 61 (fuel cell 100) according to Embodiment 1 but is different in that the fuel gas channel 8 is formed on the anode 4*a*. Hereinafter, with reference to FIGS. 23 to 26, the configuration of the fuel gas channel 8 provided on the anode 4*a* and the configuration of the anode separator 6*a* will be described with reference to FIGS. 23 to 26.

As shown in FIG. 24, on the main surface of the anode 4*a* (to be precise, anode gas diffusion layer 3*a*), the groove-shaped fuel gas channel 8 extends vertically in a substantially straight-line shape (S-shape). The fuel gas channel 8 is configured such that the groove forming the fuel gas channel 8 has a cross-section (cross-section of the groove forming the fuel gas channel 8 in a direction perpendicular to a flow direction of the oxidizing gas) having a tapered shape being narrower from a bottom surface toward an opening.

In Embodiment 7, the fuel gas channel 8 includes an upstream portion 18*b* and a downstream portion 18*c*. The upstream portion 18*b* is at least a portion extending between the upstream end of the fuel gas channel 8 which is one end thereof, and a portion satisfying a formula: $L4 \leq \{(2/3) \times L5\}$ which is an opposite end thereof, although its downstream end is different depending on a configuration such as a width of the fuel gas channel 8, a dew point of the reaction gas, a temperature of the cooling medium, etc. In the above formula, L4 indicates a passage length of the upstream portion 18*b* of the fuel gas channel 8 and L5 indicates an overall passage length of the upstream portion 18*b* of the fuel gas channel 8. The opposite end of the upstream portion 18*b* is more preferably a portion satisfying a formula: $L1 \leq L2$.

The downstream portion 19*c* is a portion between the downstream end of the fuel gas channel 8 which is one end thereof and a portion satisfying formula: $L6 \leq \{(1/3) \times L5\}$. In the formula, L6 indicates a passage length of the downstream portion 18*c* of the fuel gas channel 8.

As shown in FIGS. 25 and 26, on the inner surface of the anode separator 6*a*, a groove-shaped upstream sub-gas channel 81 and a groove-shaped downstream sub-gas channel 83 are provided to communicate with the fuel gas channel 8. Since the upstream sub-gas channel 81 and the downstream sub-gas channel 83 are configured like the groove-shaped upstream sub-gas channel 81 and the groove-shaped downstream sub-gas channel 83 formed on the inner surface of the anode separator 6*a* of Embodiment 1, they will not be discussed in detail.

In the fuel cell stack 61 (fuel cell 100) according to Embodiment 7, the fuel gas channel 8 provided on the anode 4*a*, the upstream sub-gas channel 81 and the downstream sub-gas channel 83 which are provided on the inner surface of the anode separator 6*a* are configured to have the same shapes as those of the fuel gas channel 8 in the fuel cell stack 61 (fuel cell 100) according to Embodiment 1. A manufacturing method of the anode gas diffusion layer 3*a* of the anode 4*a* is similar to the above manufacturing method of the cathode gas diffusion layer 3*b*, and therefore will not be discussed in detail.

The fuel cell stack 61 (fuel cell 100) according to Embodiment 7 configured as described above can achieve the same advantages as those achieved by the fuel cell stack 61 (fuel cell 100) according to Embodiment 1.

Embodiment 8

Figure 27:
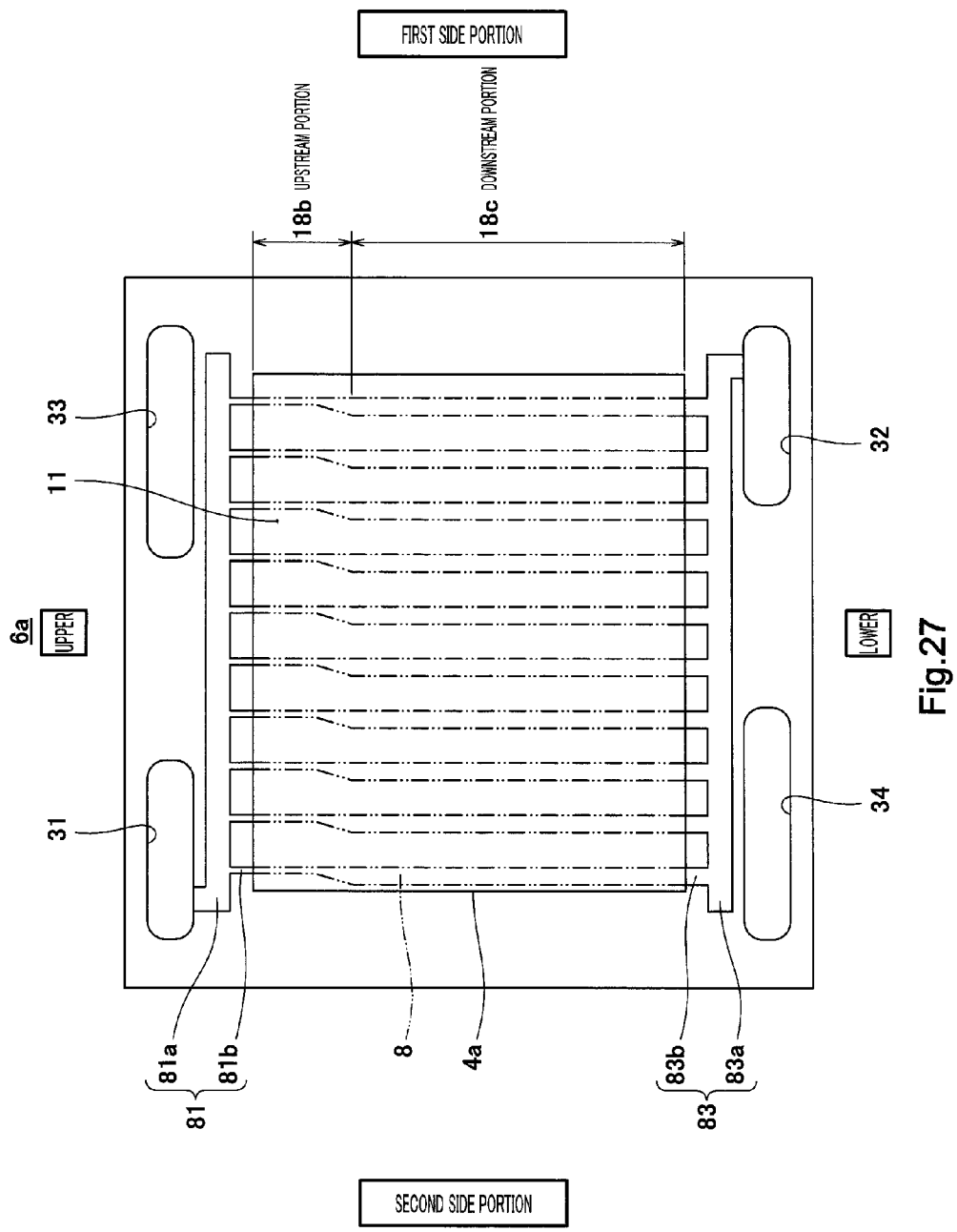
FIG. 27 is a schematic view of an anode separator and an anode in a fuel cell stack according to Embodiment 8 of the present invention, which are drawn to overlap with each other in a see-through manner when viewed in a thickness direction of the anode separator.
Figure 28:
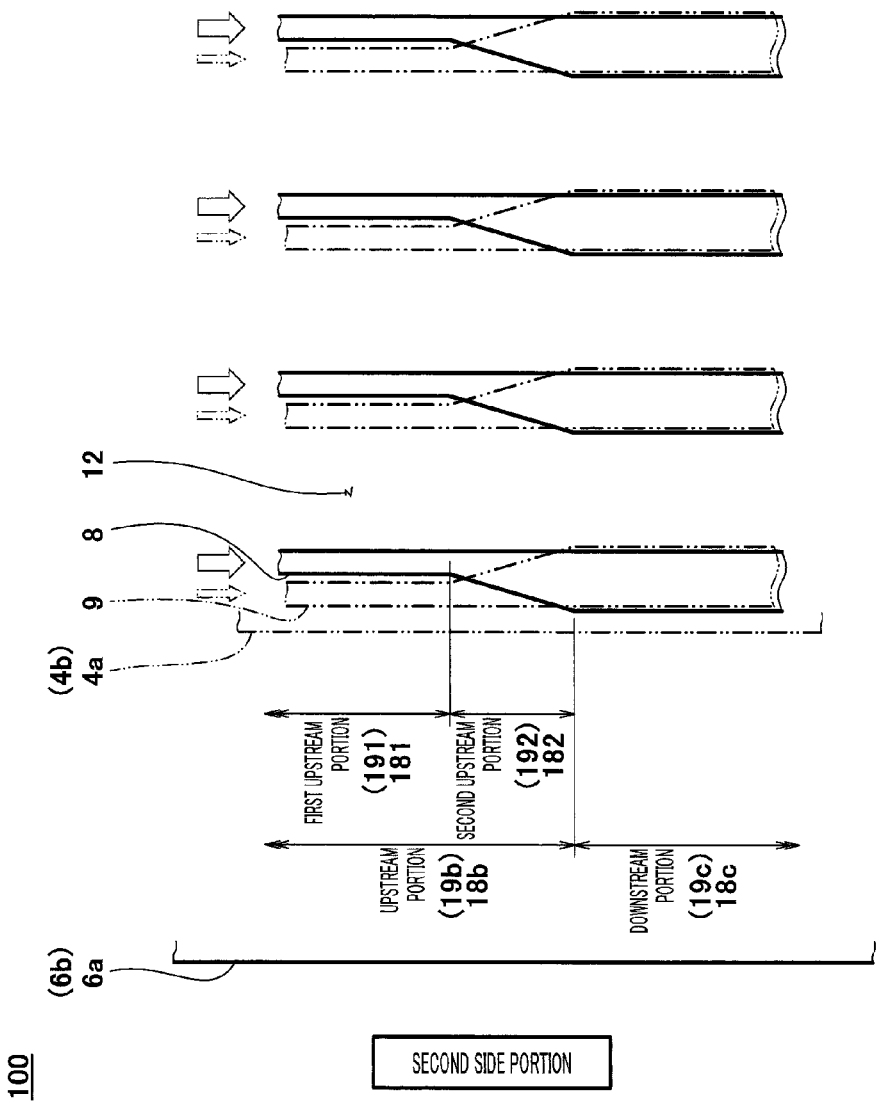
FIG. 28 is a schematic view showing a configuration of a polymer electrolyte fuel cell according to Embodiment 8 of the present invention.

FIG. 27 is a schematic view of an anode separator and an anode in a fuel cell stack according to Embodiment 8 of the present invention, which are drawn to overlap with each other in a see-through manner when viewed in a thickness direction of the anode separator. FIG. 28 is a schematic view showing a configuration of a fuel cell stack according to Embodiment 8 of the present invention. In FIG. 27, upper and lower sides of the anode separator are depicted as upper and lower sides of FIG. 27, the cooling medium supply manifold hole and the cooling medium discharge manifold hole are omitted, and the fuel gas channel is indicated by an imaginary line (two-dotted line). In FIG. 28, a part of the fuel cell is depicted, and the anode separator and the anode separator are drawn in a see-through manner, when viewed in the thickness direction of the fuel cell (anode separator).

As shown in FIGS. 27 and 28, the fuel cell stack 61 (fuel cell 100) according to Embodiment 8 of the present invention has a configuration which is basically the same as that of the fuel cell stack 61 (fuel cell 100) according to Embodiment 2 but is different from the same in that the fuel gas channel 8 is provided on the anode 4*a* like Embodiment 7.

To be specific, the fuel gas channel 8 includes an upstream portion 18*b* and a downstream portion 18*c*. The upstream portion 18*b* includes a first upstream portion 181 and a second upstream portion 182. The first upstream portion 181 is at least a portion extending between the upstream end of the fuel gas channel 8 which is one end thereof, and a portion satisfying a formula: $L7 \leq \{(2/3) \times L4\}$ which is an opposite end thereof, although its downstream end is different depending on a configuration such as a width of the fuel gas channel 8, a dew point of the reaction gas, a temperature of the cooling medium, etc. In the above formula, L4 indicates a passage length of the upstream portion 18*b* of the fuel gas channel 8 and L7 indicates a passage length of the first upstream portion 181 of the fuel gas channel 8. The length of the first upstream portion 181 is preferably large to suppress degradation of the polymer electrolyte membrane 1.

The first upstream portion 181 of the fuel gas channel 8 overlaps with (faces) the second rib portion 12*b* of the cathode 4*b*, when viewed in the thickness direction of the anode separator. To be specific, the channel width of the first upstream portion 181 of the fuel gas channel 8 is set smaller than the channel width of the downstream portion 18c, and is deviated toward the first side portion relative to the oxidizing gas channel 9. The second upstream portion 182 of the fuel gas channel 8 partially faces the second rib portion 12. Furthermore, the downstream portion 18c overlaps (faces) the oxidizing gas channel 9.

Since the upstream sub-gas channel 81 and the downstream sub-gas channel 83 are configured similarly to the upstream sub-gas channel 81 and the downstream sub-gas channel 83 which are formed on the inner surface of the anode separator 6a of Embodiment 2, detailed description of them is omitted.

To be specific, in the fuel cell stack 61 (fuel cell 100) of Embodiment 8, the fuel gas channel 8 provided on the anode 4a, and the upstream sub-gas channel 81 and the downstream sub-gas channel 83 which are provided on the inner surface of the anode separator 6a are configured to have the same shapes as those of the fuel gas channel 8 in the fuel cell stack 61 (fuel cell 100).

The fuel cell stack 61 (fuel cell 100) according to Embodiment 8 configured as described above can achieve the same advantages as those achieved by the fuel cell stack 61 (fuel cell 100) according to Embodiment 2.

Embodiment 9

Figure 29:
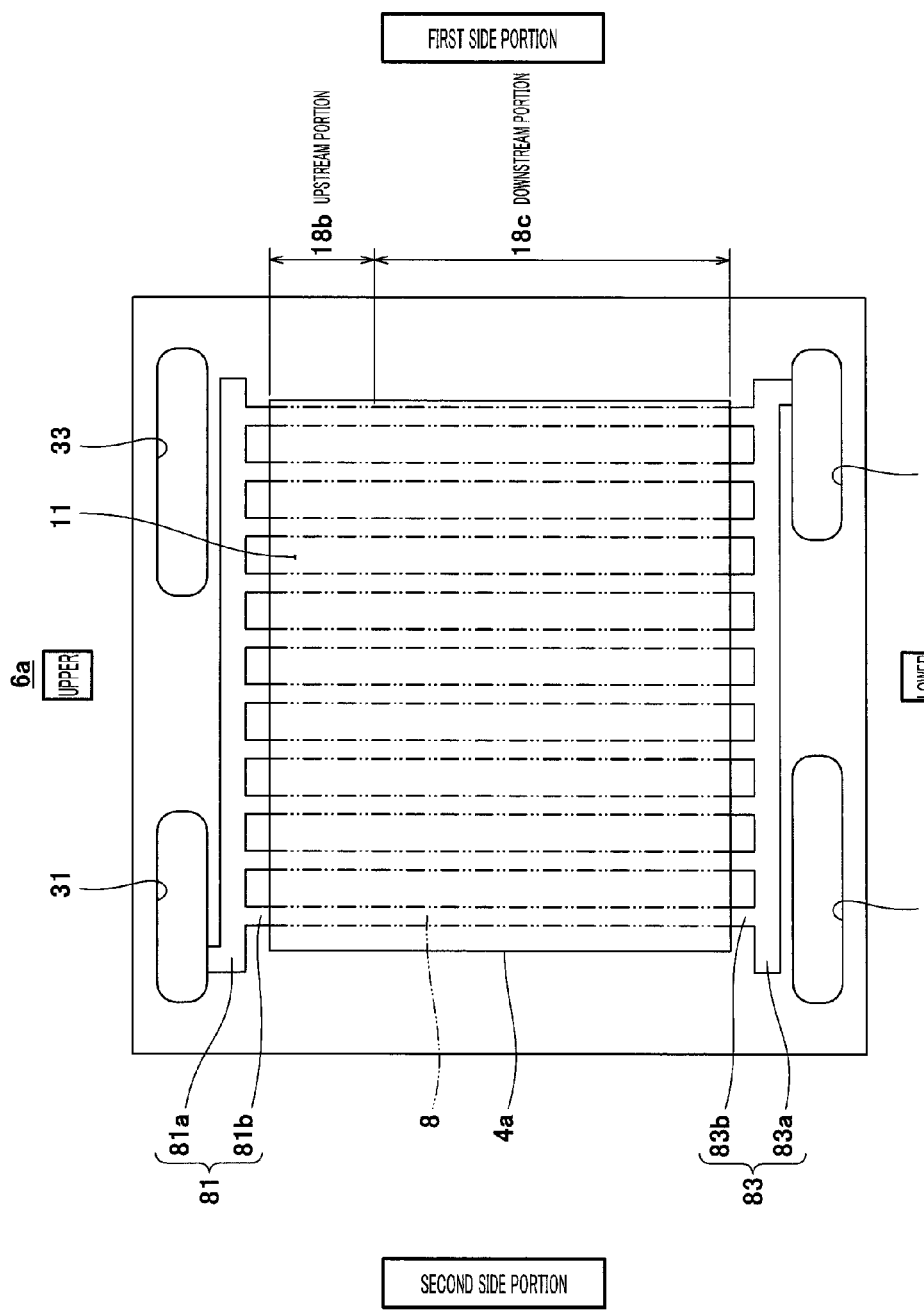
FIG. 29 is a schematic view of an anode separator and an anode in a fuel cell stack according to Embodiment 9 of the present invention, which are drawn to overlap with each other in a see-through manner when viewed in a thickness direction of the anode separator.
Figure 30:
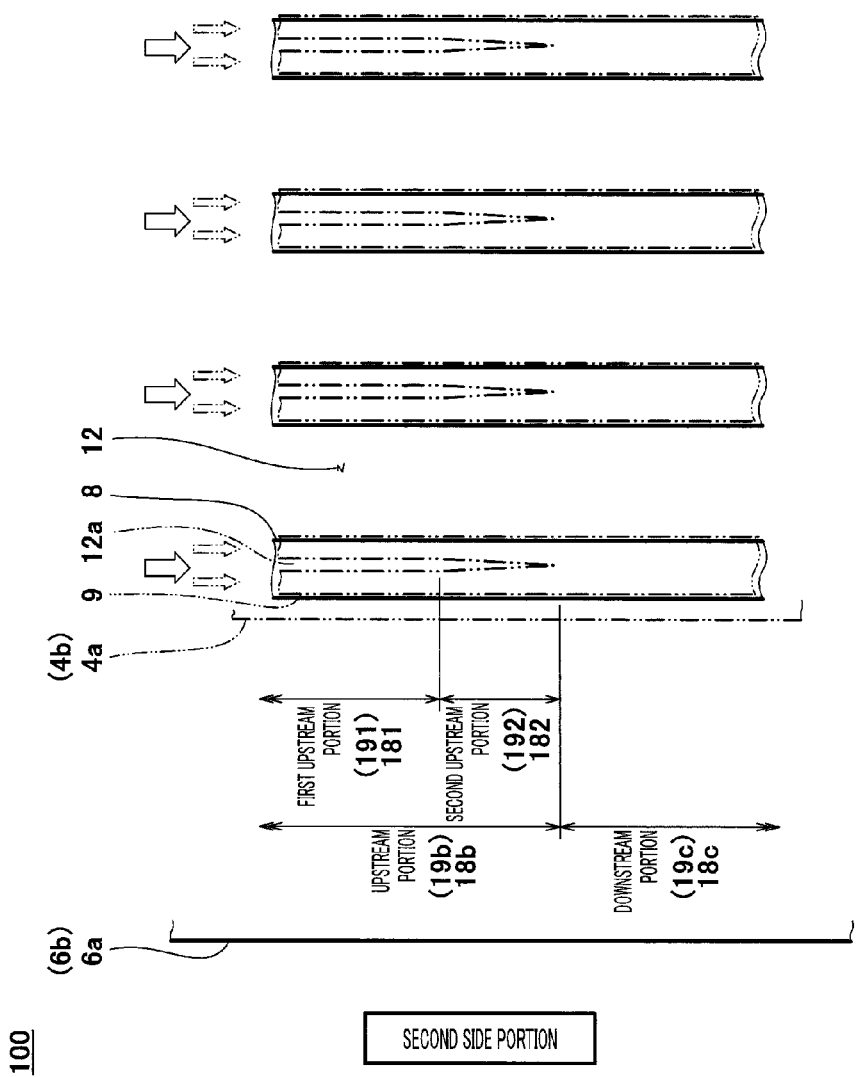
FIG. 30 is a schematic view showing a configuration of a polymer electrolyte fuel cell according to Embodiment 9 of the present invention.

FIG. 29 is a schematic view of an anode separator and an anode in a fuel cell stack according to Embodiment 9 of the present invention, which are drawn to overlap with each other in a see-through manner when viewed in a thickness direction of the anode separator. FIG. 30 is a schematic view showing a configuration of a fuel cell according to Embodiment 9 of the present invention. In FIG. 29, upper and lower sides of the anode separator are depicted as upper and lower sides of FIG. 29, the cooling medium supply manifold hole and the cooling medium discharge manifold hole are omitted, and the fuel gas channel is indicated by an imaginary line (two-dotted line). In FIG. 30, only a part of the fuel cell is depicted, and the anode separator and the anode separator are drawn in a see-through manner, when viewed in the thickness direction of the fuel cell (anode separator).

As shown in FIGS. 29 and 30, the fuel cell stack 61 (fuel cell 100) according to Embodiment 9 of the present invention has a configuration which is basically the same as that of the fuel cell stack 61 (fuel cell 100) according to Embodiment 3 but is different in that the fuel gas channel 8 is provided on the anode 4a, like Embodiment 7.

To be specific, the fuel gas channel 8 has a straight-line shape. The upstream sub-gas channel 81 and the downstream sub-gas channel 83 are configured similarly to the upstream sub-gas channel 81 and the downstream sub-gas channel 83 formed on the inner surface of the anode separator 6a of Embodiment 3, and will not be described in detail.

To be specific, in the fuel cell stack 61 (fuel cell 100) of Embodiment 9, the fuel gas channel 8 provided on the anode 4a, and the upstream sub-gas channel 81 and the downstream sub-gas channel 83 which are provided on the inner surface of the anode separator 6a are configured to have the same shapes as those of the fuel gas channel 8 in the fuel cell stack 61 (fuel cell 100) of Embodiment 3.

The fuel cell stack 61 (fuel cell 100) according to Embodiment 9 configured as described above can achieve the same advantages as those achieved by the fuel cell stack 61 (fuel cell 100) according to Embodiment 2.

Embodiment 10

Figure 31:
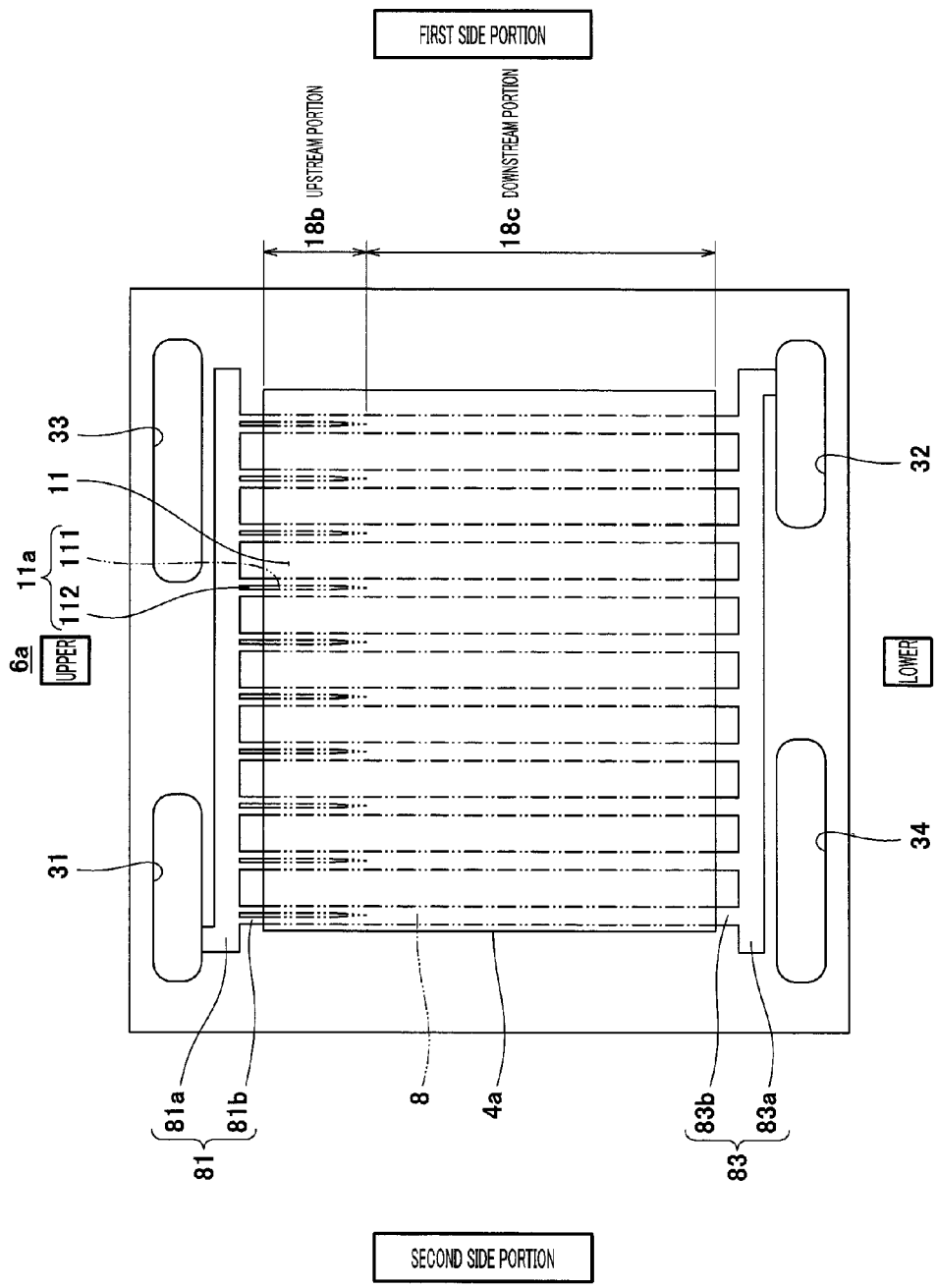
FIG. 31 is a schematic view of an anode separator and an anode in a fuel cell stack according to Embodiment 10 of the present invention, which are drawn to overlap with each other in a see-through manner when viewed in a thickness direction of the anode separator.
Figure 32:
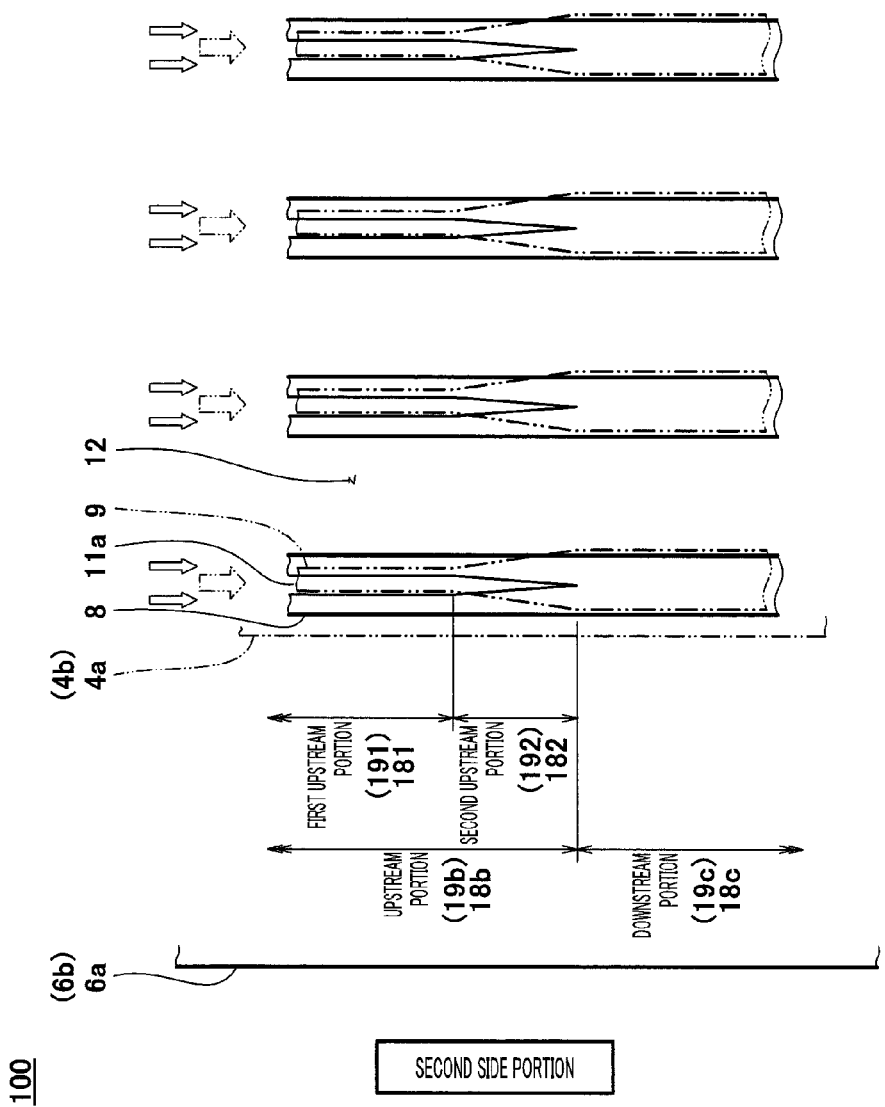
FIG. 32 is a schematic view showing a configuration of a polymer electrolyte fuel cell according to Embodiment 10 of the present invention.

FIG. 31 is a schematic view of an anode separator and an anode in a fuel cell stack according to Embodiment 10 of the present invention, which are drawn to overlap with each other in a see-through manner when viewed in a thickness direction of the anode separator. FIG. 32 is a schematic view showing a configuration of a fuel cell according to Embodiment 10 of the present invention. In FIG. 31, upper and lower sides of the anode separator are depicted as upper and lower sides of FIG. 31, the cooling medium supply manifold hole and the cooling medium discharge manifold hole are depicted, and the fuel gas channel is indicated by an imaginary line (two-dotted line). In FIG. 32, only a part of the fuel cell is depicted, and the anode separator and the anode separator are drawn in a see-through manner, when viewed in the thickness direction of the fuel cell (anode separator).

As shown in FIGS. 31 and 32, the fuel cell stack 61 (fuel cell 100) according to Embodiment 10 of the present invention has a configuration which is basically the same as that of the fuel cell stack 61 (fuel cell 100) according to Embodiment 4, but is different in that the fuel gas channel 8 is provided on the anode 4a, like Embodiment 7.

To be specific, the fuel gas channel 8 is provided with an island-like rib portion 111 extending vertically between the upstream end thereof and the downstream end of the upstream portion 18b. The upstream sub-gas channel 81 and the downstream sub-gas channel 83 are configured similarly to the upstream sub-gas channel 81 and the downstream sub-gas channel 83 which are formed on the inner surface of the anode separator 6a of Embodiment 4, and will not be described in detail.

To be specific, in the fuel cell stack 61 (fuel cell 100) of Embodiment 10, the fuel gas channel 8 provided on the anode 4a, and the upstream sub-gas channel 81 and the downstream sub-gas channel 83 which are provided on the inner surface of the anode separator 6a are configured to have the same shapes as those of the fuel gas channel 8 in the fuel cell stack 61 (fuel cell 100) of Embodiment 4.

The fuel cell stack 61 (fuel cell 100) according to Embodiment 10 configured as described above can achieve the same advantages as those achieved by the fuel cell stack 61 (fuel cell 100) according to Embodiment 4.

Embodiment 11

Figure 33:
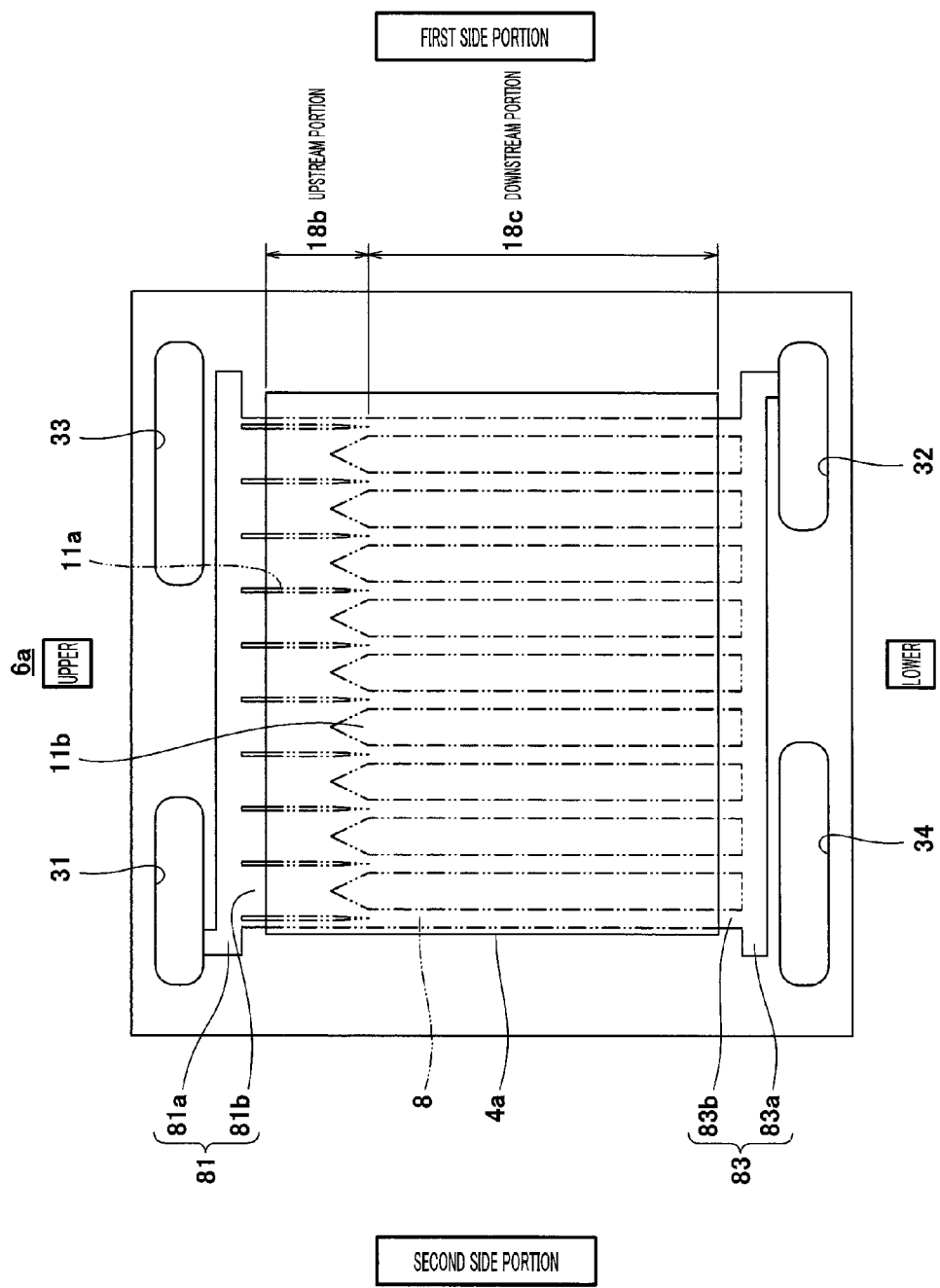
FIG. 33 is a schematic view of an anode separator and an anode in a fuel cell stack according to Embodiment 11 of the present invention, which are drawn to overlap with each other in a see-through manner when viewed in a thickness direction of the anode separator.
Figure 34:
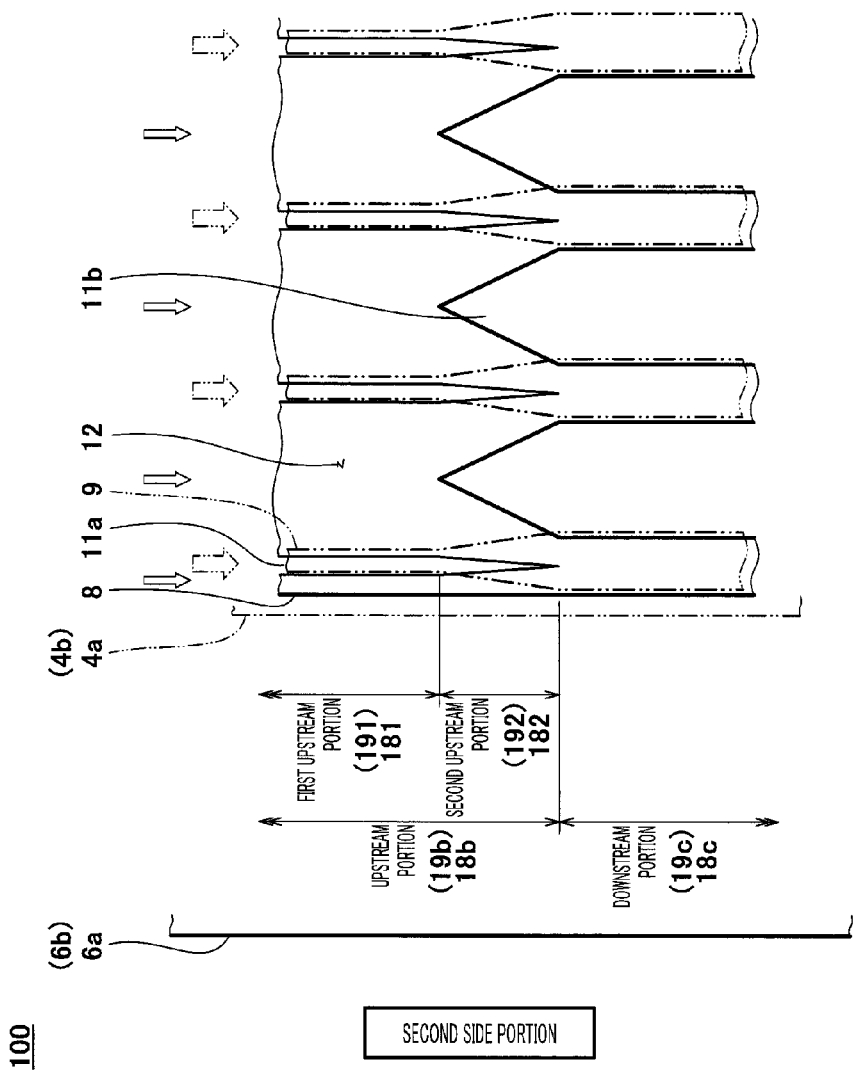
FIG. 34 is a schematic view showing a configuration of a polymer electrolyte fuel cell according to Embodiment 11 of the present invention.

FIG. 33 is a schematic view of an anode separator and an anode in a fuel cell stack according to Embodiment 11 of the present invention, which are drawn to overlap with each other in a see-through manner when viewed in a thickness direction of the anode separator. FIG. 34 is a schematic view showing a configuration of a fuel cell according to Embodiment 11 of the present invention. In FIG. 33, the upper and lower sides of the anode separator are depicted as upper and lower sides of FIG. 33, the cooling medium supply manifold hole and the cooling medium discharge manifold hole are omitted, and the fuel gas channel is indicated by an imaginary line (two-dotted line). In FIG. 34, only a part of the fuel cell is depicted, and the anode separator and the anode separator are drawn in a see-through manner, when viewed in the thickness direction of the fuel cell (anode separator).

As shown in FIGS. 33 and 34, the fuel cell stack 61 (fuel cell 100) according to Embodiment 11 of the present invention has a configuration which is basically the same as that of the fuel cell stack 61 (fuel cell 100) according to Embodiment 5 but is different from the same in that the fuel gas channel 8 is provided on the anode 4a, like Embodiment 7.

To be specific, the fuel gas channel 8 is configured in such a manner that a passage width of the upstream portion 18b is set greater than a passage width of the downstream portion 18c except for the both end portions (first side portion end portion and second side portion end portion). To be more detailed, a plurality of first rib portions 11*a* extend vertically at predetermined intervals in the horizontal direction between the upstream end of the upstream portion 18*b* and the downstream end of the upstream portion 18*b*. A plurality of first rib portions 11*b* extend vertically between the upstream end of the second upstream portion 182 and the downstream end of the fuel gas channel 8 such that each first rib portion 11*b* is positioned between the adjacent first rib portions 11*a* in the horizontal direction. The lower end portion of each first rib portion 11*a* has a tapered shape (to be precise, triangular shape when viewed in the thickness direction of the anode separator 6*a*). The plurality of first rib portions 11*a* respectively run along each other and the plurality of first rib portions 11*b* respectively run along each other.

As shown in FIG. 34, the fuel gas channel 8 is configured in such a manner that the upstream portion 18*b* overlaps with (faces) the second rib portion 12 when viewed in the thickness direction of the anode separator 6*a*, while the downstream portion 18*c* overlaps with (faces) the oxidizing gas channel 9, when viewed in the thickness direction of the anode separator 6*a*. Because of this structure, the ratio of the fuel gas channel width of the upstream portion 18*b* of the fuel gas channel 8 to the second rib portion 12*b* is greater than the ratio of the fuel gas channel width of the downstream portion 18*c* of the fuel gas channel 8 to the second rib portion 12. In addition, the ratio of the fuel gas channel width of the first upstream portion 181 of the fuel gas channel 8 to the second rib portion 12*b* is greater than the ratio of the fuel gas channel width of the second upstream portion 182 of the fuel gas channel 8 to the second rib portion 12*b*.

The fuel cell stack 61 (fuel cell 100) according to Embodiment 11 configured as described above can achieve the same advantages as those achieved by the fuel cell stack 61 (fuel cell 100) according to Embodiment 5.

Embodiment 12

Figure 35:
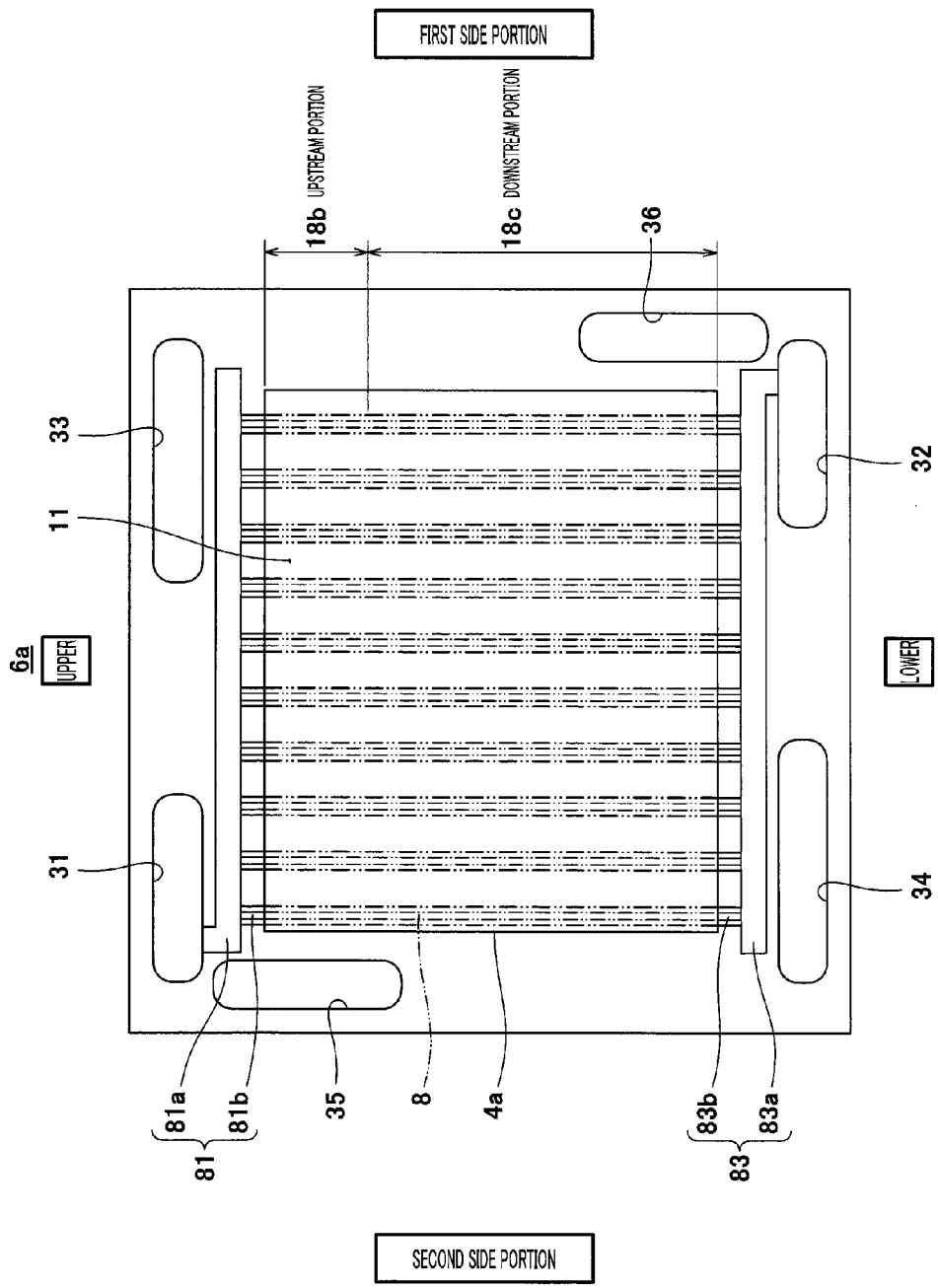
FIG. 35 is a schematic view of an anode separator and an anode in a fuel cell stack according to Embodiment 12 of the present invention, which are drawn to overlap with each other in a see-through manner when viewed in a thickness direction of the anode separator.
Figure 36:
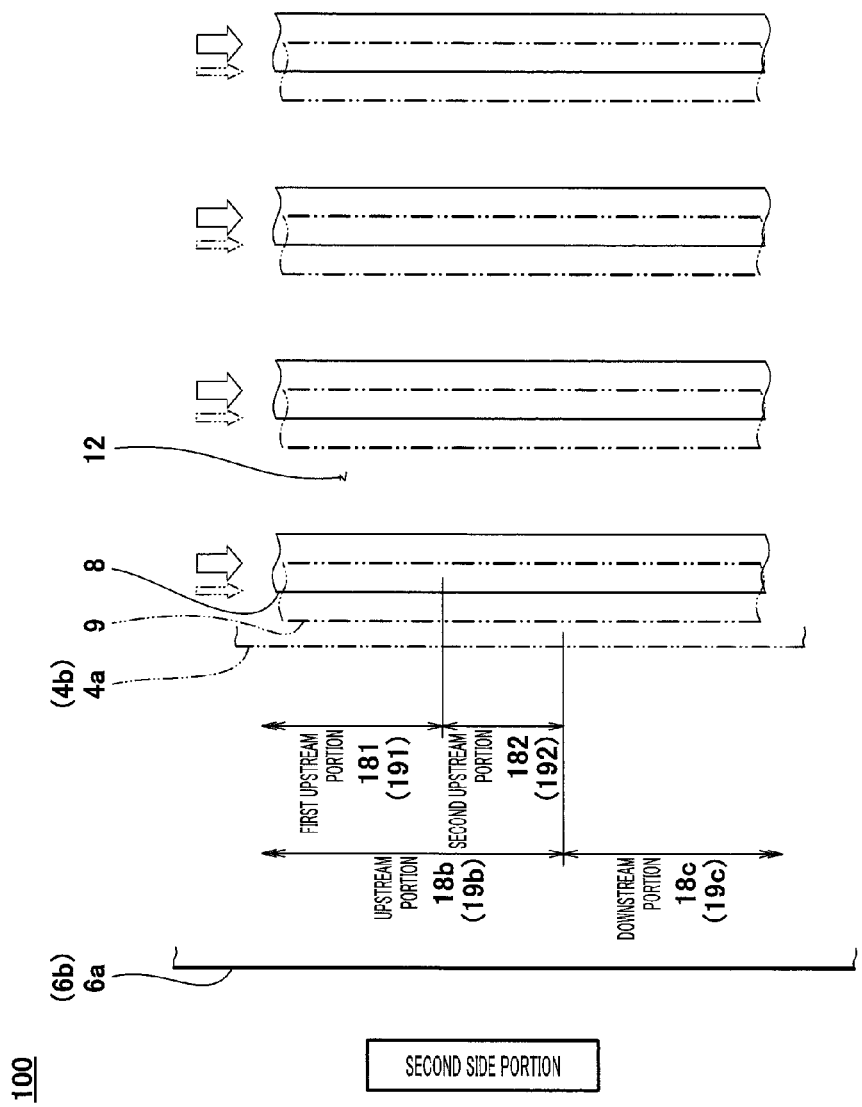
FIG. 36 is a schematic view showing a configuration of a polymer electrolyte fuel cell according to Embodiment 12 of the present invention.
Figure 37:
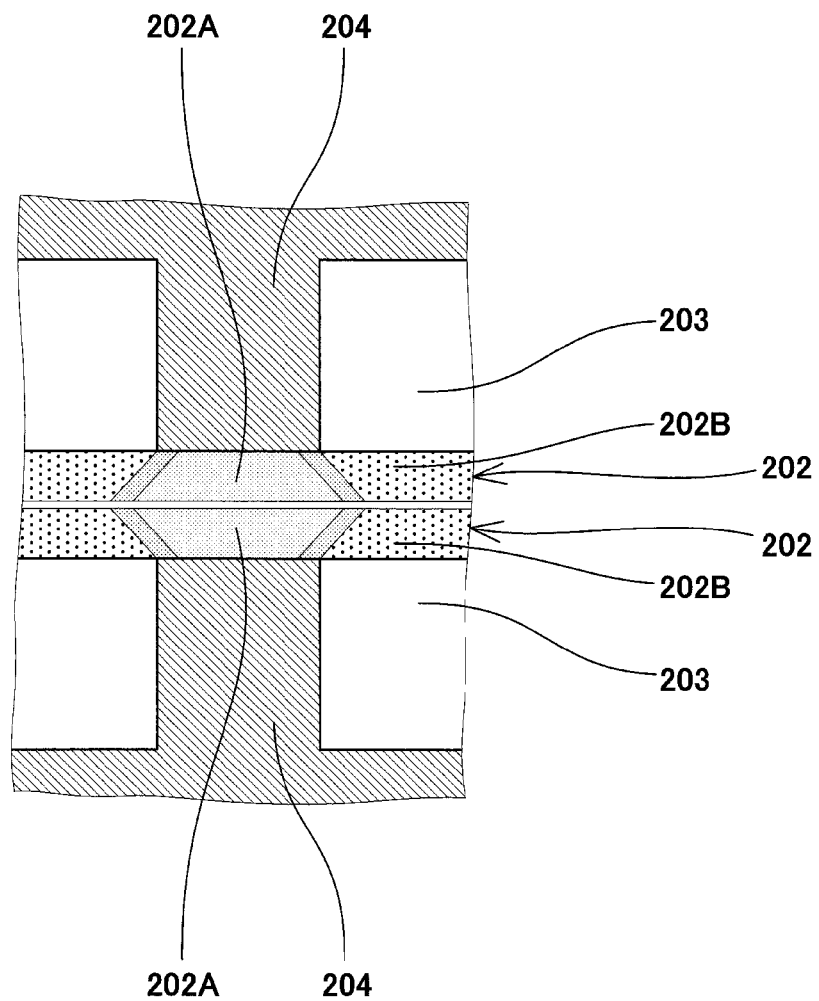
FIG. 37 is a schematic view showing a water content in an electrode during operation of a fuel cell.

FIG. 35 is a schematic view of an anode separator and an anode in a fuel cell stack according to Embodiment 12 of the present invention, which are drawn to overlap with each other in a see-through manner when viewed in a thickness direction of the anode separator. FIG. 36 is a schematic view showing a configuration of a fuel cell according to Embodiment 12 of the present invention. In FIG. 35, upper and lower sides of the anode separator are depicted as upper and lower sides of FIG. 35, the cooling medium supply manifold hole and the cooling medium discharge manifold hole are omitted, and the fuel gas channel is indicated by an imaginary line (two-dotted line). In FIG. 36, only a part of the fuel cell is omitted, and the anode separator and the anode separator are drawn in a see-through manner, when viewed in the thickness direction of the fuel cell (anode separator).

As shown in FIGS. 35 and 36, the fuel cell stack 61 (fuel cell 100) according to Embodiment 12 of the present invention has a configuration which is basically the same as that of the fuel cell stack 61 (fuel cell 100) according to Embodiment 6, but is different in that the fuel gas channel 8 is provided on the anode 4*a*, like Embodiment 7.

To be specific, the upstream portion 18*b* and the downstream portion 18*c* of the fuel gas channel 8 have portions which do not overlap with the oxidizing gas channel 9 in the width direction of the fuel gas channel 8 when viewed in the thickness direction of the anode separator 6*a*. That is, when viewed in the thickness direction of the anode separator 6*a*, the downstream portion 18*c* as well as the upstream portion 18*b* of the fuel gas channel 8 overlaps with the second rib portion 12 in the width direction of the fuel gas channel 8 when viewed in the thickness direction of the anode separator 6*a*. In other words, the fuel gas channel 8 is formed in such a manner that the ratio of the fuel gas channel width of the upstream portion 18*b* and the downstream portion 18*c* in the fuel gas channel 8 to the second rib portion 12 is set greater than 0 and not greater than 1. Although in Embodiment 12, the fuel gas channel 8 is formed in such a manner that the ratio of the fuel gas channel width of the upstream portion 18*b* and the downstream portion 18*c* in the fuel gas channel 8 to the second rib portion 12 is 0.5, the present invention is in no way limited to this, but the fuel gas channel 8 may be formed such that the ratio of the fuel gas channel width of the upstream portion 18*b* and the downstream portion 18*c* in the fuel gas channel 8 to the second rib portion 12 is 1.

The fuel cell stack 61 (fuel cell 100) according to Embodiment 12 configured as described above can achieve the same advantages as those achieved by the fuel cell stack 61 (fuel cell 100) according to Embodiment 6.

In the fuel cell stack 61 (fuel cell 100) according to Embodiment 1 to Embodiment 12, the overall range of the upstream portion 18*b* of the fuel gas channel 8 in the direction in which the passage extends (direction in which the fuel gas flows) overlaps with the second rib portion 12 of the cathode separator 6*b*, a part of it may not overlap with the second rib portion 12 in the direction in which the passage extends.

Although in the fuel cell stacks 61 (fuel cell 100) according to Embodiment 1 to Embodiment 6, the first separator is the anode separator 6*a*, the second separator is the cathode separator 6*b*, the first reaction gas channel is the fuel gas channel 8 and the second reaction gas channel is the oxidizing gas channel 9, the present invention is in no way limited to this. Similar advantages can be achieved by using a configuration in which the first separator is the cathode separator 6*b*, the second separator is the anode separator 6*a*, the first reaction gas channel is the oxidizing gas channel 9 and the second reaction gas channel 9 is the fuel gas channel 8.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

Industrial Applicability

A polymer electrolyte fuel cell and a fuel cell stack of the present invention are useful as a polymer electrolyte fuel cell and a fuel cell stack which are capable of suppressing a polymer electrolyte membrane from getting dried and thereby suppressing the polymer electrolyte membrane from being degraded when they are operated under conditions of a high-temperature and a low humidity.

REFERENCE SIGNS LISTS 1 polymer electrolyte membrane
2*a* anode catalyst layer
2*b* cathode catalyst layer
3*a* anode gas diffusion layer
3*b* cathode gas diffusion layer
4*a* anode
4*b* cathode
5 MEA (membrane-electrode-assembly)
6*a* anode separator
6*b* cathode separator
7 gasket 8 fuel gas channel (first reaction gas channel)
9 oxidizing gas channel (second reaction gas channel)
10 cooling medium channel
11 first rib portion
11a first rib portion
11b first rib portion
12 second rib portion
12a second rib portion
18a most-upstream portion
18b upstream portion
18c downstream portion
18d most-downstream portion
19b upstream portion
19c downstream portion
31 fuel gas supply manifold hole (first reaction gas supply manifold hole)
32 fuel gas exhaust manifold hole
33 oxidizing gas supply manifold hole (second reaction gas supply manifold hole)
34 oxidizing gas exhaust manifold hole
35 cooling medium supply manifold hole
36 cooling medium discharge manifold hole
41 portion
42 portion
61 fuel cell stack
62 cell stack body
63 first end plate
64 second end plate
81 upstream-sub gas channel
81b communicating portion
81a dividing portion
82 communicating gas channel
83 downstream sub-gas channel
83b communicating portion
83a joint portion
91 upstream sub-gas channel
91b communicating portion
91a dividing portion
93 downstream sub-gas channel
93b communicating portion
93a joint portion
100 polymer electrolyte fuel cell
111 rib portion
112 rib portion
121 rib portion
122 rib portion
131 fuel gas supply manifold
132 fuel gas exhaust manifold
133 oxidizing gas supply manifold
134 oxidizing gas exhaust manifold
135 cooling medium supply manifold
136 cooling medium discharge manifold
181 first upstream portion
182 second upstream portion
191 first upstream portion
192 second upstream portion
202 electrode
202A portion
202B portion
203 reaction gas channel
204 rib portion

The invention claimed is:

1. A polymer electrolyte fuel cell comprising:
a membrane-electrode assembly including a polymer electrolyte membrane and first and second electrodes sandwiching a pair of main surfaces of the polymer electrolyte membrane;
an electrically-conductive first separator which is of a plate shape and is provided in contact with the first electrode of the membrane-electrode assembly; and
an electrically-conductive second separator which is of a plate shape and is provided in contact with the second electrode of the membrane-electrode assembly, wherein:
the first separator is provided with groove-shaped first reaction gas channels including a first reaction gas channel on one main surface of the first separator which contacts the first electrode such that a plurality of first rib portions of a straight-line shape run along each other, each of the plurality of first rib portions being located between adjacent two groove-shaped first reaction gas channels,
the second electrode is provided with groove-shaped second reaction gas channels including a second reaction gas channel on one main surface of the second electrode which contacts the second separator such that a plurality of second rib portions of a straight-line shape run along each other, each of the plurality of second rib portions being located between adjacent two groove-shaped second reaction gas channels,
an upstream portion of the first reaction gas channel is defined as a portion extending over a predetermined length from a portion which contacts the first electrode first from an upstream end of the first reaction gas channel toward a downstream side,
a downstream portion of the first reaction gas channel is defined as a portion of the first reaction gas channel which is located downstream of the upstream portion of the first reaction gas channel,
when a ratio of a first reaction gas channel width to the second rib portion is defined as a ratio of a portion of the first reaction gas channel which overlaps with the second rib portion in a width direction of the first reaction gas channel with respect to an overall width of the first reaction gas channel when viewed in a thickness direction of the first separator, a ratio of a first reaction gas channel width of at least the upstream portion of the first reaction gas channel with respect to the second rib portion is greater than 0 and not greater than 1, and the ratio of a first reaction gas channel width of the downstream portion of the first reaction gas channel with respect to the second rib portion is smaller than the ratio of a first reaction gas channel width of at least the upstream portion of the first reaction gas channel with respect to the second rib portion,
the first reaction gas channel in the upstream portion is configured such that (i) the first reaction gas channel has a narrow portion in which a width of the first reaction gas channel in the upstream portion is smaller than a width of the first reaction gas channel in the downstream portion or (ii) the first reaction gas channel in the upstream portion is offset from the first reaction gas channel in the downstream portion, and
the downstream portion of the first reaction gas channel includes a first constant portion in which the ratio of the first reaction gas channel width of the downstream portion of the first reaction gas channel with respect to the second rib portion is constant, the upstream portion of the first reaction gas channel includes a second constant portion in which the ratio of the first reaction gas channel width of at least the upstream portion of the first reaction gas channel with respect to the second rib portion is constant, and a ratio the first reaction gas channel width of the first reaction gas channel with respect to the second rib portion gradually changes between the first constant portion and the second constant portion.

2. A polymer electrolyte fuel cell comprising:

a membrane-electrode assembly including a polymer electrolyte membrane and first and second electrodes sandwiching a pair of main surfaces of the polymer electrolyte membrane;

an electrically-conductive first separator which is of a plate shape and is provided in contact with the first electrode of the membrane-electrode assembly; and an electrically-conductive second separator which is of a plate shape and is provided in contact with the second electrode of the membrane-electrode assembly, wherein:

the first electrode is provided with groove-shaped first reaction gas channels including a first reaction gas channel on one main surface of the first electrode which contacts the first separator such that a plurality of first rib portions of a straight-line shape run along each other, each of the plurality of first rib portions being located between adjacent two groove-shaped first reaction gas channels, the second electrode is provided with groove-shaped second reaction gas channels including a second reaction gas channel on one main surface of the second electrode which contacts the second separator such that a plurality of second rib portions of a straight-line shape run along each other, each of the plurality of second rib portions being located between adjacent two groove-shaped second reaction gas channels, an upstream portion of the first reaction gas channel is defined as a portion extending over a predetermined length from a portion which contacts the first electrode first from an upstream end of the first reaction gas channel toward a downstream side, a downstream portion of the first reaction gas channel is defined as a portion of the first reaction gas channel which is located downstream of the upstream portion of the first reaction gas channel, when a ratio of a first reaction gas channel width to the second rib portion is defined as a ratio of a portion of the first reaction gas channel which overlaps with the second rib portion in a width direction of the first reaction gas channel with respect to an overall width of the first reaction gas channel when viewed in a thickness direction of the first separator, a ratio of a first reaction gas channel width of at least the upstream portion of the first reaction gas channel with respect to the second rib portion is greater than 0 and not greater than 1, and the ratio of a first reaction gas channel width of the downstream portion of the first reaction gas channel with respect to the second rib portion is smaller than the ratio of a first reaction gas channel width of at least the upstream portion of the first reaction gas channel with respect to the second rib portion, the first reaction gas channel in the upstream portion is configured such that (i) the first reaction gas channel has a narrow portion in which a width of the first reaction gas channel in the upstream portion is smaller than a width of the first reaction gas channel in the downstream portion or (ii) the first reaction gas channel in the upstream portion is offset from the first reaction gas channel in the downstream portion, and the downstream portion of the first reaction gas channel includes a first constant portion in which the ratio of the first reaction gas channel width of the downstream portion of the first reaction gas channel with respect to the second rib portion is constant, the upstream portion of the first reaction gas channel includes a second constant portion in which the ratio of the first reaction gas channel width of at least the upstream portion of the first reaction gas channel with respect to the second rib portion is constant, and a ratio the first reaction gas channel width of the first reaction gas channel with respect to the second rib portion gradually changes between the first constant portion and the second constant portion.

3. The polymer electrolyte fuel cell according to claim 1, wherein the ratio of the first reaction gas channel width of the upstream portion of the first reaction gas channel with respect to the second rib portion is a predetermined ratio.

4. The polymer electrolyte fuel cell according to claim 1, wherein the ratio of the first reaction gas channel width of the upstream portion of the first reaction gas channel with respect to the second rib portion is 1.

5. The polymer electrolyte fuel cell according to claim 1, wherein the ratio of the first reaction gas channel width of the downstream portion of the first reaction gas channel with respect to the second rib portion is 0.

6. The polymer electrolyte fuel cell according to claim 3, wherein:

the upstream portion of the first reaction gas channel includes a first upstream portion, and a second upstream portion located downstream of the first upstream portion, and the first reaction gas channel is configured in such a manner that a ratio of a first reaction gas channel width of the first upstream portion of the first reaction gas channel with respect to the second rib portion is a first predetermined ratio, and a ratio of a first reaction gas channel width of the second upstream portion of the first reaction gas channel with respect to the second rib portion is a second predetermined ratio.

7. The polymer electrolyte fuel cell according to claim 6, wherein the first predetermined ratio is greater than the second predetermined ratio.

8. The polymer electrolyte fuel cell according to claim 7, wherein the first predetermined ratio is 1, and the second predetermined ratio is greater than 0 and less than 1.

9. The polymer electrolyte fuel cell according to claim 1, wherein the first rib portion formed at the downstream portion of the first reaction gas channel overlaps with the second rib portion when viewed in a thickness direction of the first separator.

10. The polymer electrolyte fuel cell according to claim 1, wherein a ratio of a first reaction gas channel width of the upstream portion and the downstream portion of the first reaction gas channel with respect to the second rib portion is greater than 0 and not greater than 1.

11. The polymer electrolyte fuel cell according to claim 2, wherein the ratio of the first reaction gas channel width of the upstream portion of the first reaction gas channel with respect to the second rib portion is a predetermined ratio.

12. The polymer electrolyte fuel cell according to claim 11, wherein the ratio of the first reaction gas channel width of the upstream portion of the first reaction gas channel with respect to the second rib portion is 1.

13. The polymer electrolyte fuel cell according to claim 11, wherein the ratio of the first reaction gas channel width of the downstream portion of the first reaction gas channel with respect to the second rib portion is 0.

14. The polymer electrolyte fuel cell according to claim 11, wherein:
- the upstream portion of the first reaction gas channel includes a first upstream portion, and a second upstream portion located downstream of the first upstream portion, and
- the first reaction gas channel is configured in such a manner that a ratio of a first reaction gas channel width of the first upstream portion of the first reaction gas channel with respect to the second rib portion is a first predetermined ratio, and a ratio of a first reaction gas channel width of the second upstream portion of the first reaction gas channel with respect to the second rib portion is a second predetermined ratio.

15. The polymer electrolyte fuel cell according to claim 14, wherein the first predetermined ratio is greater than the second predetermined ratio.

16. The polymer electrolyte fuel cell according to claim 15, wherein the first predetermined ratio is 1, and the second predetermined ratio is greater than 0 and less than 1.

17. The polymer electrolyte fuel cell according to claim 2, wherein the first rib portion formed at the downstream portion of the first reaction gas channel overlaps with the second rib portion when viewed in a thickness direction of the first separator.

18. The polymer electrolyte fuel cell according to claim 2, wherein a ratio of a first reaction gas channel width of the upstream portion and the downstream portion of the first reaction gas channel with respect to the second rib portion is greater than 0 and not greater than 1.

* * * * *